United States Patent
Ganton et al.

(10) Patent No.: US 9,035,568 B2
(45) Date of Patent: May 19, 2015

(54) TELEHEALTH WIRELESS COMMUNICATION HUB DEVICE AND SERVICE PLATFORM SYSTEM

(71) Applicant: QUALCOMM Incorporated, San Diego, CA (US)

(72) Inventors: Robert B. Ganton, San Diego, CA (US); James V. Pieronek, San Diego, CA (US); Rajeev D. Rajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 13/705,784

(22) Filed: Dec. 5, 2012

(65) Prior Publication Data

US 2013/0162160 A1    Jun. 27, 2013

Related U.S. Application Data

(60) Provisional application No. 61/566,939, filed on Dec. 5, 2011.

(51) Int. Cl.
*H05B 37/02* (2006.01)
*H05B 33/08* (2006.01)
*H04M 3/00* (2006.01)

(52) U.S. Cl.
CPC ............ *H05B 33/0857* (2013.01); *H05B 37/02* (2013.01); *H04M 3/00* (2013.01); *H05B 33/0818* (2013.01); *Y02B 20/346* (2013.01)

(58) Field of Classification Search
CPC ............... H05B 37/02; H05B 33/0857; H05B 33/0815; H05B 33/0833; H05B 33/0827; H05B 37/029; H05B 33/0803; H05B 33/0842; H05B 33/0818; Y02B 20/347; Y02B 20/345; H02M 3/156

USPC ......... 315/291, 294, 297, 307, 312, 320, 210, 315/216, 178, 185 S; 345/82, 83, 204, 690, 345/691; 455/555, 556, 159.1, 159.2, 161.2
See application file for complete search history.

(56) References Cited

U.S. PATENT DOCUMENTS 4,870,325 A * 9/1989 Kazar ........................... 315/178
6,239,716 B1 * 5/2001 Pross et al. ................. 340/815.4
(Continued)

FOREIGN PATENT DOCUMENTS

CN 1976310 A 6/2007
EP 1411751 A2 4/2004
(Continued)

OTHER PUBLICATIONS

Braden, "Requirements for Internet Hosts—Communication Layers," Newwork Working Group, Internet Engineering Task Force, Request for Comment: 1122, pp. 1-117, Oct. 1989.
(Continued)

Primary Examiner — Haiss Philogene
(74) Attorney, Agent, or Firm — Shyam K. Parekh

(57) ABSTRACT

A display circuit includes a first pulse width modulated (PWM) signal line coupled to a first switch, a second PWM signal line coupled to a second switch and the signal line, a transistor coupled to the second signal line between the first signal line and the second switch, a third switch coupled to a third PWM signal line, a fourth switch coupled to a fourth PWM signal line, a fifth switch coupled to a fifth PWM signal line, a light emitting diode (LED) including a red element coupled between the first and third switches, a green element coupled between the first and fourth switches, and a blue element coupled between the first and fifth switches, and an LED including a red element coupled between the second and third switches, a green element coupled between the second and fourth switches, and a blue element coupled between the second and fifth switches.

32 Claims, 36 Drawing Sheets

(56) References Cited

U.S. PATENT DOCUMENTS

| | | | |
|---|---|---|---|
| 6,301,484 | B1 | 10/2001 | Rogers et al. |
| 6,396,466 | B1* | 5/2002 | Pross et al. ............... 345/82 |
| 6,418,535 | B1 | 7/2002 | Kulakowski et al. |
| 6,548,967 | B1* | 4/2003 | Dowling et al. ............ 315/318 |
| 7,136,672 | B2* | 11/2006 | Kitano et al. ............ 455/556.1 |
| 7,164,907 | B2 | 1/2007 | Cochran et al. |
| 7,202,607 | B2* | 4/2007 | Kazar et al. ............. 315/185 S |
| 7,391,406 | B2* | 6/2008 | Yamamoto et al. ............ 345/102 |
| 7,618,345 | B2* | 11/2009 | Corbalis et al. ................ 482/8 |
| 7,761,261 | B2 | 7/2010 | Shmueli et al. |
| 7,902,771 | B2* | 3/2011 | Shteynberg et al. ......... 315/307 |
| 8,213,971 | B2* | 7/2012 | Papineau et al. ............. 455/466 |
| 8,364,857 | B2* | 1/2013 | Pyers et al. .................... 710/14 |
| 2004/0064453 | A1 | 4/2004 | Ruiz et al. |
| 2004/0073411 | A1 | 4/2004 | Alston et al. |
| 2004/0088180 | A1 | 5/2004 | Akins et al. |
| 2004/0125813 | A1 | 7/2004 | Tanaka et al. |
| 2005/0097191 | A1 | 5/2005 | Yamaki et al. |
| 2005/0248944 | A1 | 11/2005 | Sloan |
| 2005/0269580 | A1 | 12/2005 | D'angelo |
| 2006/0089542 | A1 | 4/2006 | Sands |
| 2007/0005867 | A1 | 1/2007 | Diamant |
| 2007/0011374 | A1 | 1/2007 | Kumar et al. |
| 2008/0097908 | A1 | 4/2008 | Dicks et al. |
| 2010/0017471 | A1 | 1/2010 | Brown et al. |
| 2010/0049885 | A1 | 2/2010 | Chandra et al. |
| 2010/0211967 | A1 | 8/2010 | Ramaswamy et al. |
| 2010/0269157 | A1 | 10/2010 | Experton |
| 2010/0300856 | A1 | 12/2010 | Pance et al. |
| 2010/0315021 | A1 | 12/2010 | Lau et al. |
| 2011/0109444 | A1 | 5/2011 | Edwards et al. |
| 2011/0205965 | A1 | 8/2011 | Sprigg et al. |
| 2011/0234409 | A1 | 9/2011 | Soliman |
| 2012/0182939 | A1* | 7/2012 | Rajan et al. .................... 370/328 |

FOREIGN PATENT DOCUMENTS

| | | |
|---|---|---|
| EP | 1659830 A1 | 5/2006 |
| EP | 1753180 A1 | 2/2007 |
| EP | 1753190 A1 | 2/2007 |
| EP | 1887756 A2 | 2/2008 |
| EP | 2209353 A2 | 7/2010 |
| JP | 2002123493 A | 4/2002 |
| JP | 2002125062 A | 4/2002 |
| JP | 2003196128 A | 7/2003 |
| JP | 2004208101 A | 7/2004 |
| JP | 2004304623 A | 10/2004 |
| JP | 2006005789 A | 1/2006 |
| JP | 2006203306 A | 8/2006 |
| JP | 2007526676 A | 9/2007 |
| JP | 2007281904 A | 10/2007 |
| JP | 2007528618 A | 10/2007 |
| JP | 2007334581 A | 12/2007 |
| WO | WO-0117297 | 3/2001 |
| WO | 0227640 A2 | 4/2002 |
| WO | WO-2005048629 A1 | 5/2005 |
| WO | 2008052293 A1 | 5/2008 |
| WO | WO-2009032134 A2 | 3/2009 |
| WO | 2010038918 A1 | 4/2010 |

OTHER PUBLICATIONS

Chen Y., et al., "A Smart Gateway for Health Care System Using Wireless Sensor Network," IEEE, 2010 Fourth International Conference on Sensor Technologies and Applications (Sensorcomm), Jul. 18-25, 2010, pp. 545-550.

Continua Certification Version 1.0, Continua Health Alliance, Feb. 23, 2009, http://www.continuaalliance.org/static/cms_workspace/Continua_Certification_Public.pdf.

Fernando T N C et al., "Ethernet frame tunneling over GPRS/EDGE for universal network monitoring", Industrial and Information Systems (ICIIS), 2009 International Conference On, IEEE, Piscataway, NJ, USA, Dec. 28, 2009, pp. 55-61, XP031647988, ISBN: 978-1-4244-4836-4.

Hirofuchi T et al, "USB/IP—a Peripheral Bus Extension for Device Sharing over IP Network", Proceedings of the Usenix Annual Technical Conference, XX, XX, Jan. 1, 2005, pp. 47-60, XP007901448,.

International Search Report and Written Opinion—PCT/US2012/068014—ISA/EPO—May 7, 2013.

Jerger, et al., "Memoirs of an eHealth Device Development," 2011 IEEE 13th International Conference on e-Health Networking, Applications and Services, pp. 332-337, 2011.

Part 11 :Wireless LAN Medium Access Control (MAC) and Physical Layer (PHY) Specifications, ANSI/IEEE STD 802.11, XX, XX, Jun. 12, 2003, pp. 34-88, XP002382009,.

Continua Health Alliance, Apr. 15, 2014, 3 pages, http://www.continuaalliance.org/index.html.

Continua Health Alliance Certification Process, Apr. 14, 2014, 5 pages, http://www.continuaalliance.org/products/cert-process.html.

Datawarehouse, "OLTP vs. OLAP," Mar. 24, 2014, Retrieved from the Internet < URL: http://datawarehouse4u.info/OLTP-vs-OLAP.html >, 2 pages.

Mitchell B., "Wireless Standards—802.11a, 802.11 b/g/n, and 802.11ac, The 802.11 Family explained,"Apr. 14, 2014, 2 pages, About.com Guide, http://compnetworking.about.com/cs/wireless80211/a/aa80211standard.html.

Vicente K.S., "ANT Wireless. Go Beyond," Apr. 15, 2014, 2 pages, http://www.thisisant.com.

Wi-Fi Alliance, "Who We Are," Apr. 15, 2014, 2 pages, http://www.wi-fi-org/Wireless Standards 802.11.

Wikipedia, "IEEE 802.11," Wireless Standards 802.11, Apr. 13, 2014, 15 pages, http://en.wikipedia.org/wiki/802.11.

Wikipedia, "Online Analytical Processing," Mar. 24, 2014, 7 pages, http:///en.wikipedia.org/wiki/online_analytical_processing.

\* cited by examiner

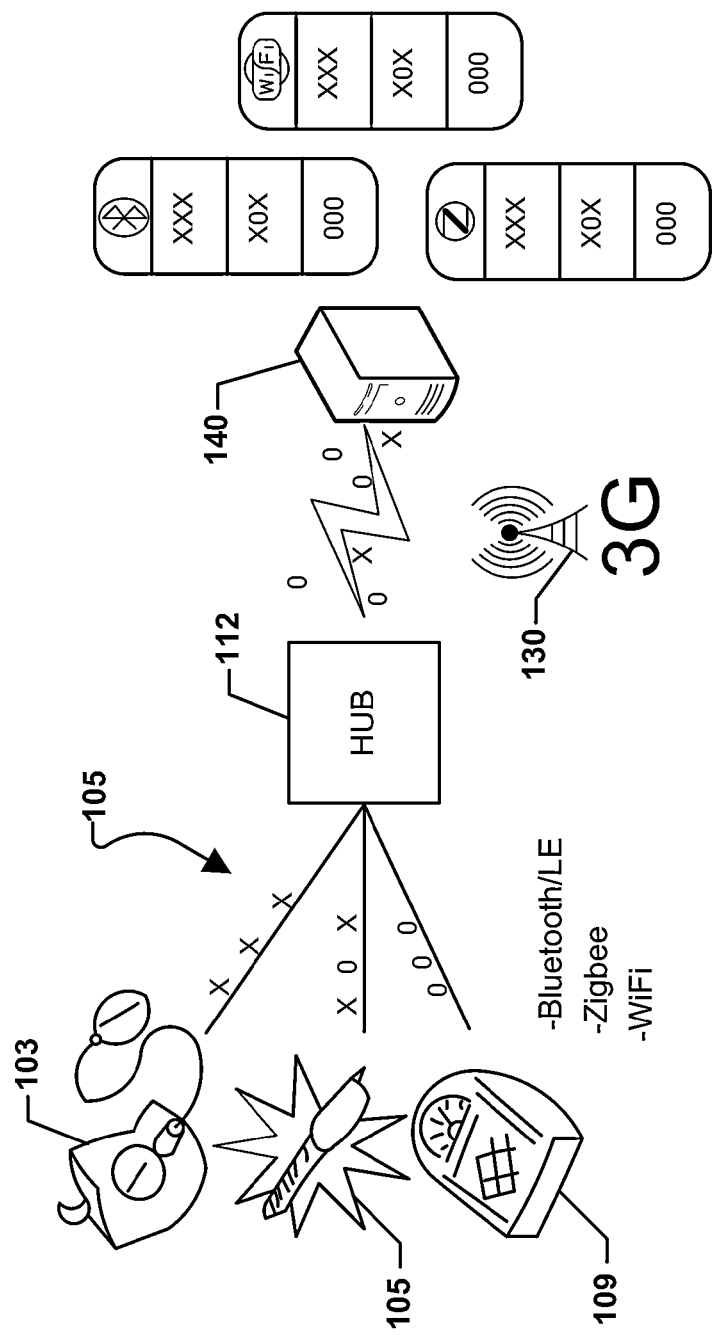

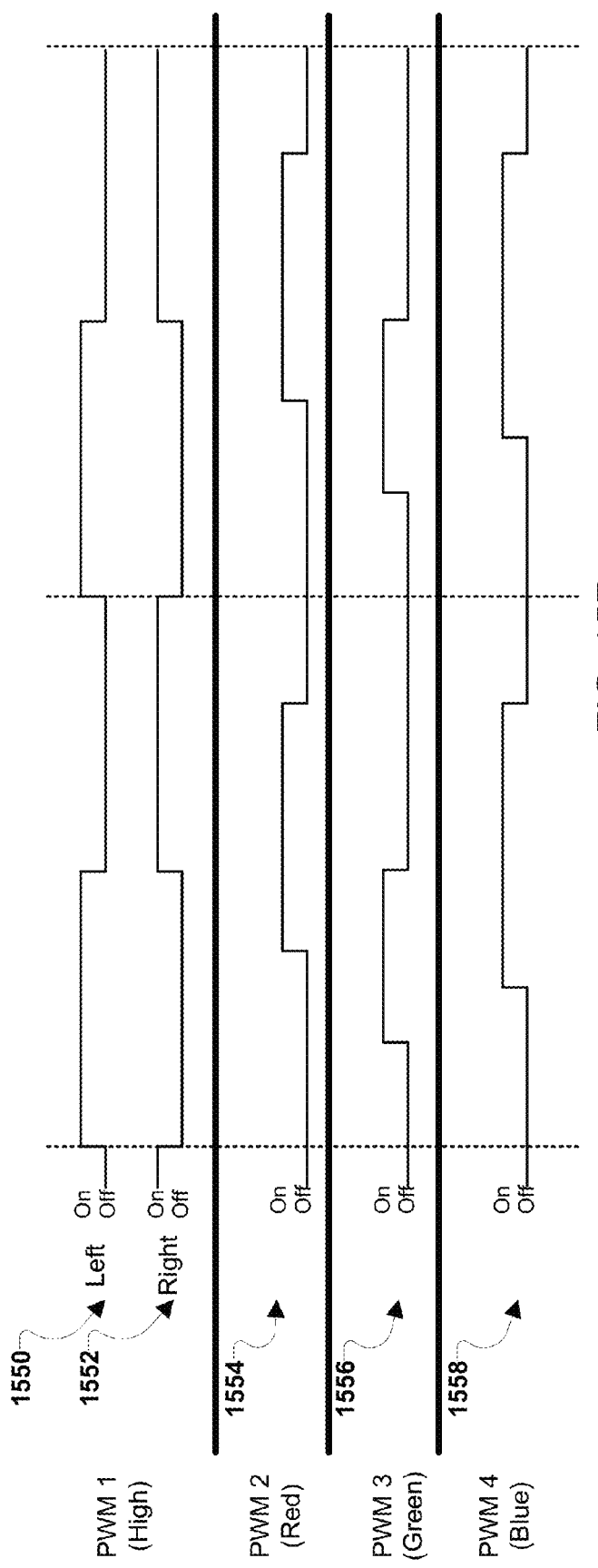

TELEHEALTH WIRELESS COMMUNICATION HUB DEVICE AND SERVICE PLATFORM SYSTEM

RELATED APPLICATIONS

This application claims the benefit of priority to U.S. Provisional Patent Application No. 61/566,939 entitled "Telehealth Wireless M2M Communication Hub And Service Platform System" filed Dec. 5, 2011. This application is related to U.S. patent application Ser. No. 13/349,938 entitled "Telehealth Wireless M2M Communication Hub And Service Platform System" filed Jan. 13, 2012. The entire contents of both applications are hereby incorporated herein by reference.

FIELD OF THE INVENTION

The present invention relates generally to computer networks, and more particularly to a wireless communication hub for coupling medical devices to remote medical service and support providers by way of an intermediate server.

BACKGROUND

There is an ever growing population of electronic medical devices, many of them configured for home use. While the capabilities of such medical devices are significant, little integration of such medical institutions and medical systems have been accomplished. One of the challenges preventing such integration is the most electronic medical devices have been developed without regard to communication interfaces. Thus, no standard communication protocols or technologies have been implemented that could serve as an integrating backbone.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 1A-1G illustrate communication systems and data flows suitable for use with various embodiments.

FIGS. 15C-15F are signaling vs. time diagrams illustrating control signals that may be implemented with the circuit embodiments illustrated in FIGS. 15A and 15B in order to control light displays on a wireless communication hub device.

DETAILED DESCRIPTION

Figure 1A:
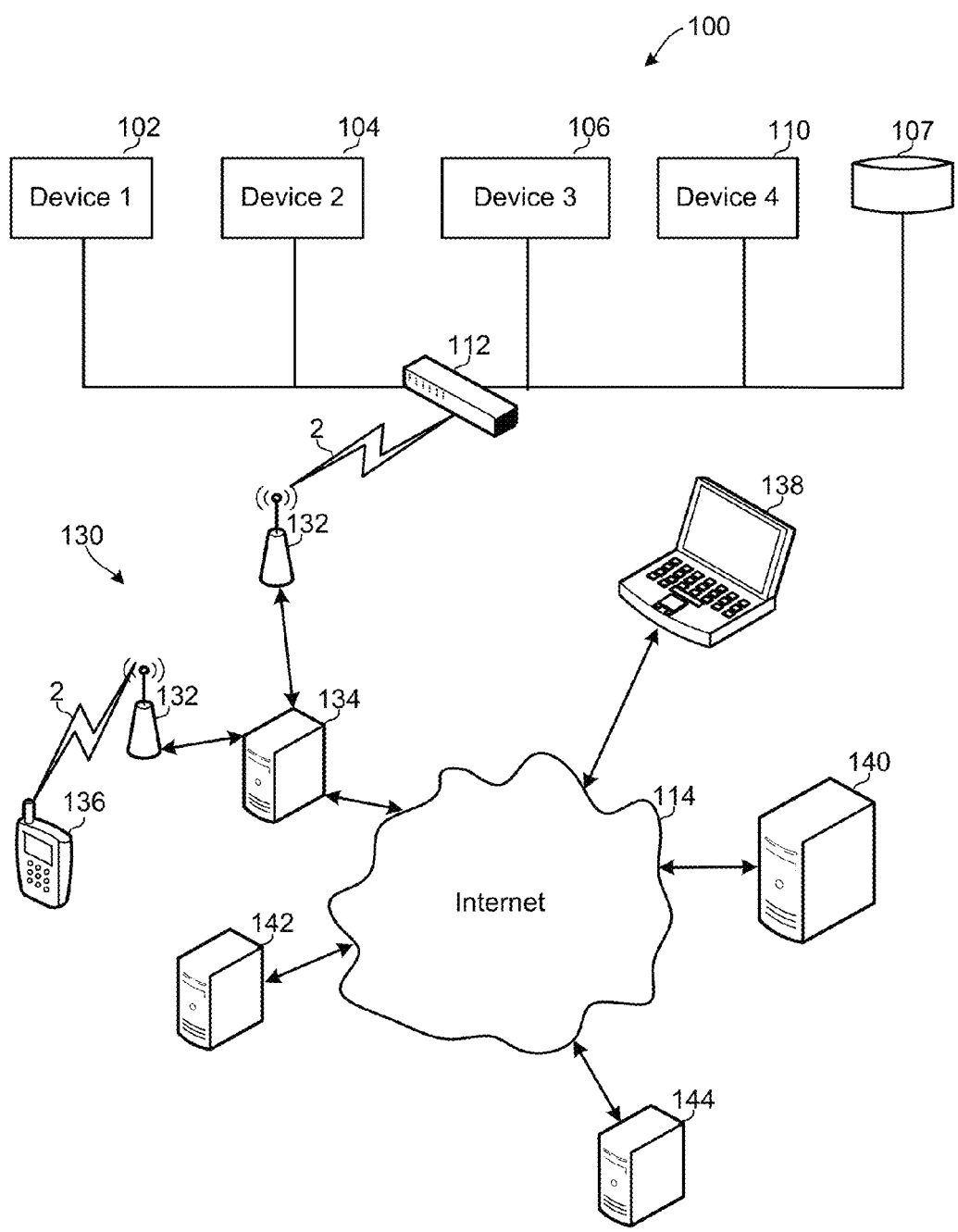

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "device" refers to any electronic device, several examples of which are mentioned or described herein. In a preferred embodiment, a device includes a communication port enabling the device to be coupled to another computing device or a network.

As used herein, the terms "computer," "personal computer" and "computing device" refer to any programmable computer system that is known or that will be developed in the future. In a preferred embodiment, a computer will be coupled to a network such as described herein. A computer system may be configured with software instructions to perform the processes described herein.

As used herein, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. Also, it is to be understood and appreciated that a number of components and modules may be combined into integrated circuits or chipsets. A combination of these approaches may also be used.

Electronic medical and fitness devices have been developed by a large number of manufacturers who have focused on the medical aspects of their products, and have only recently focused on the communication capabilities of the products and user experience associated with using the products. As a result, there has been little if any cooperation on standards, communication protocols, and technologies. Thus, the universe of electronic medical and fitness equipment lacks any kind of coordination or standards that would facilitate connecting such devices to the facilities and services that could use the data.

The various embodiments described herein provide devices, systems, and methods that enable the implementation of wireless health solutions that may reliably capture and deliver data to any portal or database from any wireless device worldwide, while ensuring that the data will be stored safely. The various embodiments provide a communication system that includes a wireless gateway capable of collecting healthcare data from any of a variety of electronic medical and fitness devices (e.g., such as in the home setting) and sending this data over a wireless communication network (e.g., cellular network) back to a centralized server. The various embodiments provide a platform that is an end-to-end, technology-agnostic cloud-based service that interconnects medical and fitness devices so that the information may be easily accessible by any user device and/or the user's healthcare providers and caregivers.

The various embodiments include a wireless communication hub device (referred to herein interchangeably as a wireless M2M communication hub, virtual personal hub (VPH), communication hub device, wireless communication hub device, 2Net hub, and/or hub) which includes a processor and communication transceivers configured to provide a communication link between electronic medical and fitness equipment which may be in a user's home, office, or medical/fitness facility and an external server which can receive and process medical and/or fitness data. In various embodiments, a wireless communication hub device may communicate data to and from a remote service platform server such that networking of personal medical devices with telemedicine systems and databases may be greatly simplified. In an embodiment, the wireless communication hub device may be a hardware and/or software sub-component of a mobile user device, such as a smart phone, PDA, or a medical device.

In an embodiment, the wireless communication hub device may be configured to support multi-hub electronic medical and fitness device "Roaming" in which an electronic medical and fitness device that is paired with one wireless communication hub can be used with another wireless communication hub device (within or outside a designated primary location), upon the electronic medical and fitness device coming within communication range of the other wireless communication hub. In an embodiment, the specific electronic medical and fitness device operation with the wireless communication hub device may be subject to re-authentication with the new wireless communication hub device. In an embodiment, a "Service All" type wireless communication hub device may allow any electronic medical and fitness device that attempts to connect to the wireless communication hub device to operate as long as a device-type authentication occurs. In an embodiment, tiered license levels may be granted for ad-hoc electronic medical and fitness device to wireless communication hub device pairing and operation (e.g., akin to a 2net Hub "Hotspot"). For example, the wireless communication hub device may be paired with specific electronic medical and fitness devices (e.g., glucometer, blood pressure monitor, weight scale, etc.) with which the wireless communication hub device communicates (referred to herein as hub-to-device associations). The electronic medical and fitness device may be transported to a second location (e.g., a friend's house) that also has a wireless communication hub device that can pick up traffic from the electronic medical and fitness device and communicate the information to a server (i.e., the communication system may be configured such that data from an electronic medical and fitness device may be sent to a back end server (e.g., a service platform server) regardless of the wireless communication hub device in communication with the electronic medical and fitness device). In an embodiment, communications from a back end server (e.g., service platform server) may need to be conveyed to the electronic medical and fitness device, and the back end server may record the establishment of any hub-to-device associations. In this manner, the back end server (e.g., service platform server) may keep track of all the wireless communication hub devices to which an electronic medical and fitness device roams. In an embodiment, the tracked associations between electronic medical and fitness devices and wireless communications hub devices may be used by the back end server (e.g., service platform server) to deliver data to the electronic medical and fitness device. As examples, a service platform server may deliver data to the last wireless communication hub device associated with the electronic medical and fitness device in a list, to all wireless communication hub devices associated with an electronic medical and fitness device on a list, and/or sequentially to each wireless communication hub device in a list until the wireless communication hub device to which the electronic medical and fitness device is currently connected is located.

In an embodiment, the wireless communication hub device may be configured to temporarily save electronic medical and fitness device data in persistent storage before uploading it at scheduled times to a back end server. A data store module (DSM) resident on the wireless communication hub device may organize this stored data in a systematic way, store it persistently in a file system, and perform appropriate file housekeeping operations to manage the stored electronic medical and fitness device data.

Various embodiments may support business to business (B2B) transmission and storage processes using dual databases. In a simple B2B transmission model, the storing of data may be merely to assist in the forwarding of the data to the appropriate partner. In an embodiment, the wireless communication hub device and service platform server may serve as pipelines to transfer data. In an embodiment in which the communication system operates according to a "B2B Transmission+Analytics" model, the wireless communication hub device and/or service platform server may provide analytics to electronic medical and fitness device manufacturers and/or other partners, and may store some or all of the data collected on behalf of an electronic medical and fitness device manufacturer and/or other partner without the electronic medical and fitness device manufacturer and/or other partner having a relationship with the consumer.

In the various embodiments, the service platform server may transmit data for pipeline functions and store some or all of the data for the purpose of performing analytics on identifiable data. In an embodiment, there may be no direct relationship with the consumer. In an embodiment in which the service platform server operator may receive data storage rights for protected health information (PHI) data (e.g., by contract with a business partner), the protected health information may be stored in a secure facility as per contract and the Health Insurance Portability and Accountability Act (HIPAA). In an embodiment in which the service platform server operator receives data storage rights for de-identified data, the original PHI data may be stored in one database, and may be one-way hashed out and stored in another database in de-identified form. In an embodiment, the data may be stored in the dual databases such that data continuity is maintained. In an embodiment, the data may be stored in the database, and backed up for an indefinite period. The data may be housed in a secure PCI environment data center.

In an embodiment, data controls may be implemented based on data rights. In an embodiment, security policies and procedures may implement physical, technical, and administrative safeguards. In an embodiment, data may be encrypted (e.g., via AES 128) and secured end-to-end (e.g., from the wireless communication hub to a service platform server and to a customer's server(s)). In another embodiment, the system may implement a de-identifying data approach in which a chunk of data is received and de-identified (e.g., according to the HIPAA standard). In an embodiment, the system may be configured such that new data is not "added" to the de-identified data, but rather, the de-identification process is re-run on a larger data set.

In the various embodiments, the wireless communication hub device and/or service platform server may select communication partners using a series of white and black lists. As an example, the wireless communication hub device may connect with medical devices listed on a white list of allowed devices and avoid connecting with devices listed on a black list of prohibited devices.

In an embodiment, the wireless communication hub device and an electronic medical and training device may be pre-paired to enable communication between the wireless communication hub device and the electronic medical and fitness device "out of the box" and/or immediately upon discovery. For example, the wireless communication hub device and electronic medical and fitness device may support an ability to be pre-paired in some fashion, such as through proximity discovery or remote association.

In an embodiment, a wireless communication hub device may include a scheduling manager that paces the operations of the wireless communication hub device data collection and upload processes. In an embodiment, the scheduling manager may handle schedule processing for electronic medical and fitness device interaction and uploading to the service platform server. The scheduling manager may provide schedule 'ticking' for interacting with electronic medical and fitness devices in accordance with a radio schedule blueprint. The scheduling manager may provide schedule 'ticking' for uploading data collected from the electronic medical and fitness devices to a service platform in accordance with an upload schedule blueprint. The scheduling manager may notify the service platform server regarding priority conflicts on the schedule blueprint, for example, as soon as the scheduling manager identifies a conflict. In an embodiment, the scheduling manager may interact with a radio manager by notifying the radio manger to start interacting with electronic medical and fitness devices. In an embodiment, the scheduling manager may interact with the data collection manager (DCM) by notifying the DCM of a need to upload data collected from a given electronic medical and fitness device.

In an embodiment, the scheduling manager may include two scheduler algorithm instances that process a schedule blueprint generated by a service platform for both data collection and uploading. In an embodiment, after set up, each schedule algorithm instance may provide callbacks at times calculated from the blueprint to request data, listen for connections, upload collected data from an electronic medical and fitness device (in the schedule algorithm referred to as a "resource"), and/or report that one or more given electronic medical and fitness devices (in the schedule algorithm referred to as a "group") was/were not serviced due to priority and/or radio conflicts. In an embodiment, the scheduling of upload events and the filtering of data may involve the wireless communication hub device acting as a store and forward device based on a schedule, which may be maintained by the service platform server.

In an embodiment, the wireless communication hub device may dynamically be provided installable electronic medical and fitness device drivers. As an example, the wireless communication hub device may connect to the service platform server to receive electronic medical and fitness device drivers for the electronic medical and fitness devices to which the wireless communication hub device may be attached. In an embodiment, the electronic medical and fitness device drivers may be selected based on configuration data maintained at the wireless communication hub device and may not be based on data on the electronic medical and fitness device or specifically requested by the electronic medical and fitness device.

In an embodiment, in order to enable discovery and communication between an electronic medical and fitness device and wireless communication hub device, an electronic medical and fitness device may be associated with one or more wireless communication hub devices and vice versa. In an embodiment, all associations of a wireless communication hub device and electronic medical and fitness devices may be limited to a single customer. In the various embodiments, the service platform (SP) may support different wireless communication hub device and electronic medical and fitness device associations, including a single electronic medical and fitness device explicitly associated with a single wireless communication hub device, multiple electronic medical and fitness devices explicitly associated with a single wireless communication hub device, a specified range of electronic medical and fitness devices associated with one or more wireless communication hub devices, a single electronic medical and fitness communication device associated explicitly with more than one wireless communication hub device, etc. In an embodiment in which two or more wireless communication hub devices are in communication with one or more electronic medical and fitness devices, communication between the wireless communication hub devices and/or electronic medical and fitness devices may be load balanced. In an embodiment, the load balancing of communications may be accomplished in response to one or more messages received from the service platform server. In an embodiment, the wireless communication hub device may be enabled to establish a communication link to an electronic medical and fitness device associated with a different wireless communication hub and communicate data from the another electronic medical and fitness device to the service platform server.

In an embodiment, in support of dynamic discovery of electronic medical and fitness devices by wireless communication hub devices, the service platform server may maintain real time information about the last one or few wireless communication hub devices with which the service platform server communicated. This maintenance of connection information may be achieved using registration and de-registration of electronic medical and fitness device information sent from the wireless communication hub device to the service platform server. The service platform server may receive, analyze and process registration messages (e.g., per xml schema) from each wireless communication hub device, and inform each wireless communication hub device when registration was successful or failed. Additionally, the service platform server may update the registration information and perform necessary registration related procedures (e.g. update new configuration). In the event an electronic medical and fitness device is registering with a new wireless communication hub device, the service platform server may perform necessary de-registration procedures for a wireless communication hub device the electronic medical and fitness device was previously connected too (e.g. configuration update).

In an embodiment, a single, high intensity color (e.g., blue, white or red) light panel may be included in the wireless communication hub device to inform a user of information and provide various indications. Such a light panel may be software controllable through the wireless communication hub device as described in more detail below with reference to FIGS. 15A-15F. For example, the wireless communication hub device may be controlled by software executing on the wireless communication hub device and/or remotely through the service platform server to provide a steady-state ON mode, a flashing mode, combinations of steady-ON and periodic flashing, high intensity brightness, low intensity brightness, various colors (e.g., blue to indicate one thing and red to indicate another), and combinations of any of these conditions or displays. When in a high intensity brightness mode the indicator may be clearly visible to a user from across a room to indicate status or to provide reminders or signals to the user (e.g., pill dosage not taken, reminder service, etc.). In an embodiment, two 3-color, low intensity light emitting diodes (LEDs) may be included in the wireless communication hub device to provide users with various types of information, such as about the status of the device. As examples, the LEDs may serve as an indication that it is time to reorder pills, an indication that it is time to take pills, an indication of a primary alert and/or secondary alert, an indication of an error or fault in the wireless communication hub device, service platform server, or other devices, and/or information exchange between the wireless communication hub device, service platform server, and/or other devices, and/or an indication of a motion detection status when motion sensors and/or personal emergency response systems (PERS) may be communicating with the wireless communication hub device. In an embodiment, two symbols may be included on the front of the wireless communication hub device that light up in different colors to communicate information. In a further embodiment, a bars symbol may be included to show the status of a cellular network signal received by the wireless communication hub device.

Various embodiments support sharing of data in a compliant fashion between electronic medical and fitness devices connected to network established via a wireless communication hub device and between networks established via multiple wireless communication hub devices. Various embodiments may support Continua enabled electronic medical and fitness devices and enable sharing of data for the Continua enabled electronic medical and fitness devices. In an embodiment, the wireless communication hub device may be enabled to communicate via any wireless wide area network (WWAN) available anywhere in the world.

Various embodiments may provide tiered Quality of Service (QoS) and prioritization at multiple levels (e.g. per electronic medical and fitness device, per customer, per electronic medical and fitness device type, per application on the electronic medical and fitness device, etc.). Various embodiments may support the implementation of service level requirements at multiple levels such as (electronic medical and fitness device, customer, application, etc.).

In an embodiment, the service platform may include a data warehouse/analytics hub that enables the collection of multiple and diverse data sets on the service platform that may be data resource pools. Such data resource pools may include, for example, online analytical processing ("OLAP"), third party analytics processing reaching into service platform data sets for a fee, hybrid analytics processing, service algorithms around the data set, including for intelligent devices (e.g., Xprize tri-corder etc.), project results thru 2netAR, long-term storage (eons) facilities for data for Customers/Partners, convergence point for wireless (e.g. Wi-Fi, WWAN, BSA etc.) and wireless healthcare (e.g. biometrics) data, combination with genomics data, combination with biotech data and combinations thereof.

Figure 1B:
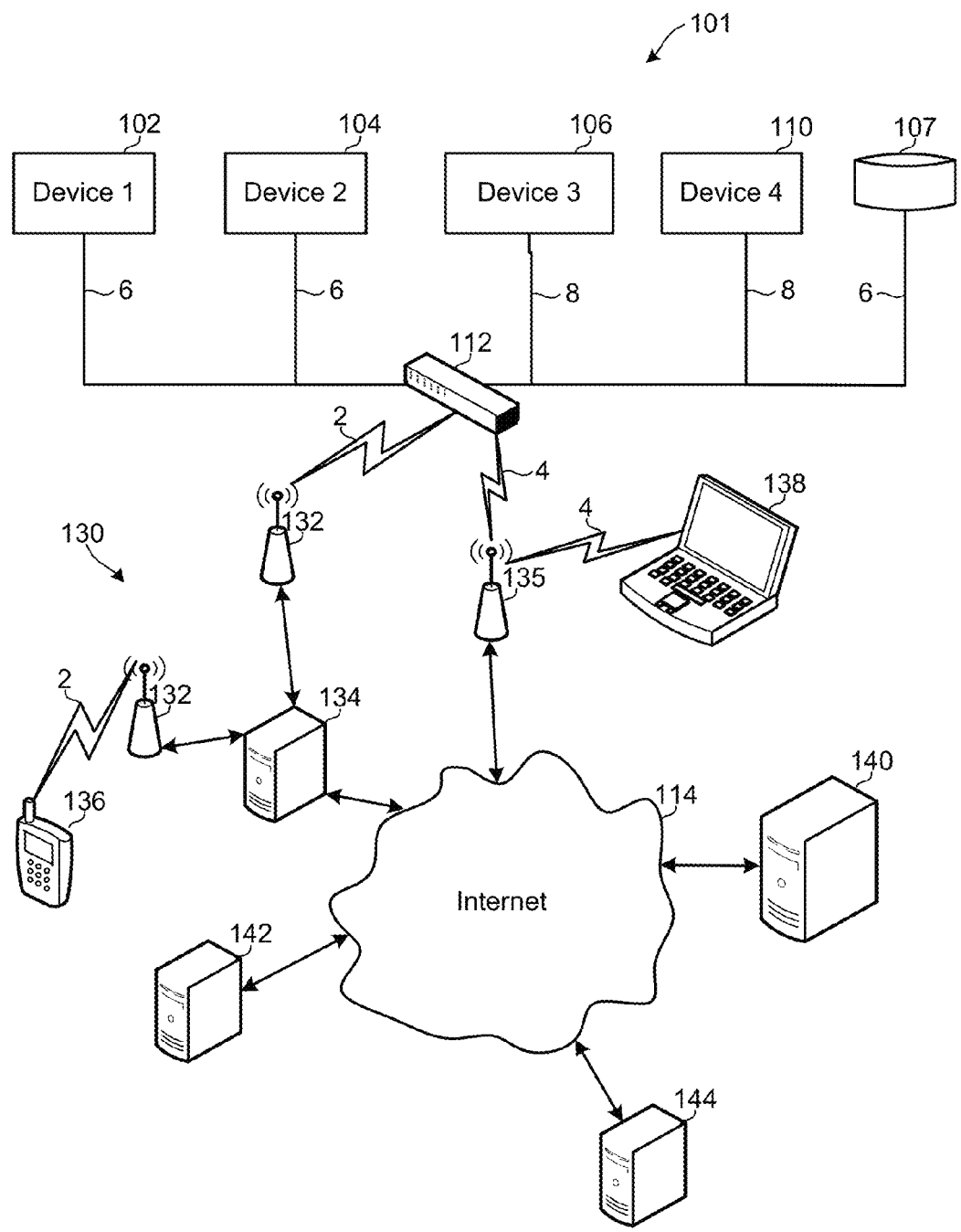

FIGS. 1A and 1B illustrate system components that may be included in two example communication systems 100 and 101 making use of a wireless communication hub device 112 in accordance with the various embodiments. Referring first to FIG. 1A, the wireless communication hub device system 100 may be comprised of two core elements, the wireless communication hub device 112 and a service platform server (e.g., VPH-server) 140. The wireless communication hub device 112 may be attached (e.g., via USB, FireWire, Bluetooth®, ANT+, Wi-Fi, Zigbee®, or other wired or wireless connections) to peripheral devices 102, 104, 106, and 110 (e.g., electronic medical and fitness devices). The wireless communication hub device 112 may include a cellular transceiver enabling it to communicate via cellular signals 2 with a cellular data network 130 including one or more cellular base stations 132 coupled to a cellular data network server 134 coupled to the Internet 114. The service platform server 140 may be coupled to the Internet 114 and provide various services, such as secure access to the wireless communication hub device 112 to enable connecting to the peripheral devices 102, 104, 106, and 110. Additionally, software drivers may be provisioned on a user's personal computer 138 to support direct secure access to the wireless communication hub device 112 and connection to the peripheral devices 102, 104, 106, and 110 via the wireless communication hub device 112 and/or service platform server 140. Additionally, mobile device 136 may communicate via cellular signals 2 with the cellular data network 130 to exchange information with the wireless communication hub device 112 and/or the service platform server 140.

The service platform server 140 may be configured to provide a variety of data and communication services related to wireless communication hub devices, the peripheral devices that may be connected to them, and data that may be obtained from such peripheral devices. One service provided by the service platform server 140 may support user-authenticated discovery and communication between the peripherals connected to the wireless communication hub device 112 and remote computers accessing the peripherals, enabling users to setup accounts that provide access to the peripherals coupled to one or more wireless communication hub devices 112 registered to them (i.e., associated with their account). This service may employ a custom protocol to communicate with particular peripheral devices connected to a wireless communication hub device 112. The services may also handle normal interfacing and device management issues, such as allowing wireless communication hub device 112 to enter an idle mode to minimize over-the-air (OTA) usage charges, and waking up an idle wireless communication hub device 112 when needed. The wireless communication hub device 112 may register connected peripheral devices 102, 104, 106, and 110 with the service platform server 140, making the peripheral devices 102, 104, 106, and 110 available to remote computer(s). The services enabling access to the remote peripheral devices 102, 104, 106, and 110 may be facilitated for any type of computer capable of hosting the software necessary to access the service platform server 140, regardless of whether that computer has the native ability to host locally connected peripheral devices 102, 104, 106, and 110. Thus, accessing computers may include mobile device 136 (e.g., phones, smart phones, etc.) with applications capable of accessing the data from the service platform server 140.

The services may also include "machine to machine" (M2M) applications where the remotely accessing computer supports no direct human interaction. An example is storage of private user email data from a service provider on a remotely connected data storage device 107 owned and managed by the user. Another service may be the setup and configuration of the wireless communication hub device 112, including support for the addition and removal of connected peripherals, and connectivity by remote computers. Another service may be user-based authentication using mechanisms that can be used to associate an authenticated user and computer with the wireless communication hub device 112 and its connected peripherals.

In an embodiment, data transmitted between the wireless communication hub device 112, the service platform server 140, and computers may be encrypted to further enhance the privacy of the transmitted data. In a further embodiment, intelligence in the wireless communication hub device 112 and the service platform server 140 may enhance the efficiency of wireless data transmission, facilitating an appearance of persistence in the connection to the peripherals while minimizing wireless/cellular network overhead. In this manner, the service platform server 140 may "host" the latest data or status from peripheral devices 102, 104, 106, and 110 for access by computers enabling the appearance that the peripheral devices 102, 104, 106, and 110 are continuously connected to a computer accessing the peripherals via the service platform server 140, without the need to maintain a constant communication link between the peripheral device 102, 104, 106, and 110, wireless communication hub device 112, and service platform server 140. Depending upon the nature of the peripheral device 102, 104, 106, or 110, data provided by the peripheral device 102, 104, 106, or 110, status states of peripheral device 102, 104, 106, and 110, or current circumstances, establishment of an active communication link to transmit updated data from the peripheral device 102, 104, 106, or 110 may be accomplished on an as-needed basis. By configuring the wireless communication hub device 112 and the service platform server 140 with intelligence, a wide variety of peripheral applications may be supported while minimizing communication costs.

Third-party servers 142, 144 may communicate with the service platform server 140 via the Internet 114 to receive data from or communicate data to peripheral devices 102, 104, 106, and 110 connected to the wireless communication hub device 112.

While FIG. 1A illustrates a single wireless communication hub device 112 interfacing with multiple devices, other embodiments may be implemented in which a single wireless communication hub device 112 interfaces with a single device. Also, as discussed in more detail below, a number of wireless communication hub devices 112 may also intercommunicate, with each, some, or all of the wireless communication hub devices 112 interfacing with multiple devices, thereby forming a many-to-many hub/device communication network.

FIG. 1B illustrates that, in an embodiment, the wireless communication hub device 112 may include a wireless transceiver capable of communicating with local wireless networks, such as a Wi-Fi network, as illustrated in communication network 101 shown in FIG. 1B. Similar to the system illustrated in FIG. 1A, the wireless communication hub device 112 may include a cellular transceiver enabling it to communicate via the cellular signals 2 with a cellular data network 130. Additionally, the wireless communication hub device 112 may include a local area wireless transceiver (e.g., a Wi-Fi transceiver) enabling it to also communicate with a local wireless network via a wireless router 135. In this embodiment, the wireless communication hub device 112 may be accessed from a personal computer 138 via the wireless router 135 through local wireless transmissions 4. Additionally, the wireless communication hub device 112 may access the Internet 114 via local wireless transmissions 4 with the wireless router 135 when the wireless router 135 includes a connection to the Internet 114 (as is typical in many household wireless network implementations). Communications with and among the various peripheral devices 102, 104, 106, and 110 and the service platform server 140 may proceed in this embodiment as described above with reference to FIG. 1A.

FIG. 1C illustrates system components that may be included in the communication system that is enabled by the various embodiments. As illustrated in FIG. 1C, a variety of electronic medical or fitness devices 103, 105, 109 (e.g., a blood pressure sensor, a thermometer, and a scale) may transmit data via a local network 105 (such as a local area wireless network (e.g., Wi-Fi, Bluetooth, Zigbee, and ANT+) or wired network (e.g., USB)) to the wireless communication hub device 112, which packages the data encrypted and transmits it via a wireless communication link, such as a wireless wide area network 130 (e.g., 3G cellular wireless network), to a service platform server 140 where the data may be unpacked and stored in a database or transferred to other systems where the data may be stored and processed. FIG. 1C also provides a high-level illustration of the flow of data from various electronic medical and fitness devices through the wireless communication hub device over three short range radio protocols. The various embodiments, the data collected from each device may be encrypted and securely managed from end-to-end so that each data set is stored in its own, perhaps proprietary format, by the device and by technology. In this manner, the wireless communication hub device acts as a gateway that securely enables wireless transport of data or information from the various electronic medical and fitness devices through the service platform server to the caregiver or provider's servers and databases located in the Internet cloud.

For example, when a medical device, such as a blood pressure monitor 103, thermometer 105, or weight scale 109, is in the vicinity of the wireless communication hub device 112, the data received from that device (e.g., blood pressure readings, wait, etc.) may be sent to databases within the Internet cloud. Additionally, the system may enable caregivers and medical facilities to send a command or diagnostic message to a medical or fitness device within the patient's home, in which case such commands can be routed via the Internet to the service platform server which can then transmit them via the established wireless communication link to the wireless communication hub device, which can then communicate them to the intended medical or fitness device.

Figure 1D:
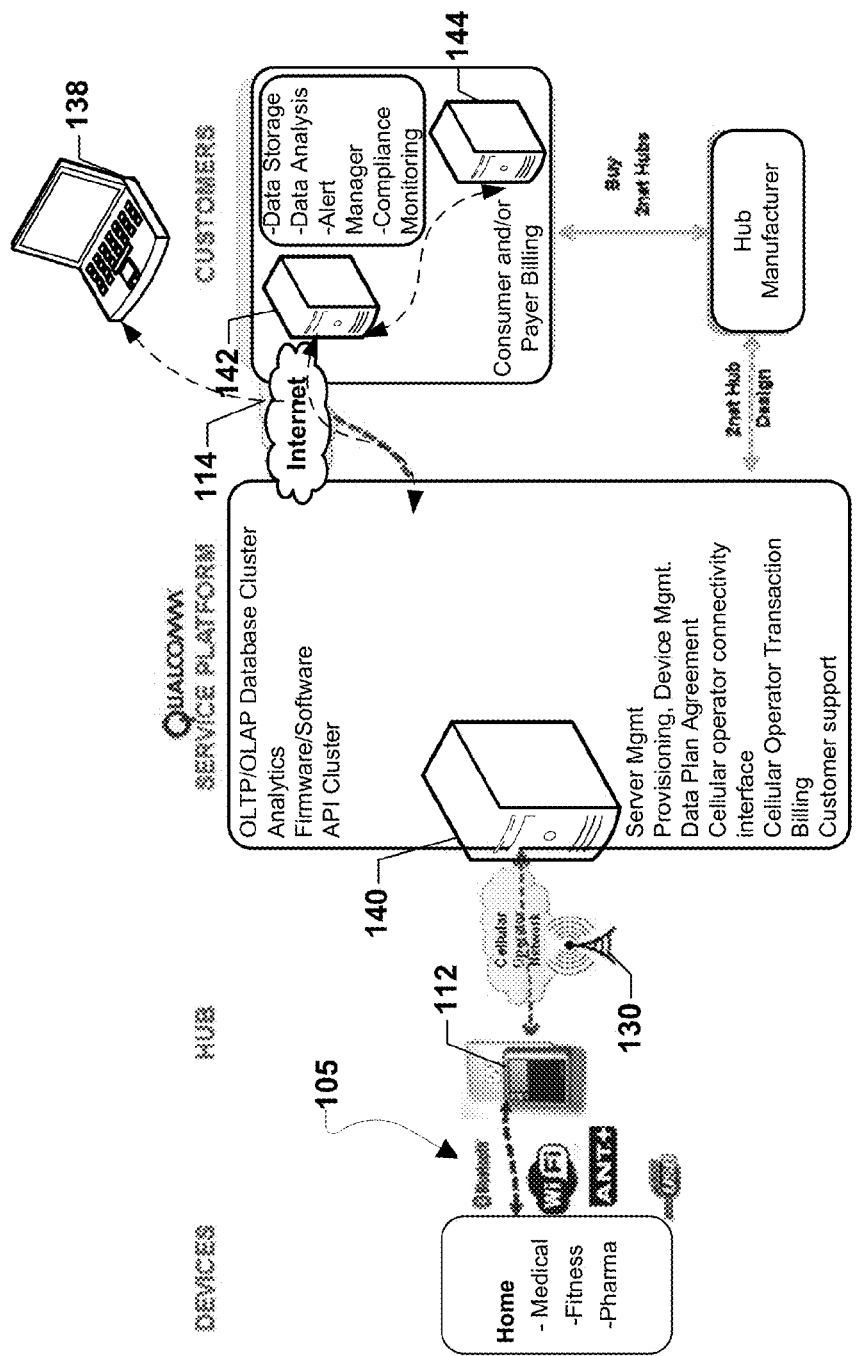
Figure 1E:
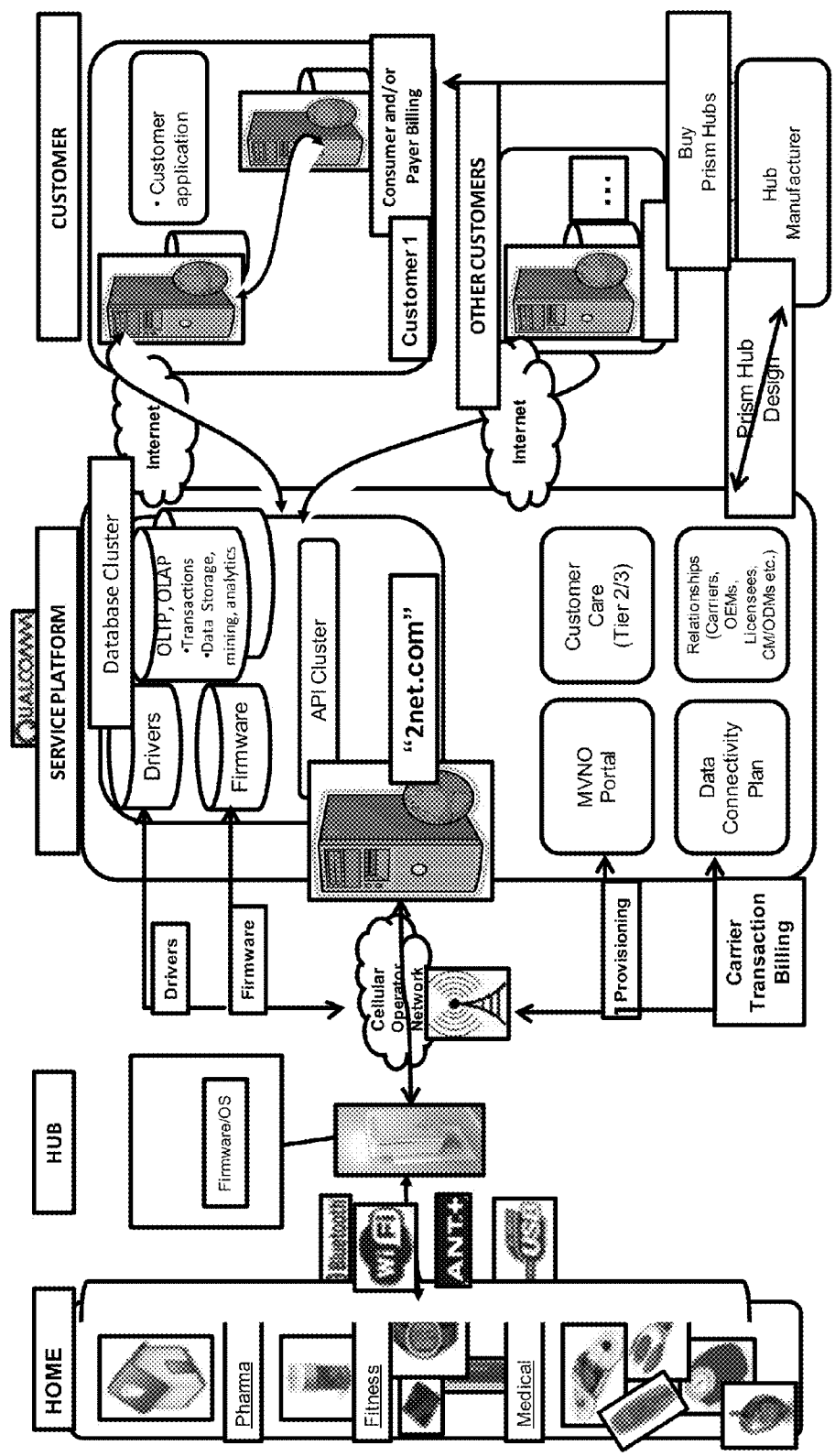

FIG. 1D illustrates some of the functionality and functional modules that are implemented within the service platform server 140, as well as functions that may be accomplished by customer and caregiver servers 142, 144 receiving data via the Internet from the service platform server 140. FIG. 1E illustrates the communication system in more detail.

As illustrated in FIGS. 1D and 1E, the service platform server 140 may include memory and maintain its own database for storing or buffering data received from various medical and fitness devices. The service platform server 140 may also perform some analytics on the received data, such as comparing data to alarm settings to determine whether any urgent actions or alarms should be communicated to the patient or to healthcare providers. The service platform server 140 may also be configured with provisioning and device management software, data plan agreement management software, cellular operator connectivity interface functionality, cellular billing functionality, and customer support services. The references to 3G cellular wireless networks herein are for example purposes only. In some embodiments, lower-cost "2G" components and networks may be utilized. However, in order to remain compatible with cellular wireless networks as cellular providers transition their systems to higher capability LTE, 3G, and 4G networks, embodiments may implement LTE, 3G and/or 4G radio technology and communication protocols.

The wireless communication hub device system 100 may include two core elements, the wireless communication hub device 112 and a service platform server ("2net Service Platform" in the figures) 140. The wireless communication hub device 112 may be sold to consumers and may be attached by USB, FireWire or wireless communication links to wireless electronic medical and fitness devices 103, 105, 109. The service platform server 140 is coupled to the Internet 114 and provides a variety of service platform services, such as secure access to the wireless communication hub device 112 to enable receiving data from and connecting to the electronic medical and fitness devices 103, 105, 109.

The wireless communication hub device 112 may connect to electronic medical and fitness devices 103, 105, 109 via direct (i.e., wired) connections, such as a USB connection, a FireWire connection, or local area network connection (e.g., Ethernet), as well as wireless communication links, such as Bluetooth, Wi-Fi, ZigBee and ANT+ wireless communication networks.

The service platform server 140 may be configured to provide a variety of data and communication services related to wireless communication hub devices 112, the electronic medical and fitness devices 103, 105, 109 that may be connected to them, and data that may be obtained from such electronic medical and fitness devices 103, 105, 109. Such services are generally referred to herein as "service platform services." One service platform service provided by the service platform server 140 may support user-authenticated discovery and communication between the electronic medical and fitness devices 103, 105, 109 connected to the wireless communication hub device 112 and remote computer(s) 138 accessing the electronic medical and fitness devices 103, 105, 109. This capability may enable health care providers and medical data users to setup accounts that provide access to the electronic medical and fitness devices 103, 105, 109 coupled to one or more wireless communication hub devices 112 registered to them. Authentication may be accomplished by the service platform server 140 with respect to the wireless communication hub device 112, electronic medical and fitness devices 103, 105, 109 coupled to the wireless communication hub device 112, a computer 138 accessing the service platform server 140 via the Internet 114, and/or the user of a computer 138 using any known device and user authentication methods. This service may employ a custom protocol to communicate with particular electronic medical and fitness devices 103, 105, 109 connected to a wireless communication hub device 112.

The service platform services may also handle normal interfacing and device management issues, such as allowing wireless communication hub devices 112 to enter an idle mode to minimize over-the-air (OTA) usage charges, and waking up an idle wireless communication hub device 112 when needed. Like the wireless communication hub device's 112 handling of electronic medical and fitness devices 103, 105, 109, the data protocol between the service platform server 140, the wireless communication hub device 112, and the accessing computer(s) 138 can be generic, enabling support for almost any current and future electronic medical and fitness devices 103, 105, 109 or server based data system. The wireless communication hub device 112 may register connected electronic medical and fitness devices with the service platform server 140, making electronic medical and fitness devices available to authorized remote servers 142, 144 and computers 138 (e.g., a physician's personal computer).

The service platform provides client services enabling access to the remote electronic medical and fitness devices 103, 105, 109 which may be facilitated for any type of computer 138 capable of hosting the software necessary to access the service platform server, regardless of whether that computer 138 has the native ability to host locally connected electronic medical and fitness devices 103, 105, 109. Thus, accessing computer(s) 138 may include mobile devices (e.g., phones, smart phones, etc.) with applications capable of accessing the data from the service platform server 140. The service platform services may also include "machine to machine" (M2M) applications where the remotely accessing computer 138 supports no direct human interaction.

Another service of service platform services may be the setup and configuration of the wireless communication hub device 112, including support for the addition and removal of connected electronic medical and fitness devices 103, 105, 109, and connectivity by remote computers 138 (e.g., the personal computer of an attending physician). For example, an attending physician may login to the service platform service, identify the physician's patient, authenticate himself, and thereby gain access to medical data from electronic medical devices within the patient's home so as to determine the current condition of the patient. The various embodiments enable this telemedical communication system to be established simply by plugging a wireless communication hub device 112 into a power outlet within the patient's home and providing the physician with the URL for the service platform server 140.

Another service of the service platform services may be user-based authentication using mechanisms that can be used to associate an authenticated user and computer 138 with the wireless communication hub device 112 and its connected electronic medical and fitness devices 103, 105, 109. Data, particularly personal information and medical data, transmitted between the wireless communication hub device 112, the service platform server 140 and computers 138 may be encrypted by the wireless communication hub device 112 to enhance the privacy of the transmitted data and comply with the HIPAA regulations.

The service platform services may also enable accessing electronic medical and fitness devices 103, 105, 109 from any Internet-connected computer (e.g., web kiosks) when a user is away from the user's personal computer 138. The service platform services may also include storage, relaying and utilization of data obtained from electronic medical and fitness devices 103, 105, 109 connected to a wireless communication hub device 112. Such utilization of electronic medical and fitness device data made possible by the various embodiments may enable a variety of useful applications.

In a further embodiment, intelligence in the wireless communication hub device 112 and service platform server 140 may enhance the efficiency of wireless data transmission, facilitating an appearance of persistence in the connection to the electronic medical and fitness devices 103, 105, 109 while minimizing wireless/cellular network overhead. In this manner, the service platform server 140 may "host" the latest data or status from electronic medical and fitness devices 103, 105, 109 for access by computer(s) 138 enabling the appearance that the electronic medical and fitness devices 103, 105, 109 are continuously connected to a computer 138 (e.g., a physician's personal computer) accessing the electronic medical and fitness devices 103, 105, 109 via the service platform server 140. This appearance of continuous connectivity may be achieved without the need to maintain a constant communication link between the electronic medical and fitness devices 103, 105, 109, the wireless communication hub device 112 and the service platform server 140. Depending upon the nature of the electronic medical and fitness device 103, 105, 109, data provided by the electronic medical and fitness device 103, 105, 109, status states of electronic medical and fitness device 103, 105, 109, or current circumstances, establishment of an active communication link to transmit updated data from the electronic medical and fitness device 103, 105, 109 may be accomplished on an as-needed basis. By configuring the wireless communication hub device 112 and the service platform server 140 with intelligence, a wide variety of electronic medical and fitness device 103, 105, 109 applications may be supported while minimizing communication costs.

As mentioned above, users' personal computer(s) 138 may be provisioned with wireless communication hub device driver software modules. The basic function of such driver software may be to support transparent access to electronic medical and fitness devices 103, 105, 109 connected to a wireless communication hub device 112. Such driver software may provide virtualized access to the USB or FireWire port across a local network or a wide area network (e.g., the Internet 114), and may be used to support secure access to wireless communication hub devices 112 through the service platform server 140. Such driver software may be made available from a service platform services website (such as may be hosted by the service platform server 140), and may include the necessary encryption keys to access specific electronic medical and fitness devices 103, 105, 109 coupled to a wireless communication hub device 112 associated with a patient. Such encryption keys may be generated during the electronic medical and fitness device 103, 105, 109 setup, registration and configuration phase.

Unlike a common single physical cable connection between the electronic medical and fitness devices 103, 105, 109 and an attached computer 138, the virtual nature of the connectivity to the electronic medical and fitness devices 103, 105, 109 via the wireless communication hub device 112 allows more than a single computer to access the same remote electronic medical and fitness device 103, 105, 109 at a given time. Likewise, the electronic medical and fitness devices 103, 105, 109 connected to the wireless communication hub device 112 may be accessed by a number of different remotely accessing computers 138. Further, the connectivity and access permissions configuration may be changed at any time by remote computers 138 interfacing with the service platform server 140.

Third-party servers 142, 144 may communicate with the service platform server 140 via the Internet 114 to receive data from or communicate data to electronic medical and fitness devices 103, 105, 109 connected to a wireless communication hub device 112.

In order to accommodate different data structures, communication protocols, and driver software, the wireless communication hub device 112 may communicate with a remote server 140 that can provide a service platform of functionalities. Such a service platform server 140 may then facilitate the communication of data between users of the electronic medical and fitness device data on one side and the details of communicating with and controlling a wide variety of electronic medical and fitness devices on the patient's end.

In an embodiment, the platform may be configured to include and/or support any or all of: a wireless communication hub device 112 (e.g., a 2Net™ hub) that operates as a standalone U.S. Food and Drug Administration (FDA) registered external device; electronic medical and fitness devices with an embedded cellular component; mobile phones; and application programming interfaces (APIs) that provide service platform integration between the main platform to partner service platforms.

In an embodiment, the wireless communication hub device 112 may serve as an information highway for machine-to-machine (M2M) health care devices into and out of the home. The wireless communication hub device 112 may be a compact plug-and-play gateway comprised of three short-range radios that collect medical device data from electronic medical and fitness devices and biometric sensors, and sends that data via its wide area network (WAN) cellular module to a cloud-based service platform. In an embodiment, the wireless communication hub device 112 may be one of the four gateways used to access the platform.

In an embodiment, the platform may be configured to enable electronic medical and fitness device partners to un-tether data from their electronic medical and fitness devices via a process that may include: a data acquisition step (in which data is obtained from a patient's electronic medical and fitness device through several potential gateways, such as the wireless communication hub device 112, a mobile phone, a cellular-enabled medical or fitness device or a partner service platform); a data transmission step (in which the data may be encrypted and uploaded to a cloud over a secure 3G connection); and a data storage/access step (in which after the cloud has received the transmission, patient data is decrypted and transmitted to the manufacturers' interface of choice for the patient, physicians, payers, and/or other partners to access).

In an embodiment, the system may be configured such that an end-to-end encryption process leverages network operations, data centers, and cloud services that allow electronic medical and fitness devices to securely and reliably share data with approved healthcare providers, payers, and patients in a HIPAA-compliant and FDA-compliant manner. In an embodiment, the platform (e.g., the 2Net Platform) may be ISO 13485 certified, meaning it may align with the quality requirements of U.S. and international regulatory agencies in the healthcare industry.

Figure 1F:
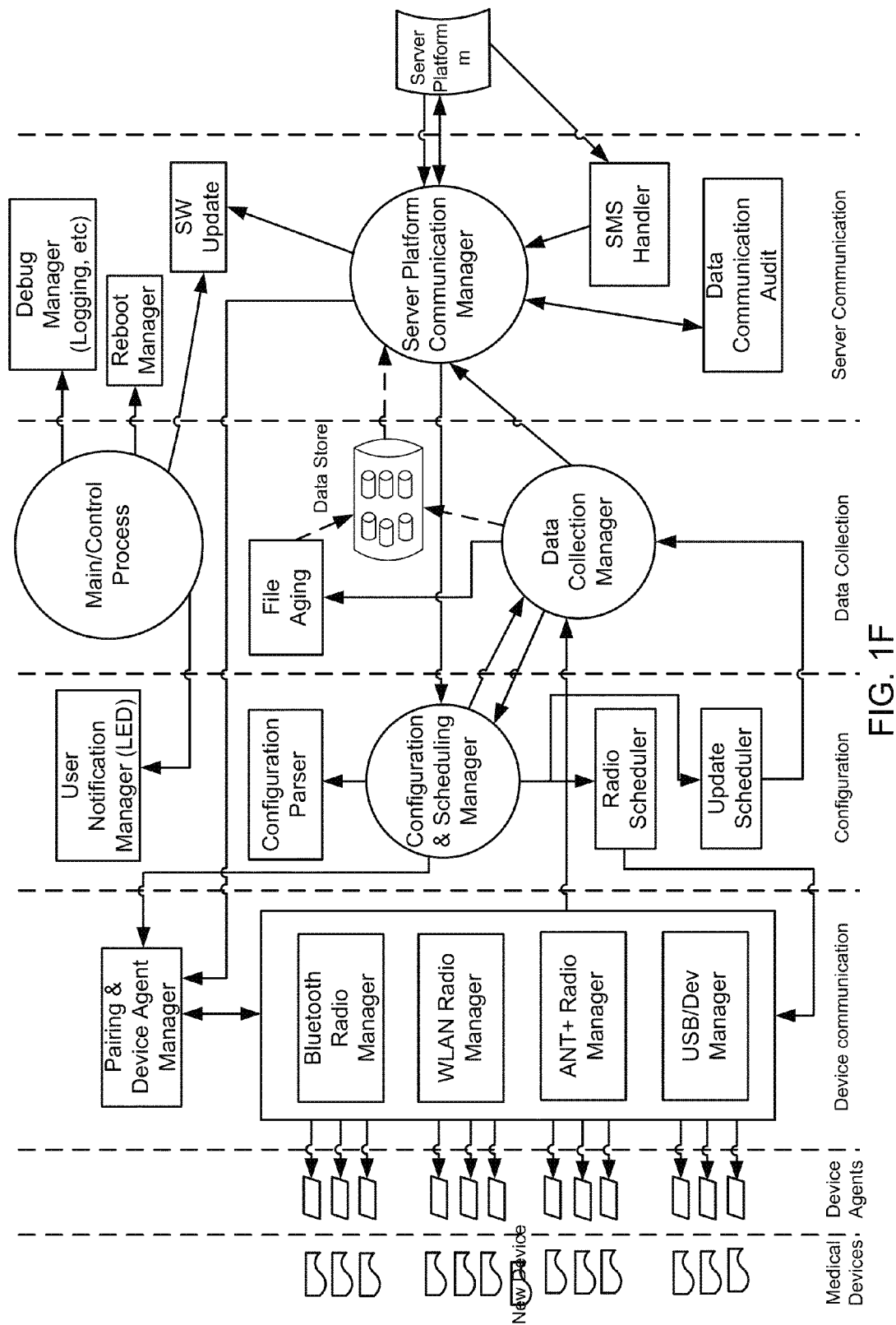

FIG. 1F illustrates logical components and data flows of an example wireless communication hub device 112 suitable for implementing the various embodiments. As mentioned above, the wireless communication hub device 112 may be configured such that it delivers a new dimension of short-range radio flexibility, security, and seamless connectivity, while serving as an information highway for machine-to-machine (M2M) connectivity for electronic medical and fitness devices into and out of the home. In an embodiment, the wireless communication hub device 112 may be a FDA-listed, compact plug-and-play gateway that supports Bluetooth, Bluetooth Low Energy, Wi-Fi and ANT+ local area radio protocols. The wireless communication hub device 112 may include a USB interface and support for Continua compliant devices that collect data from electronic medical and fitness devices and biometric sensors, and also support 3G and 2G cellular communications to send the data wirelessly to the service platform server 140. The wireless communication hub device 112 may include a variety of wireless communication transceivers, such as Wi-Fi, Bluetooth, Zigbee, and ANT+ transceivers, in order to enable the wireless communication hub device 112 to communicate with electronic medical and fitness devices that may do not comply with the same communication standard. The wireless communication hub device 112 may include processors and communication transceivers configured to connect to cellular and/or Wi-Fi communication networks to provide one side of a communication link, and to electronic medical and fitness devices and personal sensors via wireless (e.g., Bluetooth®) and wired (e.g., USB) local communication links on the other side of the communication link.

In an embodiment, the wireless communication hub device 112 may serve as a connection gateway between a variety of different types of electronic medical and fitness devices and personal sensor devices which can only communicate locally, and remote facilities and data storage systems which can use the data of such devices but are only coupled to the Internet.

The wireless communication hub device 112 may be a standalone data collection engine that is installed in the user premises and works remotely over the air (OTA) without requiring any end user intervention. The wireless communication hub device 112 may communicate with (one-to-many) approved electronic medical and fitness devices at designated times as indicated by a backend server (e.g., service platform server 140). The wireless communication hub device 112 may collect and store data from devices locally, in persistent storage, and may at configured intervals upload the data securely to the service platform server 140 or another backend server.

In an embodiment, the wireless communication hub device 112 may be configured to support multi-hub device "Roaming" in which an electronic medical and fitness device that is paired with one wireless communication hub device 112 can be used with another wireless communication hub device 112 (within or outside the primary location), if the electronic medical and fitness device comes into the proximity of the other wireless communication hub device 112. The specific electronic medical and fitness device operation with the wireless communication hub device 112 may be subject to re-authentication with the new wireless communication hub device 112. In certain cases, a "Service All" type wireless communication hub device 112 may allow any electronic medical and fitness device that wants to connect to the wireless communication hub device 112 to operate as long as there is a device-type authentication. In an embodiment, tiered license levels may be granted for ad-hoc electronic medical and fitness device to wireless communication hub device 112 pairing and operation (e.g., akin to a 2net Hub "Hotspot"). For example, the wireless communication hub device 112 may be paired with specific electronic medical and fitness devices (e.g., glucometer, blood pressure monitor, weight scale, etc.) with which it communicates (called hub-to-device associations). The electronic medical and fitness device may be transported to a second location (e.g., a friend's house) that also has a wireless communication hub device 112 (e.g., a second wireless communication hub device 112) that can pick up traffic from the electronic medical and fitness device and communicate the information (i.e., the system may be configured such that same data is sent to the back end regardless of the wireless communication hub device 112 used). Since communications from the back end may need to be conveyed to the electronic medical and fitness device, and the existence of the hub-to-device associations, the system may keep track of all the wireless communication hub devices 112 to which an electronic medical and fitness device roams such that the system delivers the data to the last wireless communication hub device 112 in the list, to all wireless communication hub devices 112 in the list, or sequentially to each wireless communication hub device 112 in the list until the correct wireless communication hub device 112 is located. In an embodiment, the service platform server 140 and/or the wireless communication hub device 112 may infer co-location of the wireless communication hub device 112 with another wireless communication hub device 112 without the benefit of location data.

Figure 1G:
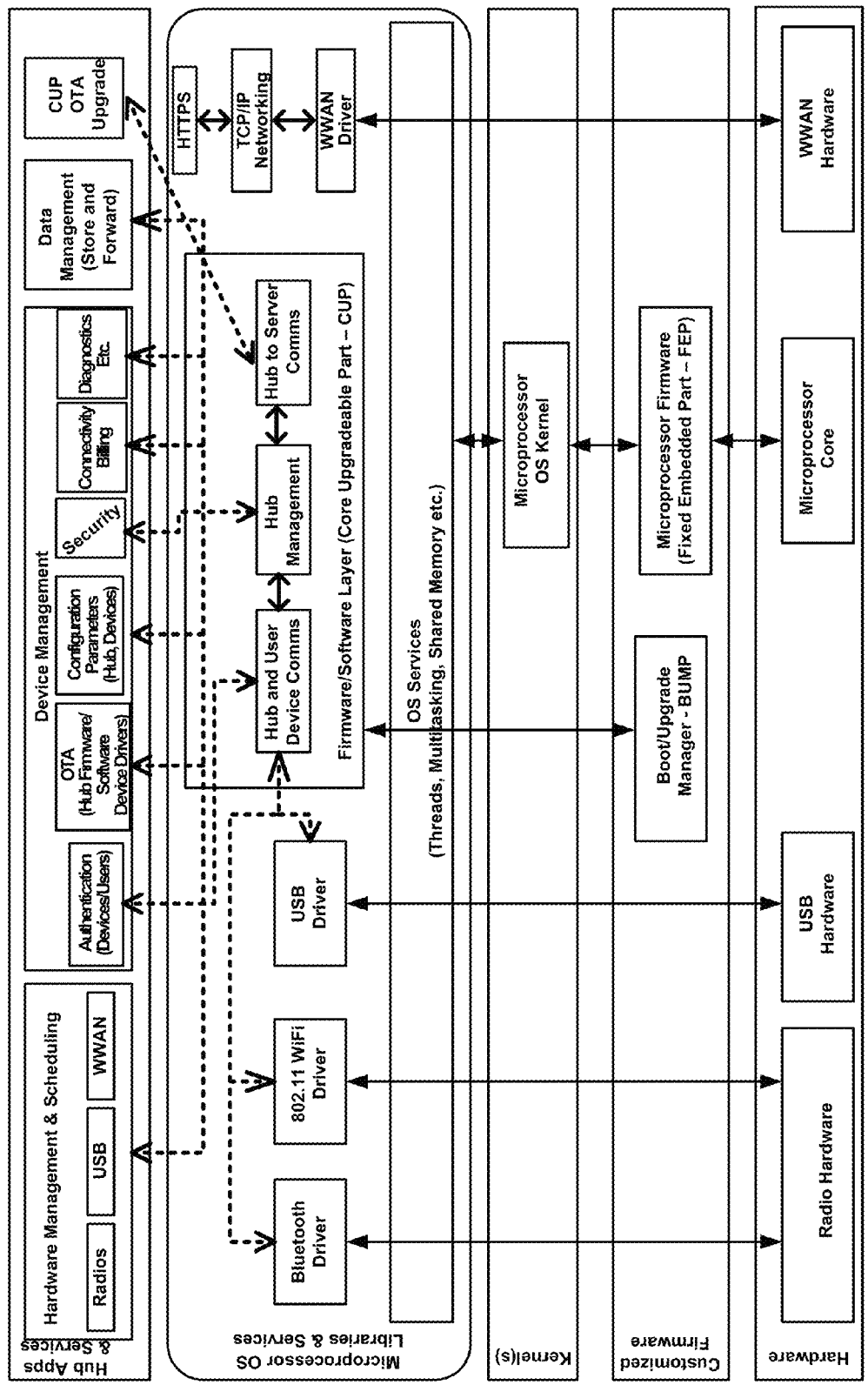

As illustrated in FIGS. 1F and 1G, the wireless communication hub device 112 may utilize the API & features provided by an existing or modified application framework (e.g., Android Application Framework) and may be designed as a set of modular entities that interact with each other. Each module may group tasks together based on similarity of purpose or efficiency of communication. Each module may run in an independent execution context (e.g., thread or process) or may be grouped together with other modules for system optimization. Each module may be divided into subtasks, with compute intensive or I/O event driven tasks running in separate threads so as to not bottleneck the rest of the applications response. The wireless communication hub device 112 may support various short range (ISM) Wireless radios (e.g., Bluetooth®, WLAN 13, ANT+, etc.) commonly in use in the health device industry. In an embodiment, the wireless communication hub device 112 may be configured to support future wireless protocols and radios via a built-in USB Host port. In an embodiment, all radio support and functionality may be enclosed inside a radio manager module. The wireless communication hub device application may interact closely with a backend server to control and coordinate its operations.

The backend server may control the wireless communication hub device's 112 configuration and operation using a configuration file that specifies operating parameters.

The wireless communication hub device 112 may be implemented as a multi module system implemented as several services, with each service assigned a specific task and a set of responsibilities. A hub control module (HCM) may be responsible for starting all the other system modules and after that, periodically verifying that they are alive and running. The HCM may provide additional services like logging facilities, user notification, system reboot handling, and software update.

In an embodiment, the functions provided by the HCM may include system monitoring (e.g., HCM may bring up, monitor and shut down the rest of the modules in the system), user notification management (e.g., HCM may expose functionality for accessing the wireless communication hub device 112 notification LEDs), debug logging management (e.g., HCM may provide a system-wide Logging API on top on the Android Log facility that allows saving trace messages to permanent storage files and also simultaneously sending it to Android's logcat), reboot management (e.g., HCM may allow the system to perform an orderly reboot when needed), and software update management (e.g., HCM may provide system and additional software (i.e., device Agents) update management so that updates can be installed safely and rolled back if necessary).

In an embodiment, the HCM may be an Android Service that utilizes a messenger API to communicate with other module services after binding to each of them. Each controlled module service may be represented in the control module as an instance of a specialized enum class that provides the context of interaction for the controlled service. The specialized enum class may implement a simple state machine that represents the stages of the interaction with the controlled service. It may also provide the necessary connection listener and remote handler reference for interacting with the controlled service.

In an embodiment, the wireless communication hub device 112 may collect data from connected electronic medical and fitness devices, store it locally for period of time, and then upload this data to the service platform server 140. The wireless communication hub device 112 may also interact periodically with the service platform server 140 to receive schedule information, download configuration parameters, electronic medical and fitness device agents, etc. The wireless communication hub device 112 may wake up upon receipt of SMS messages or commands from the service platform server 140 instructing the wireless communication hub device 112 to perform certain operations. These server interactions may flow through the server communication module (SCM), which may act as the single point of contact between the wireless communication hub device 112 and the service platform server 140.

The SCM may handle all server communication aspects and use the HBC API for the communication process. The SCM may initiate transfers of stored medical data to the backend server. The SCM may initiate downloading of content (e.g., configuration files, device agents, etc.) and coordinate passing them to the appropriate modules that need to operate on them. The SCM may maintain a persistent list of data content that needs to be uploaded and may maintain this information while taking account of retries, reboots, etc. The SCM may keep track of upload and download failures and retries communication till the data transfer is successful.

In an embodiment, the SCM may be implemented as an Android Service which is started by the HCM. On startup, SCM may initialize internal data structures and perform a sanity check on the upload file directory. The SCM may detect unaccounted files by comparing all files in the directory against a persistent list it maintains. If any files are found, it may mark them for upload and transfer them out at the first opportunity. The SCM may register an intent for receiving SMS messages, and may expose a messenger object to each module that "binds" to it. When a run command is received, the SCM may start processing messages.

Internally, the SCM may create a reference to the HBC API library. The SCM may create a worker thread that may handle all heavy duty tasks. The main SCM thread may delegate such tasks to the worker thread and the worker thread may perform these operations in a separate thread and inform the main thread about the result. This may ensure that the main SCM thread is always ready and free to process and receive/send messages to other modules. The SCM may also maintain a persistent list of files for performing a sanity check.

In an embodiment, the wireless communication hub device 112 may be enabled to temporarily save electronic medical and fitness device data in persistent storage before uploading it at scheduled times to the service platform server 140. A data store module (DSM) may organize this data in a systematic way, store it persistently in a file system, and perform appropriate file housekeeping operations to manage the data. This DSM may communicate with other wireless communication hub device 112 modules by posting and receiving events and messages.

The tasks performed by the DSM may include storing electronic medical and fitness device data (e.g., may accumulate data for each device in files, may first look to see if a file is already present for the specified device, and if so, open it and append data to the file, and otherwise create a new file as per the device's ID, collection time and other parameters), triggering data transfers (e.g., when the scheduling manager sends an upload request, the DSM may complete file operations and transfer files containing data for the requested device to the SCM), monitoring file size (DSM may automatically trigger a transfer if the device's file size exceeds a pre-configured limit by checking the device file size during medical device data writes to the file system and moving files as needed), checking for file aging (e.g., using appropriate parameters provided by the configuration manager the DSM may monitor the file system (using timers) for devices that don't send data for extended periods of time, and detect and promptly upload "aged" data files), maintain file system integrity (e.g., the DSM may keep track of the integrity of all created files by writing file names to a persistent list, monitoring this list, checking the list against the file system after reboots, and uploading discrepancies).

The wireless communication hub device 112 may support multiple short range radios, operating in the ISM band to enable it to communicate with different types of wireless electronic medical and fitness devices. The radio manager module may abstract communication with these multiple radios and provide a common interface allowing the rest of the wireless communication hub device ecosystem modules to operate as if they are interacting with a single data collection entity. This reduces the complexity in these modules (and in the wireless communication hub device system as a whole) and allows for radio interaction to be localized to the radio manager module.

To be able to interact with an electronic medical and fitness device, the wireless communication hub device 112 may be configured to have knowledge of the electronic medical and fitness devices' communication internals and protocols. This information may be provided to the wireless communication hub device 112 as a packaged entity called "device agent", either by the electronic medical and fitness device manufacturers or may be developed in close interaction with the electronic medical and fitness device manufacturers. This may decouple the wireless communication hub device 112 engineering effort from electronic medical and fitness device dependencies and allow the wireless communication hub device 112 to support any electronic medical and fitness device that may conform to a device/agent paradigm.

The radio manager may provide a control framework to coordinate the operation of supported short range radios and interfaces to access the radio communication functionality necessary to be able to identify, authenticate, and interact with electronic medical and fitness devices. As mentioned, by design, the radio manager may neither contain any intelligence nor attempt to store any information that pertains to the internals of the electronic medical and fitness device. This intelligence may be encapsulated inside a device agent paired with that electronic medical and fitness device. The radio manager may enable the relevant device agent to talk to the electronic medical and fitness device the wireless communication hub device 112 may be asked to communicate with.

The common radio interface exposed by the radio manager to external modules may accept commands that are internally de-multiplexed to individual radio manager instances that control each supported radio. Each one of these internal radio interfaces may be responsible for ensuring that the managed radio is properly operational and is able to perform device data collection on the schedule communicated by the wireless communication hub device scheduling module.

Each radio instance may include the following functionality: radio housekeeping (e.g., radio manger instance may take care of Radio Power ON, OFF and reset to control the radio, maintaining Radio's state and configuration to ensure proper operation); device identification (e.g., radio manager instance may communicate directly the first time an electronic medical and fitness device is visible to the wireless communication hub device 112 and gets its hardware identification parameters to determine future communication); radio access (e.g., radio manager instance may expose a set of interfaces to allow controlled access to the corresponding radio functionality); device communication context (e.g., radio manager instance may provide a context that allows activation of the relevant device agent needed to communicate with a corresponding medical device); device access monitoring (e.g., radio manager instance may monitor medical device access and intervene as necessary to make sure that hub operation and security are not compromised); and device data collection (e.g., radio manager instance may provide context and route collected device data to the data collection module for aggregation and upload to the service platform server 140)

In an embodiment, the service platform server 140 may control wireless communication hub device 112 operations at a macro level using a set of pre-defined parameters sent to the wireless communication hub device 112 in a configuration file. This file may get sent to the wireless communication hub device 112 soon after a wireless communication hub device's 112 initial startup and after that as many times as needed. Aspects of the wireless communication hub device 112 operation may be controlled, including the wireless communication hub device's 112 electronic medical and fitness device interaction, data collection (radio), and upload (server communication) frequency, etc. In an embodiment, the complete list of controlled parameters may be part of a wireless communication hub device 112 configuration file. These parameters may be packaged in a pre-defined XML format file and exchanged using wireless communication hub device 112/service platform server 140 interaction protocols that are implemented robustly by both sides to ensure secure and fail safe operation.

A configuration & scheduling module (CSM) may be an entity on the wireless communication hub device 112 side that is responsible for receiving, processing, and applying these updates and driving the operation of the wireless communication hub device 112. The CSM may be implemented by closely related components.

In an embodiment, a configuration manager may handle the configuration management and a scheduling manager may tick or pace the operation of the hub data collection and upload.

The configuration manager (which may be a portion of the configuration & scheduling module) may be responsible for managing, storing and sharing configuration parameters received from the service platform server 140 with the rest of the wireless communication hub device 112 modules. Configuration parameters controlling wireless communication hub device 112 operation may be sent using a specified XML file format. These parameters may be extracted using a custom parser and are stored in a container object maintained in memory by the configuration manager. Portions of this object may be packed in a bundle and passed on to interested wireless communication hub device 112 modules. In an embodiment, the configuration manager may perform operations for configuration file parsing (e.g., configuration manager may handle parsing of a downloaded configuration file and after parsing sending configuration OK or error status to the SCM), managing configuration items (e.g., configuration manager may be responsible for appropriately storing the parsed configuration items and managing them till another configuration update from the service platform server 140), sending configuration updates (e.g., configuration manager may notify the other wireless communication hub device 112 modules about a configuration update event and then share parameters with the affected modules), and handling Full/Partial configuration file (e.g., configuration manager may determine if a received configuration file is full or partial and so whether to incrementally update its stored configuration parameters or start with a clean slate, and/or determine the need to inform all modules or just a subset of affected modules).

In an embodiment, the scheduling manager may be submodule of the wireless communication hub device 112 configuration & scheduling module. In an embodiment, the scheduling manager may handle schedule processing for electronic medical and fitness device interaction and uploading to the service platform server 140. The scheduling manager may provide schedule 'ticking' for interacting with electronic medical and fitness devices in accordance to a radio schedule blueprint. The scheduling manager may provide schedule 'ticking' for uploading data collected from the electronic medical and fitness devices to service platform server 140 in accordance to an upload schedule blueprint. The scheduling manager may notify the service platform server 140 about priority conflicts on the schedule blueprint as soon as they are encountered. The scheduling manager may interact with a radio manager by notifying it to start interacting with electronic medical and fitness devices. The scheduling manager may interact with the data collection manager (DCM) by notifying it to upload data collected from a given electronic medical and fitness device.

The scheduling manager may include two scheduler algorithm instances that may process a schedule blueprint generated by the service platform server for both data collection and uploading. After set up, each schedule algorithm instance may provide callbacks at times calculated from the blueprint to: request data or listen for connection or upload collected data from an electronic medical and fitness device (in Schedule Algorithm a.k.a. 'resource'); and report that a given electronic medical and fitness device(s) was/were not serviced due to priority and/or radio (in Schedule Algorithm a.k.a. 'group') conflict.

Even though embedded within configuration service, the scheduling manager may provide its own thread for processing newly downloaded schedules for both data collection and uploading to the service platform server 140. The blueprint may provide an already distributed schedule for data collection and data upload. Each schedule blueprint may be transferred from the service platform server 140 to the wireless communication hub device 112 as part of the configuration file, one for data collection and one for data upload. Each algorithm instance may receive the following fields as input for each entry: Resource (e.g., device ID), Group (e.g., Radio), Timestamp (e.g., when the first 'service' to resource has to occur), Period (e.g., elapsed time after first or previous 'service' to the next one, which can be zero for single shot events), Window (e.g., amount of time this resource will require to be serviced), and Priority (e.g., Absolute priority of this resource to be serviced). In an embodiment, all time fields may be specified in seconds. The Timestamp field may be relative to the 'Base Timestamp' from the blueprint itself. The 'Base Timestamp' may be, by convenience, set to the 0:00:00 hours of the reference date (i.e. download date or whatever date may be specified from the service platform server 140). In an embodiment, the wireless communication hub device 112 and the electronic medical and fitness device may communicate. In an embodiment, the wireless communication hub device 112 and electronic medical and fitness device may pre-pair.

In an embodiment, the customer device kit may include the wireless communication hub device 112. The wireless communication hub device 112 and electronic medical and fitness device may support the ability to be pre-paired in some fashion either thru proximity discovery or remote association. In an embodiment, the wireless communication hub device's 112 and electronic medical and fitness device's respective identities may be associated and discoverable for authentication purposes. In this manner, "plug and play" operation and easier use may be enabled after delivery of the customer device kit to the consumer.

The wireless communication hub device/electronic medical and fitness device pairing scenarios may include a new wireless communication hub device 112 bundled with a pre-paired at factory/pre-shipment electronic medical; a wireless communication hub device 112 and registered medical and fitness device registered upon the web registration or call of the customer.

The pairing and electronic medical and fitness device discovery may be enabled by the native short-range radio drivers layer on the wireless communication hub device 112. In an embodiment, only electronic medical and fitness devices with which the service system may be authorized to form a connection with the system, and electronic medical and fitness devices that are not authorized may not connect. Criteria to be authorized may include: a business relationship, a data license agreement, it is FDA approved as required, drivers, application partner pairing in place, etc.

For pairing and authentication of the device by the wireless communication hub device 112 over the short-range radio, the electronic medical and fitness device may be uniquely identified (e.g., for Bluetooth® by its MAC ID) during the radio link communication, prior to sending any data payload.

In an embodiment, a pairing header may include the mandatory identification (ID) fields. For a legacy electronic medical and fitness device that does not support a unique identification mechanism on the radio link, the customer may provide detailed information of other data that is transmitted on the radio link and that will allow the wireless communication hub device 112 to uniquely identify the electronic medical and fitness device through a configuration file mechanism. After the wireless communication hub device 112 has paired successfully with the electronic medical and fitness device thru the pairing header, the service platform server 140 may map this information to the appropriate customer, so the data payload may be properly delivered. The mapping may result in following information associated at the service platform server 140: Manufacturer Id/Customer Id (e.g. "ACME_CORP145"); device/product Id/serial number (e.g. "1234567923"); and any other fields that may be needed. Alternatively, mapping may not be required, when the electronic medical and fitness device is Continua compliant/certified and/or these fields will be transmitted.

On the short-range radio link, the wireless communication hub device 112 may receive the raw measurement payload data from the electronic medical and fitness device, store it and then upload to the service platform server 140. The wireless communication hub device 112 may expect to receive the data in some threshold amount of time, which may be associated with the short-range radio-link.

In an embodiment, electrical medical and fitness devices may be configured with a standard wireless data link, such as Bluetooth®, in which case the wireless communication hub device may be simplified to utilize that single standard local area wireless communication transceiver.

In an embodiment, the wireless M2M communication hub may be used in the home setting to enable wireless medical and fitness devices to communicate data regarding a patient in the residence to remote users of such data.

In an embodiment, the wireless communication hub device may be used in the home setting to enable electronic medical and fitness devices to communicate data regarding a patient in the residence to remote users of such data. In an embodiment, the wireless communication hub device may be plugged into a standard wall electrical socket to receive power, and then search out and pair with wireless electronic medical and fitness devices, such as blood pressure monitors, glucose meters, treadmills, etc. using the wireless communication links of such devices. Such pairing and establishing the communication links may be accomplished automatically, thereby minimizing the configuration and setup burden for the patient. The wireless communication hub device may collect data provided by the various electronic medical and fitness devices in the home, package the data into suitable packets for communication via wireless and Internet communication links, and send the data packets back to the central server (i.e., a service platform server or virtual personal hub (VPH) server) using a wireless wide area network (WWAN) communication link, such as an LTE, 3G or 4G cellular communication network. In order to enable the greatest ease of setup, lack of complexity and security for this medical communication system, the wireless communication hub device and the central server (i.e., service platform server) may be configured to provide for automatic device discovery, communication links setup, security key exchange, data addressing, and device configuration. Thus in an embodiment, a patient may simply plug the wireless communication hub device into an electrical outlet to establish a communication network between the wireless electronic medical and fitness devices in the patient's home and those facilities and services that can utilize the medical and fitness data generated by such devices. Using suitable encryption mechanisms, the data may be transferred securely while maintaining the appropriate security required under government regulations (e.g., HIPAA).

In a simple embodiment, the wireless communication hub device may be configured as a small, integrated module that can be plugged into a power source, such as a standard utility wall socket, and attached (wirelessly or via a wired connection like USB) to one or more medical or fitness devices (e.g., a blood pressure sensor, a glucose monitor, a pedometer, a treadmill, etc.). The wireless communication hub device may be configured with processor-executable software to enable connected electronic medical and fitness devices to be used from any computer attached to a local area network or the Internet. An associated Internet server-based service platform enables discovery of the wireless communication hub device and connected electronic medical and fitness devices. The wireless communication hub device may also be accessed from the Internet through the associated server-based service.

The various embodiments of the wireless communication hub device ("hub" or "2net HUB" in the drawings), minimize the complexity of networking electronic medical and fitness devices by eliminating many of the requirements conventionally imposed on a host system and local network. Wireless communication hub devices can be placed in any location, stationary or mobile, and are configured so that the electronic medical and fitness devices connected to the wireless communication hub device appear to the accessing computers as if they are locally connected. This is accomplished by way of intelligence and connectivity in the wireless communication hub device, the associated server-based service and, optionally, software that may be hosted on the accessing computer.

The various embodiments also simplify the traditionally challenging technical processes of networking electronic medical and fitness devices, such as setup and initialization, security, driver management, and device sharing by way of a server-based supporting service element. This service may also enable valuable communication and data utilization capabilities, such as batch operation support; access via the Web and intelligent sharing across user defined and controlled groups.

In order to provide a "universal" hub to handle health-sensitive data from any of a variety of electronic medical and fitness devices, a number of different radios may be implemented within the wireless communication hub device. Multiple radios each potentially serving multiple devices increases the complexity of design, but simplifies the process of establishing communication networks between electronic medical and fitness devices and remote users of data from those devices. Employing multiple radios in the wireless communication hub device enables manufacturers of various electronic medical and fitness devices to be able to pair up with the hub without significant changes to their devices, thus enabling them to avoid the need to be concerned with communication protocols and data encryption. This enables the wireless communication hub device to function as a data-in/data-out device, with its only function being to collect, package and faithfully transfer data to the service platform server.

In an embodiment wireless communication hub system may support business to business (B2B) transmission and storage processes using dual databases. In a simple B2B transmission model, the storing of data may be merely to assist in the forwarding of the data to the appropriate partner. The wireless communication hub device may serves as a simple pipeline to transfer data. In a "B2B Transmission+ Analytics" model, the wireless communication hub device may provide analytics to electronic medical and fitness device manufacturers and other partners, and may store some or all of the data collected on the manufacturers' or partners' behalves, but may not have a relationship with the consumer.

In the various embodiments, the service platform server may transmit data for pipeline functions and store some or all of the data for the purpose of performing analytics on identifiable data. In an embodiment, there may be no direct relationship with the consumer. In an embodiment in which the service platform server operator may receive data storage rights for protected health information (PHI) data (e.g., by contract with a business partner), the protected health information may be stored in a secure facility as per contract and the Health Insurance Portability and Accountability Act (HIPAA). In an embodiment in which the service platform server operator receives data storage rights for de-identified data, the original PHI data may be stored in one database, and may be one-way hashed out and stored in another database in de-identified form. In an embodiment, the data may be stored in the dual databases such that data continuity is maintained. In an embodiment, the data may be stored in the database, and backed up for an indefinite period. The data may be housed in a secure PCI environment data center.

In an embodiment, data controls may be implemented based on data rights. In an embodiment, security policies and procedures may implement physical, technical, and administrative safeguards. In an embodiment, data may be encrypted (e.g., via AES 128) and secured end-to-end (e.g., from the wireless communication hub to a service platform server and to a customer's server(s)). In another embodiment, the system may implement a de-identifying data approach in which a chunk of data is received and de-identified (e.g., according to the HIPAA standard). In an embodiment, the system may be configured such that new data is not "added" to the de-identified data, but rather, the de-identification process is re-run on a larger data set.

In an embodiment, simply removing identifiers may not be sufficient to de-identify PHI, and if de-identified data could be combined with other information to which it has access to identify an individual, it may be considered protected health information. In an embodiment, if health information obtained from a HIPAA covered entities includes an electronic medical and fitness device serial number, that identifier alone may be used to identify the information as protected health information.

In addition to supporting multiple radio protocols, including Bluetooth®, Wi-Fi and ANT+, a software scheme may be implemented within the wireless communication hub device to accommodate a wide range of customizations. To support this, the hub processor may be configured with a high-functionality operating system, such as the Android operating system.

A wireless communication hub device may be configured to use software interface models that mirror the types of devices that can be connected to computers via USB (Universal serial bus) or FireWire ports. In short, the wireless communication hub device embodiments can broaden and extend the value of many connected electronic medical and fitness devices. Employing the wireless communication hub device, electronic medical and fitness devices can be placed virtually anywhere, shared across groups, accessed via the Internet or local networks, and supported by extended services which enable new use models and revenue opportunities.

In order to comply with regulations imposed on medical equipment, the wireless communication hub device may be developed under ISO 13485 standards that are required for medical devices. This would enable wireless communication hub device systems to be sold in combination with one or more medical devices as a system.

Various embodiments described herein provide devices, systems and methods that enable remote access to peripherals commonly connected to personal computers via USB, FireWire, serial ports, etc. using a wireless communication hub device that simplifies networking of devices to computing systems. The various embodiments include a wireless communication hub device which includes a processor and communication transceivers configured to connect to cellular and/or Wi-Fi communication networks. The wireless communication hub device may be configured as a small, integrated module that can be plugged into a power source, such as a standard utility wall socket, and attached to one or more peripheral devices (e.g., a digital camera, hard drive, printer, digital picture frame, etc.). The wireless communication hub device may be configured with processor-executable software to enable connected peripheral devices to be used from any computer attached to a local area network or the Internet. An associated Internet server-based service enables discovery of the wireless communication hub device and connected peripherals. The wireless communication hub device may also be accessed from the Internet through the associated server-based service.

The various embodiments of the wireless communication hub device ("VPH" in the drawings), minimize the complexity of sharing peripheral devices (e.g., electronic medical and fitness devices, digital cameras, hard drives, printers, etc.) by eliminating many of the requirements conventionally imposed on a host system and local network. The wireless communication hub device may be placed in any location, stationary or mobile, and may be configured so that the peripherals connected to the wireless communication hub device appear to the accessing computers as if they are locally connected. This may be accomplished by way of intelligence and connectivity in the wireless communication hub device, the associated server-based service and, optionally, software that may be hosted on the accessing computer.

The wireless communication hub device may enable services in which large service providers (e.g., Google) "own" private user data. Starting with email, there has been a trend in the information businesses towards remote and centralized storage and management of all user content. The benefits to the service provider are many. However, this concept runs counter to the desire of many users to maintain physical control over their private data. In an embodiment, the wireless communication hub device provides the capability of a "network enabled" removable storage media, such as a removable USB hard-drive, that may enable universally accessible consumer data that remains locally "owned." The wireless communication hub device enables users to choose whether and how they wish to share their data without turning it over to a service provider or losing the ability to access it from any system. The wireless communication hub device embodiments enable broadening and generalizing this basic concept to encompass any connected peripheral device, making it appear as if the device is connected directly to the remote computer.

The various embodiments also simplify the traditionally challenging technical processes of networking peripheral devices, such as setup and initialization, security, driver management, and device sharing by way of a server-based supporting service element. This service also enables valuable communication and data utilization capabilities, such as batch operation support; access via the Web, and intelligent sharing across user defined and controlled groups.

The various embodiments enable wireless communication hub devices to broaden and extend the value of many connected peripherals. Employing the wireless communication hub device, peripheral devices can be placed virtually anywhere, shared across groups, accessed via the Internet or local networks, and supported by extended services which enable new use models and revenue opportunities.

An example of an application of the communication network 100 illustrated in FIGS. 1C and 1D is the transmission of data from medical or fitness device 102 (e.g., a blood pressure ("BP") sensor). Once the wireless communication hub device 112 is installed and registered with the service platform server 140, it can be connected to the medical and fitness device, such as a medical or fitness device 102 (e.g., a blood pressure ("BP") sensor), by a cable (e.g., a USB cable or FireWire cable) or a wireless communication link (e.g., a Bluetooth®). Once connected, the wireless communication hub device 112 may report the connection with the medical or fitness device 102 (e.g., a blood pressure ("BP") sensor) to the service platform server 140 which may maintain data records for storing data received from the sensor, medical device or fitness device. Data records may be maintained in a user account, in an account associated with the communication hub device and/or each medical or fitness device.

Data packets received from the medical or fitness device 102 (e.g., a blood pressure ("BP") sensor) by the wireless communication hub device 112 may be encapsulated in IP packets which are relayed as cellular data communications to a cellular wireless network 130 which applies them to the Internet 114 for delivery to the service platform server 140. By tunneling the data packets received from the medical or fitness device 102 (e.g., a blood pressure ("BP") sensor) to the service platform server 140 within encapsulated IP packets, the wireless communication hub device 112 does not have to be configured with driver software module(s) for interacting with the medical or fitness device 102 (e.g., a blood pressure ("BP") sensor). Instead, the encapsulating IP packets from the wireless communication hub device 112 may be received by the service platform server 140, which unpacks the packets so the medical or fitness device 102 (e.g., a blood pressure ("BP") sensor) data may be processed by the driver software module appropriate for the medical or fitness device 102 resident on the service platform server 140 and the translated data may be stored on the service platform server 140. In this manner the processing of the electronic medical or fitness device data in the service platform server 140 using a driver appropriate for the electronic medical or fitness device 102 may enable storage of translated data that may be in a useful format to various data users.

With the medical or fitness device 102 (e.g., a blood pressure ("BP") sensor) data stored on the service platform server 140, this medical or fitness device 102 (e.g., a blood pressure ("BP") sensor) data may be made accessible via the Internet 114 to other entities which may have use for the medical or fitness device 102 (e.g., a blood pressure ("BP") sensor) data. For example, the stored medical or fitness device 102 (e.g., a blood pressure ("BP") sensor) data may be transmitted to a doctor's computer 138 or hospital server 142 as hypertext transfer protocol IP (HTTP/IP) packets, such as in response to queries posed to a website hosted by the service platform server 140. In an embodiment, the doctor's computer 138 may use a driver appropriate for the electronic medical or fitness device 102 to view the electronic medical or fitness device data.

The communication network 100 may also enable hardware manufacturers to control or limit the distribution of driver software in order to maintain control over the data or electronic medical and fitness devices for which they are responsible. For example, some medical device manufacturers may choose to maintain device drivers as proprietary software so that data from their products can only be interpreted by their in-house servers. Such limitations may be appropriate to prevent storage of sensitive patient information on databases accessible via the Internet 114. Such limitations may also be appropriate to ensure that medical devices cannot be reprogrammed or controlled by unauthorized individuals. To support such an implementation, the service platform server 140 may forward unprocessed data packets received from such a proprietary sensor (e.g., a blood pressure sensor) as encapsulated IP packets to the device manufacturer's server 144 via the Internet 114, or another network (not shown). The manufacturer's server 144 may then use its proprietary driver software to interpret the data received from the electronic medical and fitness device.

As noted above, the communication link to the electronic medical and fitness devices 102, 104, 108 (e.g., blood pressure sensor) enabled by the service platform server 140 and wireless communication hub device 112 can support reverse communications in a similar manner. Thus, a medical facility or manufacture of the electronic medical and fitness device may transmit settings commands to the device using the communication links illustrated in FIG. 1B. For example, a doctor receiving readings from the medical or fitness device 102 (e.g., a blood pressure ("BP") sensor) via a medical server 142 may transmit a message to be displayed on a screen of the medical or fitness device 102 (e.g., a blood pressure ("BP") sensor) or another electronic medical and fitness device coupled to the wireless communication hub device 112.

One challenge faced by those who set up local wireless networks involves discovering and establishing communication links with all devices that may be accessed via the network. This challenge is simplified by the services provided by the wireless communication hub device 112 and the service platform server 140.

When the wireless communication hub device 112 is installed and initially activated, it may report to the service platform server 140 all of the commercial devices coupled to it by wired (e.g., USB connector, FireWire) or wireless links (e.g., Bluetooth® link). As part of the registration process the service platform server 140 may assign unique IPv6 addresses to each of the electronic medical and fitness devices 102, 104, 108 coupled to the wireless communication hub device 112. These IPv6 addresses can then be used by a local computer 138 to access specific electronic medical and fitness devices 102, 104, 108 via the wireless communication hub device 112. Thus, to access a particular electronic medical and fitness device 102, 104, 108, a user may use a personal computer 138 coupled to the Internet 114 via a local wireless router to access the service platform server 140. After registering with the service platform server 140, such as by entering a username and password or exchanging verification keys, the user may request and receive a listing of all electronic medical and fitness devices 102, 104, 108 coupled to the wireless communication hub device 112, including their IPv6 addresses. Once the user's personal computer 138 has the IPv6 addresses of the electronic medical and fitness devices 102, 104, 108, the computer 138 may then access particular electronic medical and fitness devices 102, 104, 108 via wireless communications through the wireless router to the wireless communication hub device 112. Command signals, such as data access requests, transmitted by the local computer 138 that are addressed to a particular electronic medical and fitness device 102, 104, 108, using the IPv6 address provided by the service platform server 140 will be relayed by the wireless communication hub device 112. Thus, one of the service platform services enabled by the various embodiments is simplified network establishment with electronic medical and fitness devices coupled to the wireless communication hub device 112.

The various embodiments of the wireless communication hub device and the service platform services can enable rapid and efficient deployment of existing and future electronic medical and fitness devices (e.g., cameras, etc.) to locations and circumstances which may not currently lend themselves well to such deployments. For example, a battery powered wireless communication hub device may be coupled to electronic medical devices without the need for running cables, configuring routers and networks, or configuring the devices. Connectivity and configuration, including providing drivers for receiving the camera imagery can be handled automatically by the wireless communication hub device and the service platform services. In this manner, a telemedicine communication link can be established to a patient or an ad hoc medical station at a scene of an accident, in a sporting event (e.g., a marathon) or on the battlefield without the need for an infrastructure any more complex than access to a cellular communication network.

Figure 2:
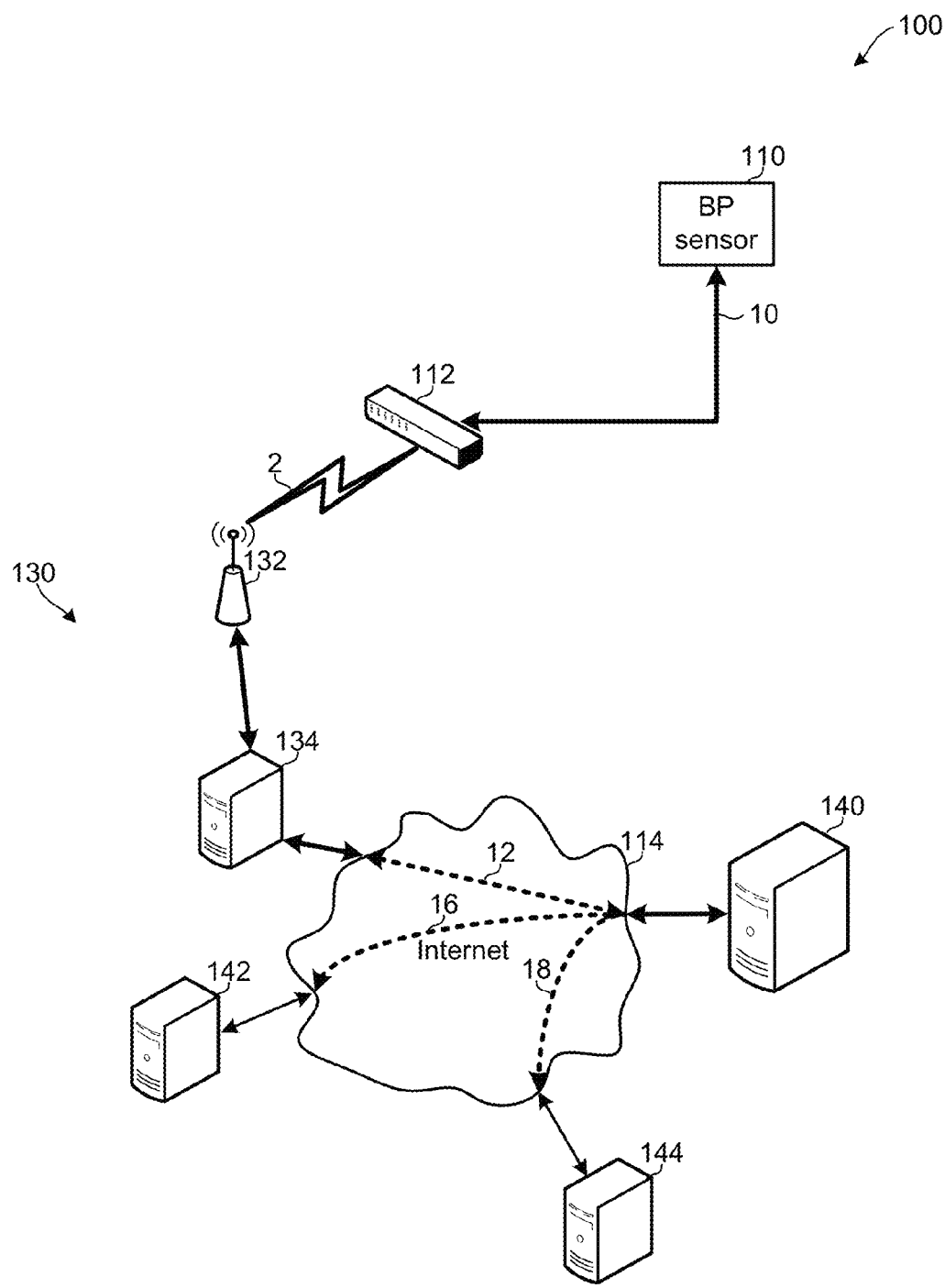
FIG. 2 is a communication system block diagram illustrating functionality of various embodiments.

Another example of a useful application of the communication network 100 enabled by wireless communication hub device services is illustrated in FIG. 2. In this example, the peripheral device is a medical sensor, such as a blood pressure ("BP") sensor 110. Data from medical sensors may be of interest to a number of different parties, including the user's physician, a local hospital monitoring the user, medical insurance carriers, manufacturers of the user's blood pressure medication, and manufacturers of the blood pressure sensor 110, to name just a few. As illustrated in FIG. 2, the wireless communication hub device 112 and the service platform server 140 may make such medical data available to those entities which needed it without the complication of making the blood pressure sensor 110 network accessible, establishing a network encompassing the sensor, or deploying drivers for the blood pressure sensor to other computers. Once the wireless communication hub device 112 is installed and registered with the service platform server 140, it can be connected to the medical sensor, such as a blood pressure sensor 110, by a cable (e.g., a USB cable 6 or FireWire cable 8) or a wireless communication link (e.g., a Bluetooth® 10 as illustrated). Once connected, the wireless communication hub device 112 can report the connection to the blood pressure sensor 110 to the service platform server 140 which may maintain data records for storing data received from the sensor. Data packets received from the blood pressure sensor 110 by the wireless communication hub device 112 may be encapsulated in IP packets which are relayed as cellular data communications 2 to a cellular communication network 130 which applies them to the Internet 114 for delivery to the service platform server 140. By tunneling the data packets received from the blood pressure such 110 to the service platform server 140 within encapsulated IP packets, the wireless communication hub device 112 does not have to be configured with driver software for interacting with the blood pressure sensor 110. Instead, the encapsulating IP packets from the wireless communication hub device 112 may be received by the service platform server 140, which unpacks the packets so the blood pressure sensor 110 data can processed by the appropriate driver software that is resident on the server. With the blood pressure sensor data stored on the service platform server 140, this information may be made accessible via the Internet 114 to other entities which may have use for the data. For example, the processed blood pressure sensor data may be transmitted to a doctor's computer or hospital server 142 as hypertext transfer protocol IP (HTTP/IP) packets 16, such as in response to queries posed to a website hosted by the service platform server 140.

The communication network 100 illustrated in FIG. 2 may also enable hardware manufacturers to control or limit the distribution of driver software in order to maintain control over the data or peripheral devices for which they are responsible. For example, some medical device manufacturers may choose to maintain device drivers as proprietary software so that data from their products can only be interpreted by their in-house servers. Such limitations may be appropriate to prevent storage of sensitive patient information on databases accessible via the Internet 114. Such limitations may also be appropriate to ensure that medical devices cannot be reprogrammed or controlled by unauthorized individuals. To support such an implementation, the service platform server 140 may forward unprocessed data packets received from such a proprietary sensor (e.g., blood pressure sensor 110) as encapsulated IP packets 18 to the device manufacturer's server 144 via the Internet 114, or another network (not shown). The manufacturer's server 144 may then use its proprietary driver software to interpret the data received from the peripheral device.

As noted above, the communication link to the peripheral devices (e.g., blood pressure sensor 110) enabled by the service platform server 140 and wireless communication hub device 112 can support reverse communications in a similar manner. Thus, a medical facility or manufacture of the peripheral device may transmit settings commands to the device using the communication links illustrated in FIG. 2. For example, a doctor receiving readings from the blood pressure sensor 110 via a medical server 142 may transmit a message to be displayed on a screen of the blood pressure sensor 110 or another peripheral device coupled to the wireless communication hub device 112.

In addition to the basic functionality of the wireless communication hub device services, there are numerous opportunities for advanced features that may be added by software developers, peripheral device manufactures, and data services companies. Some illustrative examples include: device and data sharing across groups; easy setup of LAN and Wi-Fi connectivity of connected devices where available; periodic access to devices such as web-accessible video cameras ("webcams") for security or other monitoring purposes; and targeted advertising to users based on the data flowing through the system. The monetization of the various services enabled by the wireless communication hub device 112 and associated services may provide numerous opportunities for new businesses and the generation of new revenue streams.

As mentioned above, an embodiment of the wireless communication hub device 112 may include a local wireless network transceiver (e.g., Wi-Fi transceiver) enabling it to communicate with computers and devices networked via a local wireless router 135. Such communications may be enabled by the service platform server 140 and the wireless communication hub device services provided in the various embodiments.

One challenge faced by those who set up local wireless networks involves discovering and establishing communication links with all devices that may be accessed via the network. This challenge is simplified by the services provided by the wireless communication hub device 112 and the service platform server 140. When the wireless communication hub device 112 is installed and initially activated, it may report to the service platform server 140 all of the commercial devices coupled to it by wired (e.g., USB connector 6, FireWire 8) or wireless links (e.g., Bluetooth® link 10). As part of the registration process the service platform server 140 may assign unique IPv6 addresses to each of the peripheral devices coupled to the wireless communication hub device 112. These IPv6 addresses can then be used by a local computer 138 to access specific peripheral devices via the wireless communication hub device 112. Thus, to access a particular peripheral device, such as a webcam 102, a user may use a personal computer 138 coupled to the Internet 114 via a local wireless router 135 to access the service platform server 140. After registering with the service platform server 140, such as by entering a username and password or exchanging verification keys, the user may request and receive a listing of all peripheral devices coupled to the wireless communication hub device 112, including their IPv6 addresses. Once the user's personal computer 138 has the IPv6 addresses of the peripheral devices, the computer 138 may then access particular peripheral devices via wireless communications 4 through the wireless router 135 to the wireless communication hub device 112. Command signals, such as data access requests, transmitted by the local computer 138 that are addressed to a particular peripheral device, such as a webcam 102, using the IPv6 address provided by the service platform server 140 will be relayed by the wireless communication hub device 112. Thus, one of the wireless communication hub device services enabled by the various embodiments is simplified network establishment with peripheral devices coupled to the wireless communication hub device 112.

The various embodiments of the wireless communication hub device and associated services may enable rapid and efficient deployment of existing and future peripheral devices (e.g., cameras, etc.) to locations and circumstances which may not currently lend themselves well to such deployments. For example, a battery powered wireless communication hub device may be coupled to a webcam or digital camera to establish an instant surveillance capability without the need for running cables, configuring routers and networks, or configuring the devices. Connectivity and configuration, including providing drivers for receiving the camera imagery can be handled automatically by the wireless communication hub device and associated services. As another example, a printer normally configured for standalone operation may be instantly configured as a networked printer without the need for network connection, or network configuration. In this manner, a printer may be quickly accessed by any number of computers in a temporary configuration simply by plugging its USB connection into a wireless communication hub device.

Figure 3A:
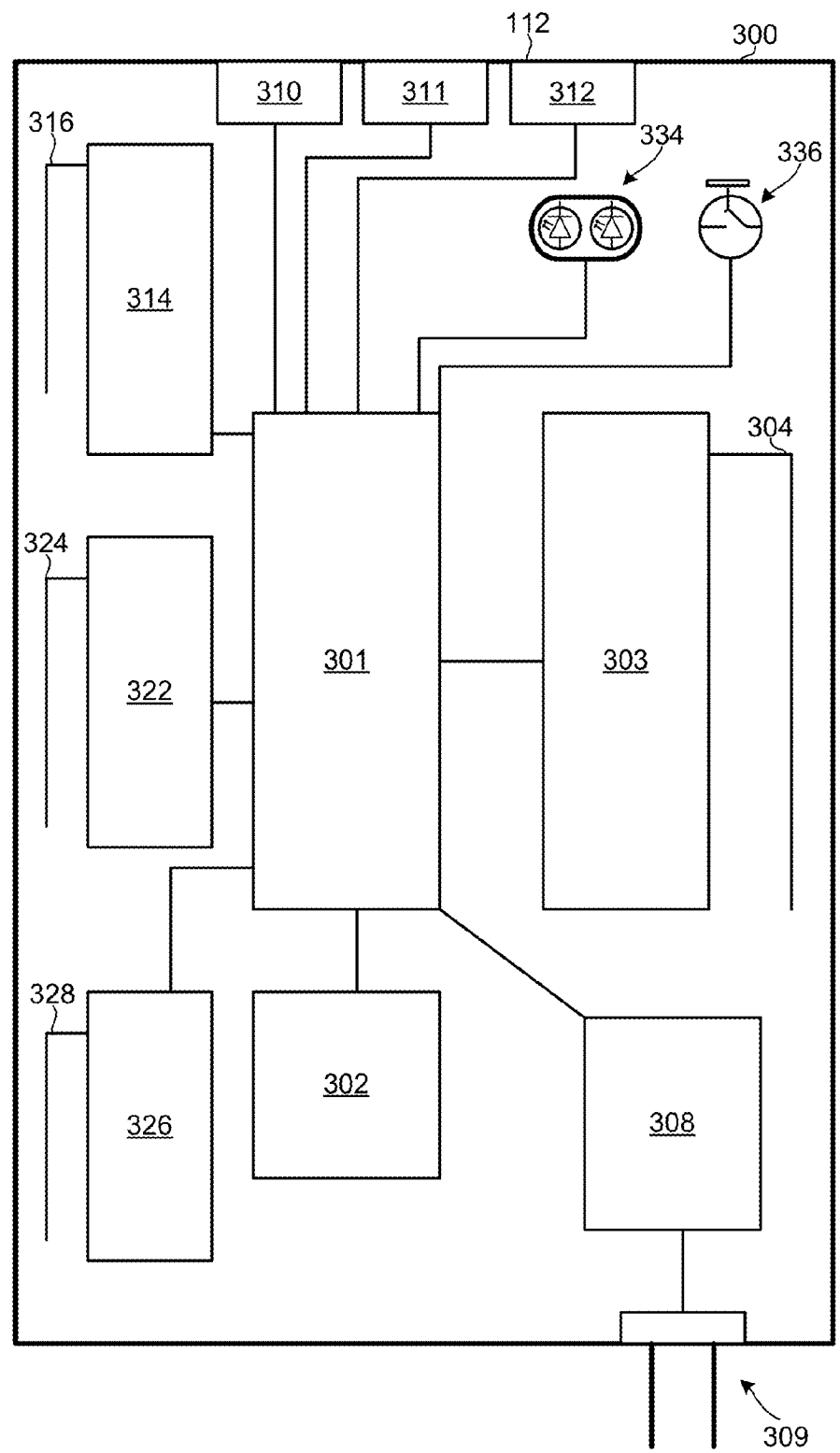
FIG. 3A is a component block diagram of a wireless communication hub device according to an embodiment.
Figure 3B:
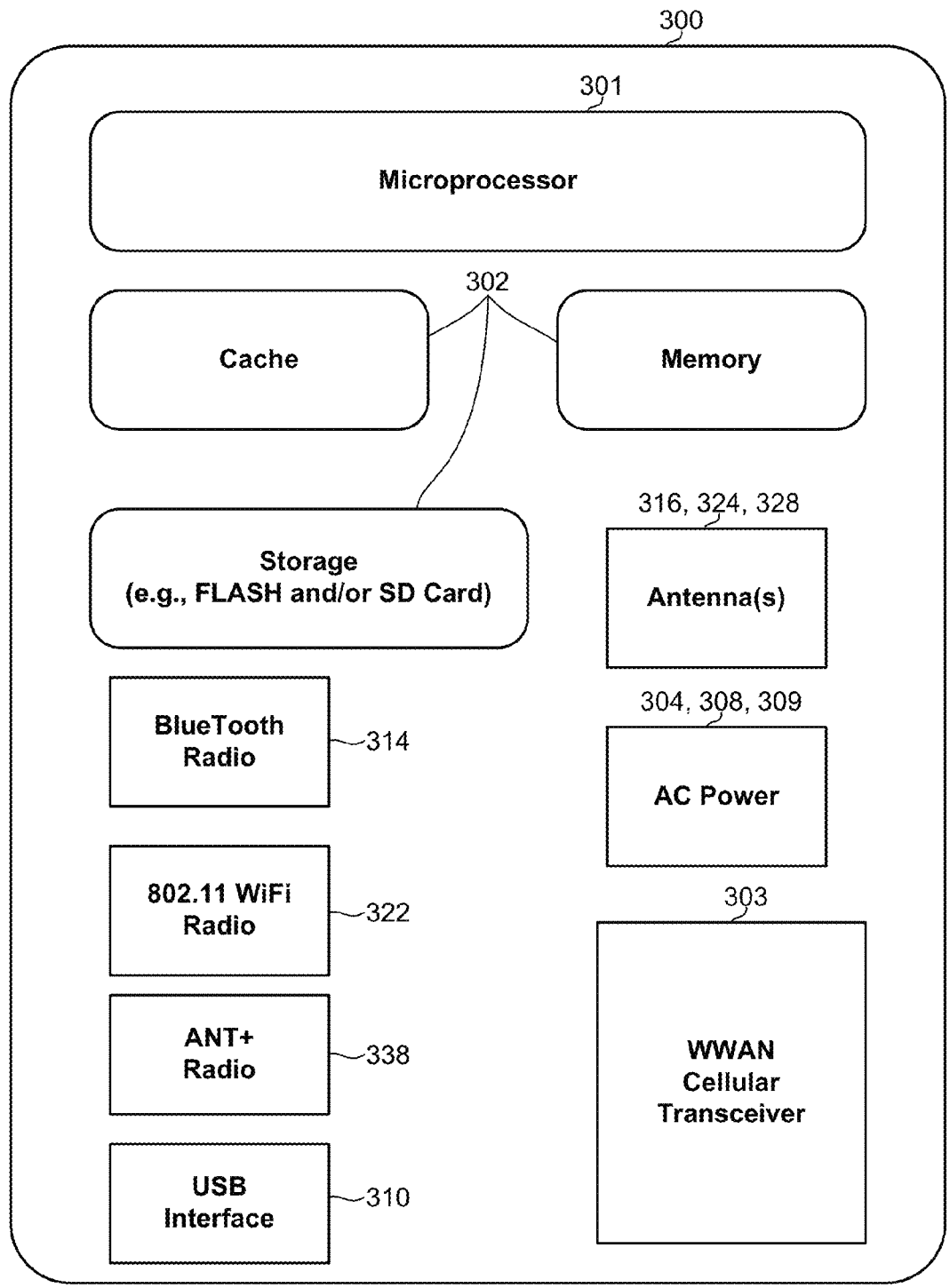
FIG. 3B is a component block diagrams of a wireless communication hub device according to an embodiment.

Example components of a wireless communication hub device 112 embodiment are illustrated in FIGS. 3A and 3B. The wireless communication hub device 112 may be configured in a case or housing 300 and may include a programmable processor 301 that is coupled to internal memory 302, and to a WWAN transceiver 303 (e.g., a cellular telephone transceiver) which is coupled to an antenna 304. A power supply 308 may be coupled to the processor 301 and other components. In some embodiments, the power supply 308 may include a battery. In a preferred embodiment, the power supply 308 may be electrically connected to a power plug 309 for plugging into a standard utility wall socket. The processor 301 may also be coupled to one or more wired network connection sockets, such as a USB port 310, a FireWire port 311 and/or an Ethernet socket 312. In a simple embodiment, only a single USB port 310 may be provided. In other embodiments, the wireless communication hub device 112 may include multiple USB ports 310, FireWire ports 311, and Ethernet sockets 312 to enable connecting a number of electronic medical and fitness devices via data cables. Providing an optional Ethernet socket 312 within the wireless communication hub device 112 may enable connecting the hub directly to a LAN or local network router. The number of ports may differ among the various embodiments depending upon the physical design of the housing and the particular market or application for which the wireless communication hub device 112 is configured.

In preferred embodiments, the wireless communication hub device 112 may include one or more wireless local area network transceivers for coupling to electronic medical and fitness devices via wireless communication links. For example, the processor 301 may be coupled to a Bluetooth® transceiver 314, which is connected to an antenna 316, and to an IEEE 802.11 (i.e., Wi-Fi) transceiver 322, which is coupled to an antenna 324, for establishing wireless indication links to electronic medical and fitness devices. As described above, a Wi-Fi transceiver 322 may also be connected to the processor 301 for use in coupling the wireless communication hub device 112 to a local area wireless router. Other local wireless transceivers may also be included, such as a Zigbee transceiver (not shown) for coupling to a Zigbee protocol network or an ANT+ transceiver 338 (FIG. 3B) for coupling to an ANT+ protocol network. In some embodiments, the wireless communication hub device 112 may include a global positioning system (GPS) receiver 326 coupled to the processor 301 and to an antenna 328. It should be noted that instead of having multiple antennas 304, 316, 324, 328, the wireless communication hub device 112 may include a single integrated antenna, or two or more transceivers may share a common antenna. Also, in some embodiments, the wireless communication hub device 112 may not include wired network connection sockets (i.e., USB port 310, FireWire port 311 and Ethernet socket 312 are optional), and instead include only one or more wireless local area network transceivers for coupling to electronic medical and fitness devices via wireless communication links.

Since the wireless communication hub device is intended to be simple for users to implement, it may include a very rudimentary user interface. For example, the processor 301 may be coupled to one or more light emitting diodes (LEDs) 334 for communicating status, and to one or more buttons 332 for receiving simple user command inputs (e.g., push to activate or restart).

While FIG. 3A shows the various components of the wireless communication hub device 112 as separate integrated circuits, several components may be integrated into a single very large-scale integrated (VLSI) chip or assembled as an integrated chipset on a single circuit board as is well-known in the art. For example, many modern cellular telephone transceivers, such as the Gobi™ cellular chipset module manufactured by QUALCOMM, Inc., include a powerful processor, transceivers for connecting to Wi-Fi networks and Bluetooth enabled devices, a built-in GPS receiver, and circuitry for connecting to wired connections such as a data port for receiving USB, FireWire and/or Ethernet connections. Thus in an embodiment, the wireless communication hub device 112 may be assembled by configuring a Gobi™ module (or similar cellular transceiver) within a housing 300 with an appropriate power supply 308, one or more antennas 304, one or more LEDs 334, one or more buttons 332, and connections to sockets for receiving USB, Firewire, Ethernet or other wired inputs. Configuring a wireless communication hub device around a sophisticated cellular transceiver module, like the Gobi™ module, can provide 3G cellular, Wi-Fi, and Bluetooth connectivity in a single small package.

The processor 301 within a wireless communication hub device 112 may be configured with processor-executable instructions (which may be stored in memory 302) to enable the processes and communications of the various embodiments described herein. Such software may include the processes required to communicate with a cellular wireless network 130 as well as establishing local networks with electronic medical and fitness devices. Such software may also include a custom protocol for managing communications between the wireless communication hub device 112 and the service platform server 140, as well as with a user's personal computer 138. Such software may also control processes for identifying and communicating with electronic medical and fitness devices even without having a device driver installed on the processor 301, including packaging received data for transmission to the service platform server 140 by "tunneling" via the Internet. Such software may also include processes to minimize the cost of operation or maximize battery life (when implemented in a battery powered configuration) by causing the cellular transceiver to go into an idle mode, and wake up in response to inputs from electronic medical and fitness devices or signals received from a service platform server 140 as described herein. For example, the service platform server 140 may send an SMS message (with or without a message payload) to the communication hub device to prompt it to exit the idle mode and accomplish a predetermined or specified action, such as contacting the service platform server for instructions.

In an embodiment, the wireless communication hub device 112 may enable direct connection to a personal computer 138, such as via a USB port 310 or Ethernet socket 312. In this embodiment, a personal computer 138 may access electronic medical and fitness devices coupled to the wireless communication hub device 112 as though they were connected directly to the computer.

As noted above, the wireless communication hub device 112 may be battery powered, powered by conventional household AC current, or powered by 12 volt DC current from an automobile (e.g., from a cigarette lighter). Thus, the power supply 308 will be configured to receive power from whatever form of external source the device is configured to receive, and configure the power as required by the processor 301 and transceiver circuitry. In battery powered implementations, the power supply 308 may also include circuitry for monitoring the charge of a battery (not shown separately) and providing charging power to the battery when the connector plug 309 is plugged into a power socket. Power supply circuitries which can perform such functions are well-known in the electronic device arts.

The wireless communication hub device 112 may include LEDs 334 that illuminate in different colors, such as a three color LED set which can emit yellow, green and red lights to indicate different status conditions. Such LEDs may be configured to flash or emit continuous light in response to commands from the processor 301.

Figure 3C:
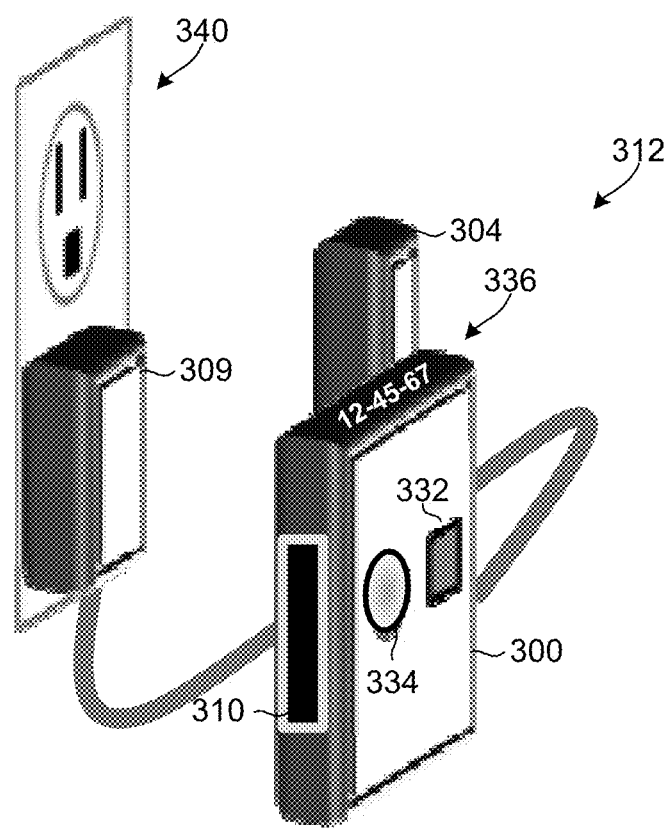
FIG. 3C is a perspective view of a wireless communication hub device according to an embodiment.
Figure 3D:
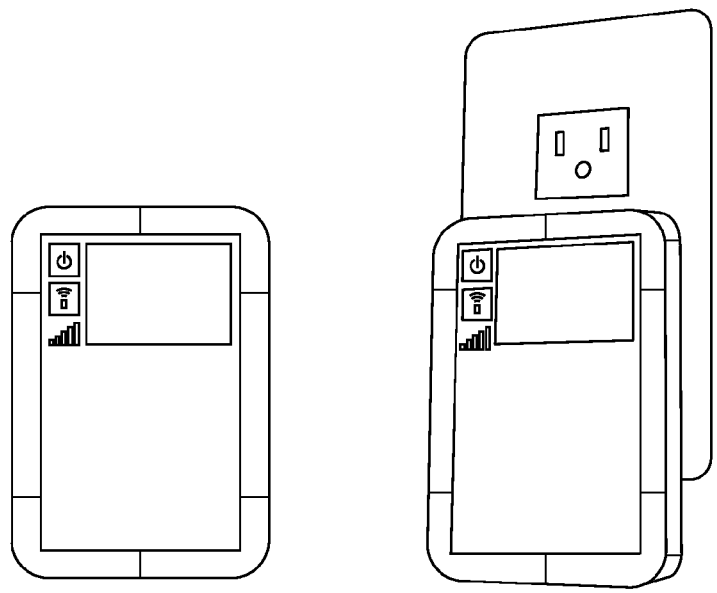
FIG. 3D is a perspective view of alternative configurations of a wireless communication hub device according to an embodiment.

The wireless communication hub device 112 may be configured in a variety of forms. Two examples of a basic small device that plugs into a wall socket are illustrated in FIGS. 3C and 3D. As illustrated, the wireless communication hub device 112 may be packaged within a compact housing 300 that exhibits a multicolor LED 334 and features a single push button 332 and one or more USB ports 310 (and/or other ports/sockets). A unique serial number 336 may be printed on the housing 300 to facilitate registration of the wireless communication hub device 112 with the service platform server 140 as described more fully below. An antenna 304 may be provided as part of the housing 300. An electrical plug 309 may be provided as part of the housing 300 or as a separate module (as shown) that is configured to plug into a standard wall socket 340. In some embodiments, the power supply 308 may be included as part of a module including the plug 309.

Figure 4:
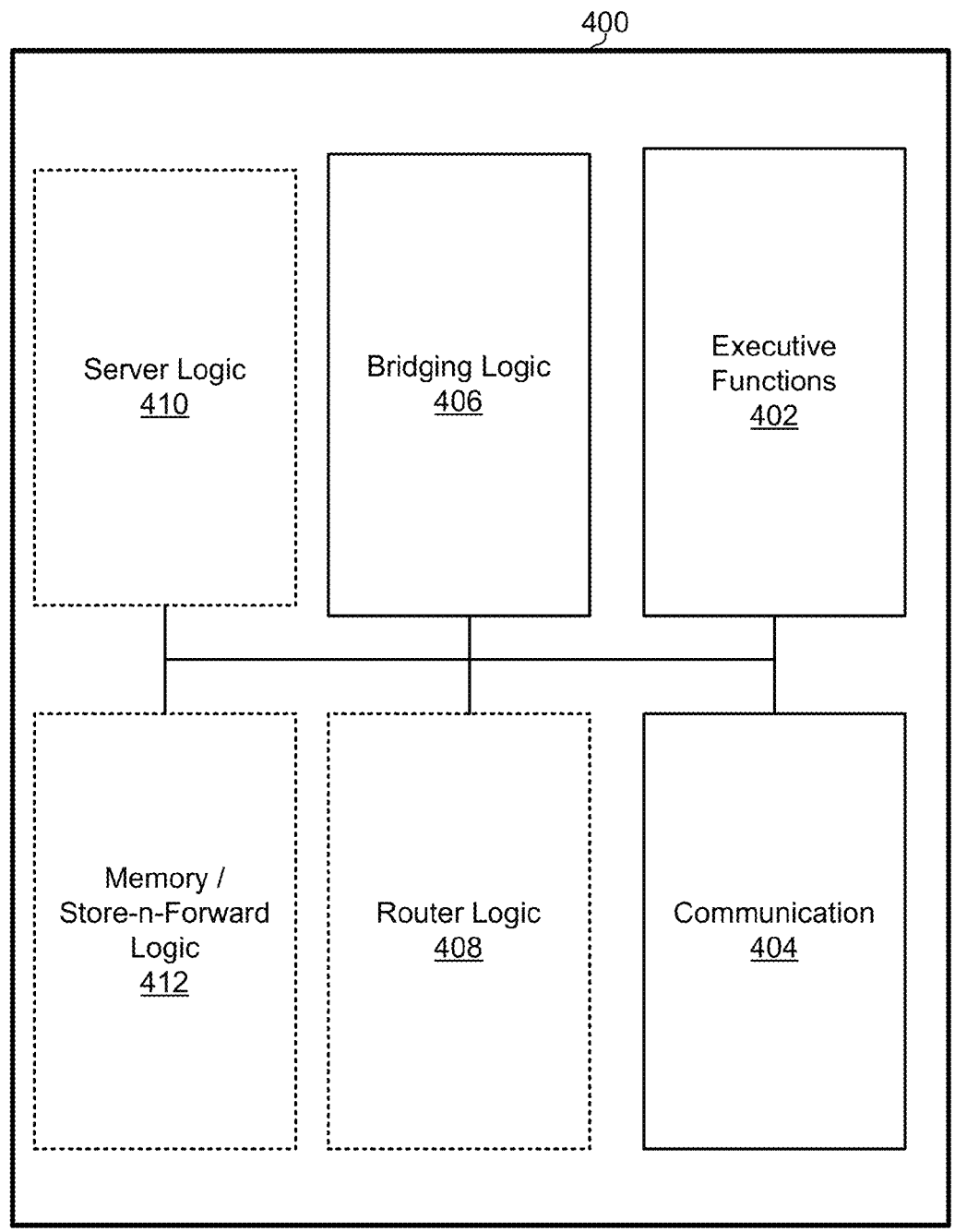
FIG. 4 is a software/hardware module block diagram of a wireless communication hub device according to an embodiment.

FIG. 4 illustrate functional modules that may be implemented within a wireless communication hub device system 400 as software modules, hardware components, or combinations of hardware and software modules. A wireless communication hub device system 400 may include executive functions 402 implemented in a processor 301 which oversee the overall processes and coordinate the other modules. A communication module 404 may include the transceivers and software for operating the transceivers as well as coordinating communication functions with the executive functions 402. The communication module 404 may include the processing necessary to comply with various communication protocols, as well as negotiating communication links, verifying data transmissions, and performing the other common functionality of digital communication systems. A bridging logic module 406 may also be coupled to the executive functions 402 and configured to perform the processes associated with providing a communication link between electronic medical and fitness devices and an external computer, such as the service platform server 140. The bridging logic module 406 may include the logic to package data received from electronic medical and fitness devices into IP packets for tunneling to the service platform server 140, for example. Similarly, the bridging logic module 406 may include the logic to unpack command packets received from the service platform server 140 and provide the embedded commands to the appropriate electronic medical and fitness device.

In various embodiments, the wireless communication hub device system 400 may include additional modules, such as router logic 408 to enable the device to perform typical processes of a conventional router.

Also, the router logic 408 may include algorithms and implement methods for polling connected electronic medical and fitness devices for data according to their respective priority, importance to the user's health, or an order request by the remote server. Also, the wireless communication hub device system 400 may include server logic 410 to enable the device to perform typical processes of a server. Further, embodiments of the wireless communication hub device system 400 may include memory and store-and-forward logic 412 for receiving and storing data from electronic medical and fitness devices and relaying that data at a later time to a destination computer. Router, server and store-and-forward processes and logic are well-known in the computer arts.

Figure 5:
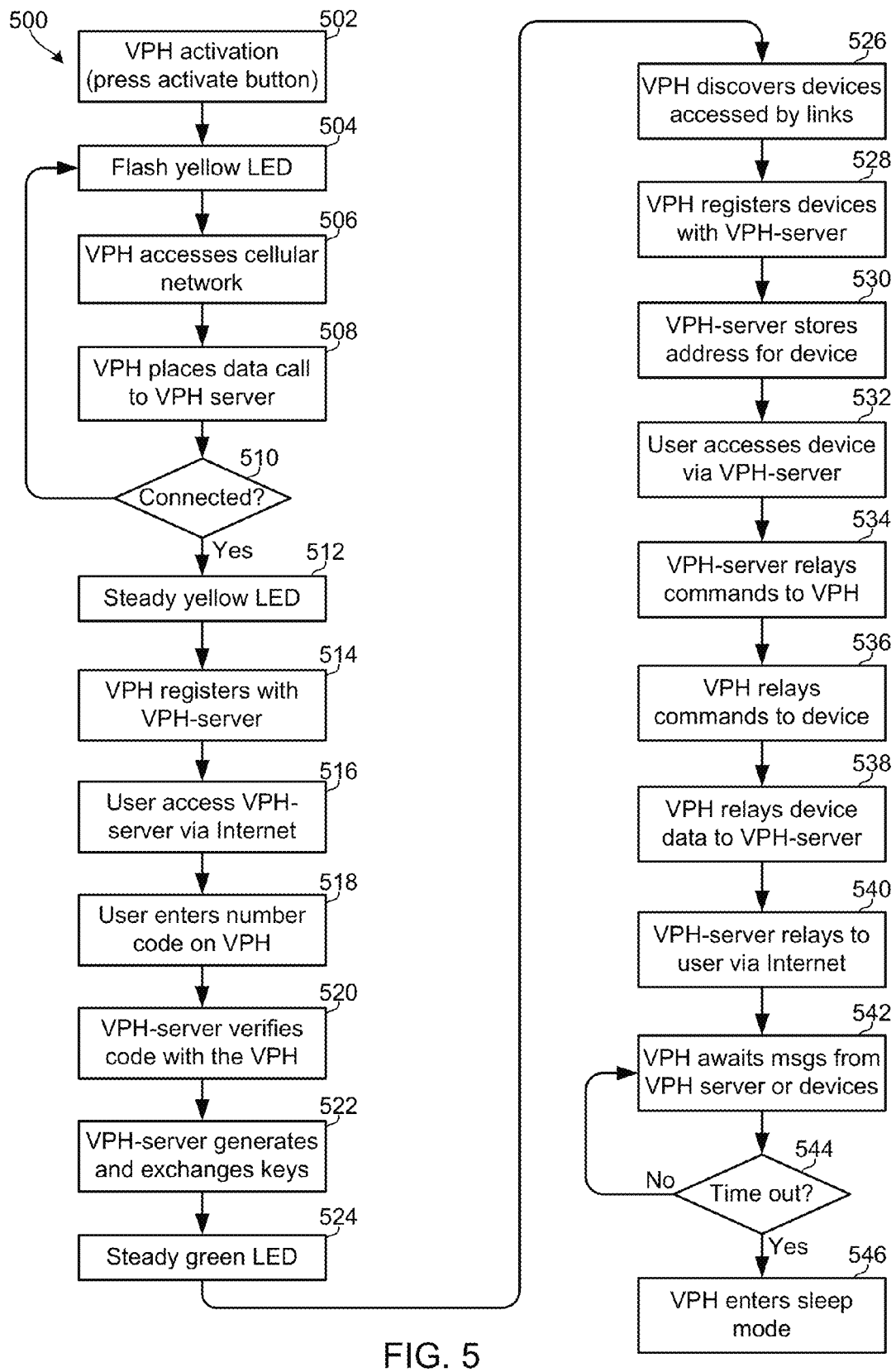
FIG. 5 is a process flow diagram of an embodiment method for initializing and utilizing a wireless communication hub device.

Initial configuration and some of the operations of the wireless communication hub device are illustrated in FIG. 5 as example method 500. A beneficial characteristic of the wireless communication hub device system is simple, fast and reliable setup. To enable simplified setup, the wireless communication hub device 112 may be configured with a single button, which when pushed initiates activation. The wireless communication hub device 112 may also include a code 336 printed on the housing 300. The wireless communication hub device 112 may be pre-configured to establish wireless communication links with a cellular service (e.g., a CDMA, 3G, 4G, etc.) and communicate directly with the service platform server 140 via the Internet 114. After pushing the activation button, a user can access an Internet web site of a service platform server 140 and enter the device's code 336 into a webpage to identify the user as the owner of the wireless communication hub device 112. Thereafter, the service platform server 140 may download any required driver software to the user's computer.

Referring to FIG. 5, at block 502 the wireless communication hub device 112 may initiate the activation process in response to receiving an activation indication (e.g., an indication of a press of the activation button). Alternatively, in some embodiments activation may be initiated when the device is first plugged into a power source, such as a wall socket 340. As activation begins, at block 504 the wireless communication hub device 112 may begin to flash the LED 334. For example, the processor 301 may flash a yellow LED to indicate that the wireless communication hub device 112 is connecting with a cellular network. Simultaneously, at block 506 the wireless communication hub device 112 may attempt to make a connection with a cellular data network. At block 508, once the processor 301 determines that the transceiver 302 has established a connection to a cellular network, the processor 301 may place a data call via the cellular network to the service platform server (i.e., VPH-server) 140. At determination block 510, the processor 301 may monitor the cellular transceiver 302 to determine if a connection has been established with the service platform server 140. As long as the transceiver 302 is in the process of establishing a communication link to the service platform server 140 (i.e., determination 510="No"), the processor 301 continues to flash the yellow LED.

Once the processor 301 determines that a communication link is established with the service platform server 140 (i.e., determination 510="Yes"), at block 510, the processor 301 may apply steady power to the yellow LED (e.g., to indicated that the registration and configuration process is underway). At block 514, at the same time the processor 301 may communicate the identifier of the wireless communication hub device 112 to the service platform server 140 to identify itself and register with the service platform server 140. The wireless communication hub device 112 may stay in this state for some pre-configured period of time (e.g., 5 minutes). During this time, at block 516 the user may access the service platform server 140 from any computer with a web browser and access to the Internet. At block 518 first time users may set up an account on the service platform server 140 by entering the number printed on the wireless communication hub device 112 along with a user name and password. In an embodiment, the number used to identify a wireless communication hub device 112 to the service platform server 140 may be a six-digit number. At block 520, the service platform server 140 validates the number entered by the user with the number provided by the wireless communication hub device 112 during its own online registration. If the user entered code and the code communicated by the wireless communication hub device 112 match, at block 522 the service platform server 140 may generate encryption and authentication keys to be used in future communications with the wireless communication hub device 112 and the user's computer, and transmits those keys to the device and the user's computer to complete the registration process. As part of the registration process the user's computer may download driver software that may be used to communicate with the wireless communication hub device 112 and/or the service platform server 140. Such drivers may be pre-configured to enable secure communications with the specific wireless communication hub device 112 (i.e., the device with the same six-digit number received by the service platform server 140). Also as part of the registration process, the service platform server 140 may download to the wireless communication hub device 112 data and software to support the various functions, such as software updates for the hub device, appropriate peripheral drivers for interfacing with peripheral devices coupled to the hub device, communication look up tables (e.g., updated IP addresses), etc.

Once the registration and configuration process has been completed, at block 524 the processor 301 may illuminate a steady green LED (e.g., to indicate to the user that the wireless communication hub device 112 is registered with the service platform server 140).

It should be noted that the registration process illustrated in FIG. 5 is but one example of how a wireless communication hub device 112 may be set up and registered with a user account maintained on a service platform server 140. Other mechanisms for registering wireless communication hub devices 112 and correlating them with user accounts maintained on the service platform server 140 may also be implemented. For example, the correlation of the wireless communication hub device 112 (e.g., based upon its six-digit number) with a user account maintained on the service platform server 140 may be accomplished at the point-of-sale of the wireless communication hub device 112. In such an implementation, the user information necessary to identify or set up a user account may be obtained by the cashier or entered by the user into the point-of-sale terminal which transmits that information along with the six-digit code to the service platform server 140. Thus, when the user leaves the store after purchasing a wireless communication hub device 112, the system may be ready to begin services as soon as it is plugged into a wall socket and connected to electronic medical or fitness devices (i.e., peripheral devices).

Another example method for activating the wireless communication hub device 112 and associating it with a user account may take advantage of location information from a GPS receiver that may be included in the wireless communication hub device 112 itself. In this implementation, when the wireless communication hub device 112 is activated, such as by being plugged into a wall outlet, the wireless communication hub device 112 determines its location from its GPS receiver 326. Upon establishing a communication link with the service platform server 140, the wireless communication hub device 112 may inform the service platform server 140 of its identification code (e.g., the six-digit number printed on the housing) along with its precise latitude and longitude coordinates. Using this coordinate information, the service platform server 140 may identify the user from public information, such as a residential address determined based upon the map coordinates, and then associate the wireless communication hub device 112 with a user account having the same residential address.

Referring once again to FIG. 5, once the configuration and registration process is completed, the wireless communication hub device 112 can be moved to any location that has cellular wireless network connectivity. Different electronic medical or fitness devices may be plugged into the wireless communication hub device 112. In an embodiment, the wireless communication hub device 112 may discovery electronic medical or fitness devices plugged into or wirelessly linked to it, step 526. As electronic medical or fitness devices coupled to the wireless communication hub device 112 are identified, the wireless communication hub device 112 may identify the electronic medical or fitness devices to the service platform server 140, step 528, such as by transmitting their media access control (MAC) identifier (ID). The service platform server 140 may store the electronic medical or fitness device identifier in data fields associated with the user or the particular wireless communication hub device 112, step 530. The service platform server 140 may also assign an IPv6 address to each electronic medical or fitness device which also may be stored in the data records of the service platform server 140.

A further feature that may be included in service platform services involves downloading the driver software appropriate for particular electronic medical and fitness devices to a user's computer 138. In this service, the wireless communication hub device 112 informs the service platform server 140 about the connected electronic medical or fitness devices during the registration and device discovery process described above. The service platform server 140 may be configured to store driver software for most electronic medical or fitness devices available in the marketplace, including historical versions of driver software that may be appropriate for older electronic medical or fitness devices. Thus, when the wireless communication hub device 112 identifies the connected electronic medical or fitness devices to the service platform 140, such as by providing MAC IDs of each electronic medical or fitness device, the service platform server 140 may identify the proper driver software stored in its memory or associated database and download the appropriate drivers to a user's computer 138 when the user accesses the service platform server 140. This downloading of driver software may be accomplished when the user first registers with the service platform server 140 or associates a computer 138 with the user's account and a particular wireless communication hub device 112. Also, the service platform server 140 may keep a data record of the MAC IDs of the attached peripheral devices and the driver software that has been downloaded to particular user computers 138. Using such records, the service platform server 140 may determine when a user computer 138 requires a new or updated driver, and download the appropriate driver software when updates are received or when new electronic medical or fitness devices are connected to the wireless communication hub device 112. In this manner, users' computers 138 can be provisioned automatically with the latest driver software required for the electronic medical and fitness devices plugged into the user's wireless communication hub device 112 without having to keep track of the driver software, download the drivers themselves, or bother with the CDs containing driver software that come with electronic medical or fitness devices. Thus, this service platform can help to simplify the user experience of using a variety of electronic medical or fitness devices.

As mentioned above, the wireless communication hub device 112 can support local network operations, such as when a user wishes to connect the wireless communication hub device 112 to their local network by way of an Ethernet or Wi-Fi connection. In such embodiments, the user may provide the relevant information to the service platform server 140 (e.g., by accessing the service platform server 140 via a web browser) which then configures the wireless communication hub device 112 using the entered information. If successful, the wireless communication hub device 112 may leverage the local network to access the Internet 114 and gain access to the service platform server 140 without using a cellular network 130 (e.g., a 3G cellular data network). If a failure occurs in this registration process, the wireless communication hub device 112 may switch back to cellular connectivity and inform the service platform server 140 that the attempt to switch to local connectivity failed. When the wireless communication hub device 112 is connected to a local area network or Wi-Fi network, locally connected computers 138 may directly access the wireless communication hub device 112 and electronic medical and fitness devices coupled to the wireless communication hub device 112. In an embodiment, this may be accomplished using IPv6 addresses provided by the service platform server 140. In an embodiment, additional computers 138 may connect to the wireless communication hub device 112 provided they have been granted access to the wireless communication hub device 112 by the user who performed the initial setup.

FIG. 5 also illustrates some normal operation processes that may be conducted once the wireless communication hub device 112 has been registered with the service platform server 140. For example, a user may request access to an electronic medical or fitness device from a personal computer 138 by accessing the service platform server 140, step 532. This may be accomplished by the user accessing the service platform server 140 via the Internet 114 from any computer 138 hosting a web browser. Upon accessing a service platform server 140 webpage, the user may be prompted to enter a username and password (or some other form of user/account identification and verification). When the user is verified, the service platform server 140 may present a menu (e.g., in the form of an HTTP webpage) of peripheral devices coupled to the wireless communication hub device 112, and accept a data request or configuration command for a particular electronic medical or fitness device from the user's computer 138. When this data request or command is received, the service platform server 140 may relay the data request or command to the wireless communication hub device, step 534. In some cases, the request for data from a user's computer 138 may require the wireless communication hub device 140 to use a driver for the particular electronic medical or fitness device in order to format the data request or command so that it can be received and processed by the electronic medical or fitness device. In this manner, a user may be able to access a particular electronic medical or fitness device (e.g., a webcam, heart rate monitor, pedometer, etc) from any computer 138 with Internet access, including computers 138 that are not equipped with the appropriate device driver software. The wireless communication hub device 112 receives the data request or commands from the server platform server 140 and relays them on to the particular electronic medical or fitness device, step 536. In some cases the data request or command may be encapsulated within IP packets with the packet payload including the data request or command in the format required by the device driver as formatted by the service platform server 140. In such cases, the wireless communication hub device 112 unpacks the data request or command and relays it to the electronic medical or fitness device via the wired or wireless connection established with the electronic medical or fitness device.

If an electronic medical or fitness device provides data for communication to the service platform server 140 or a user computer 138 (such as may occur in response to a data request messages discussed above), such data is received by the wireless communication hub device 112 and relayed to the service platform server 140, step 538. In some cases, the wireless communication hub device 112 may encapsulate the device data within IP packets so that the data can be tunneled through the Internet 114 for processing by the service platform server 140 using an appropriate driver software. As described above, the data messages may be transmitted to the Internet address of the service platform server 140 via a cellular or local area network connection to the Internet 114. Electronic medical or fitness device data packets are received by the service platform server 140, processed if necessary, and relayed to a user computer 138 (if appropriate) via the Internet 114, step 540.

When not actively responding to a data request or relaying data from an electronic medical or fitness device, the wireless communication hub device 112 may await messages from the service platform server 140 or a computer 138 coupled to the wireless communication hub device or to a local area network, step 542. To minimize costs associated with maintaining a data connection via a cellular data network, the wireless communication hub device 112 may be configured to terminate an active data connection when activity ceases for a predetermined amount of time ("timeout interval"). Thus, the processor 301 of the wireless communication hub device 112 may be configured to determine whether the timeout interval has transpired since a last communication event, determination 544. If the timeout interval has not expired (i.e., determination 544="No"), the wireless communication hub device 112 may continue to monitor the open cellular data communication link for messages from the service platform server 140. Once the timeout interval has expired (i.e., determination 544="Yes"), the wireless communication hub device 112 may terminate the open cellular data communication link and enter a "sleep" mode, step 546. In embodiments in which the wireless communication hub device 112 is plugged into an inexhaustible power supply, such as an AC wall socket, the sleep mode may involve terminating the open cellular data communication link but continuing to monitor messages or telephone calls placed to the telephone number of the wireless communication hub device 112. For example, as described more fully below with reference to FIG. 8A, the wireless communication hub device 112 may be configured to receive a simple message service (SMS) message during the sleep mode which prompts the wireless communication hub device 112 to place a data call to the service platform server 140 and initiate a new data communication link. In embodiments in which the wireless communication hub device 112 is battery powered, the sleep mode may further entail reducing processing performed on the wireless communication hub device in order to economize battery consumption.

Figure 6A:
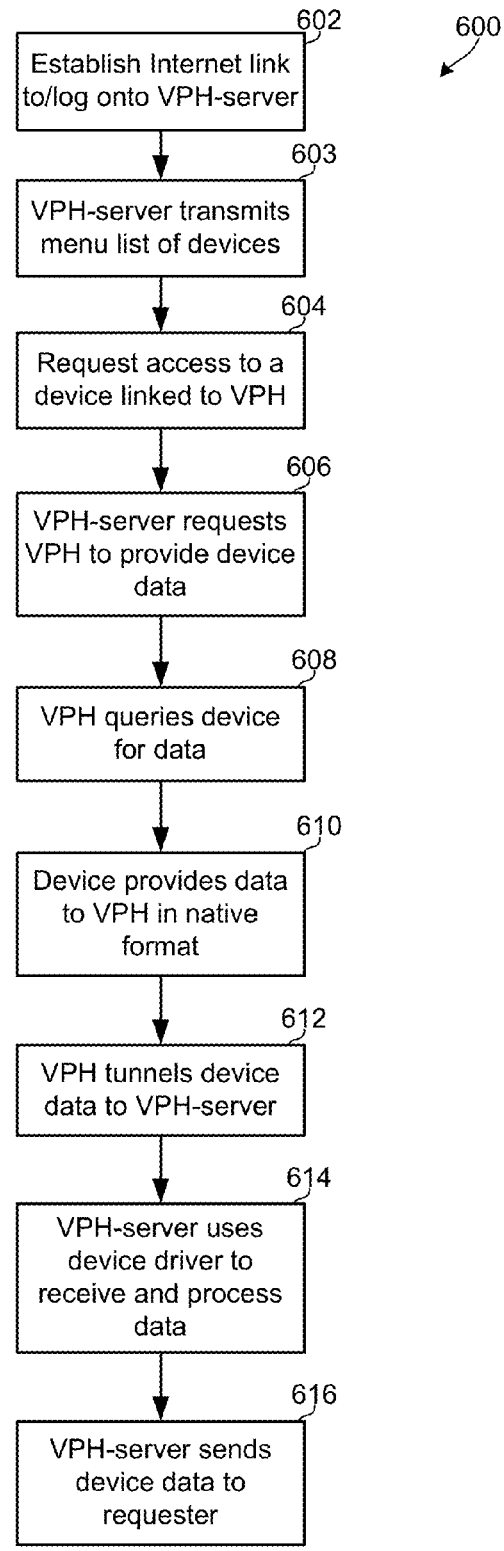
FIGS. 6A and 6B are process flow diagrams of embodiment methods for accessing a peripheral device using a wireless communication hub device via a service platform server.

As mentioned above, the wireless communication hub device 112 and the service platform server 140 may be configured to communicate data in a format that does not require the wireless communication hub device processor 301 to run a device driver for any electronic medical and fitness device. FIG. 6A illustrates an example method 600 for tunneling data and commands to and from electronic medical and fitness devices via the Internet. In the example method 600, a user may access the Internet from any computer, such as from a web kiosk computer, and access the service platform server 140 at its URL, step 602. After the user is identified and verified to the service platform server 140, service platform server 140 may generate a webpage listing a menu of electronic medical and fitness devices coupled to the wireless communication hub device 112, step 603. The user may then request access to a particular electronic medical and fitness device, 102, 104, 108 (e.g., such as a webcam to check on the user's house), step 604. This request may be accomplished, for example, by the user selecting an electronic medical or fitness device 102, 104, 108 hyperlink (e.g., a webcam hyperlink) on the menu list of available electronic medical and fitness devices listed in a webpage generated by the service platform server 140. For example, hyperlinks may be configured so that double-clicking on a webcam hyperlink in the electronic medical and fitness device menu may transmit a device access request to the service platform server 140, or transmit a code that the service platform server 140 will recognize as such.

In response to receiving a device or data access request from a user, the service platform server 140 may transmit a suitable request message to the wireless communication hub device 112 to obtain the access or data requested by the user, step 606. Upon receiving this request, the wireless communication hub device 112 may query the indicated electronic medical or fitness device for the requested data, step 608. In response, the queried electronic medical or fitness device may begin providing the requested data in its native format (i.e., in a format that requires a device driver to receive), step 610. For example, if the request is for images from an electronic medical or fitness device 102 (e.g., a webcam or blood pressure monitor), the wireless communication hub device 112 may signal the electronic medical or fitness device 102 (e.g., a webcam or blood pressure monitor) to activate and begin transmitting image data to the wireless communication hub device 112. In this embodiment, the wireless communication hub device 112 receives the native format electronic medical or fitness device data and packages the data into IP packets that can be tunneled via the Internet 114 to the service platform server 140, step 612. Methods and protocols for tunneling data via the Internet 114 are well-known in the computer communication arts.

The service platform server 140 may receive message packets from the wireless communication hub device 112, unpack the electronic medical or fitness device data from the tunneling IP packets, and use the appropriate driver software to process the received electronic medical or fitness device data, step 614. The service platform server 140 may then transmit the requested data on to the requester's computer 138 via the Internet 114 using standard IP formats, such as in the form of a webpage or video feed, step 616. Thus, in the example of a user requesting access to video images from a webcam coupled to the wireless communication hub device 112, the user may receive a video feed presented on a web browser without having to load the webcam driver software onto the computer 138.

Figure 6B:
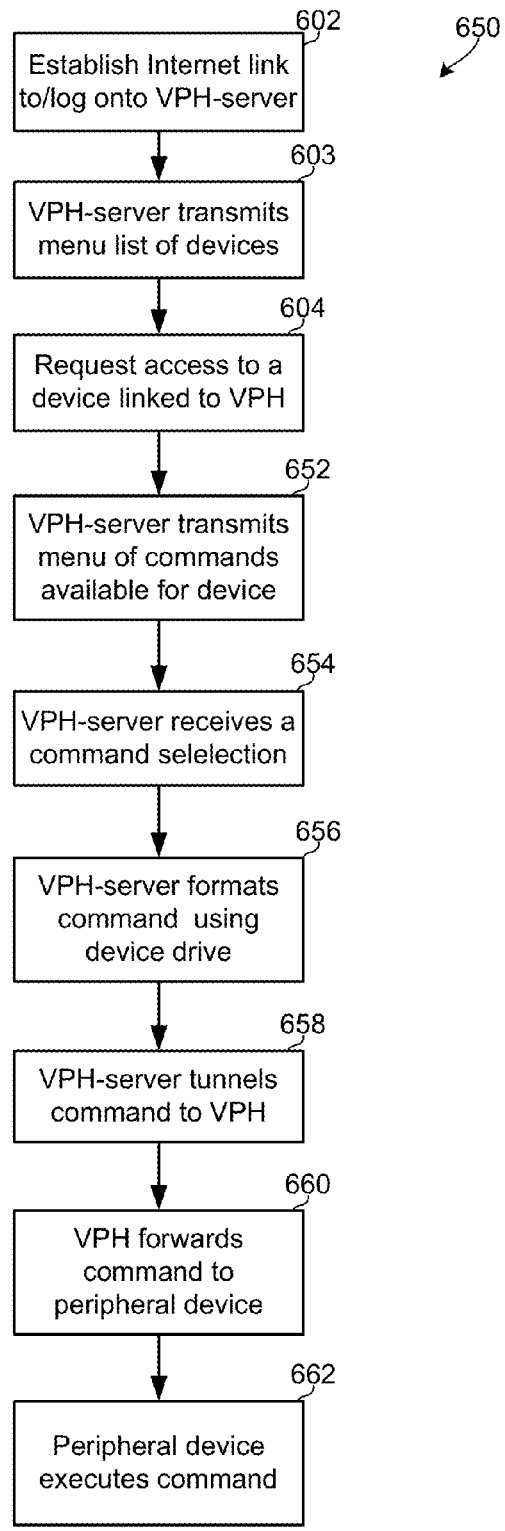

The tunneling of data and commands may also proceed from a user's computer via the service platform server 140 to the wireless communication hub device 112. For example, a user may be able to operate or configure an electronic medical and fitness device from a web kiosk computer (i.e., a computer that does not is not equipped with the appropriate device driver) using the service platform services. FIG. 6B illustrates an embodiment method 650 for tunneling command messages to an electronic medical and fitness device via the wireless communication hub device 112 similar to method 600 described above with reference to FIG. 6A except the data and commands may proceed from a user's computer 138. As described above, at block 602 a user may access the Internet from any computer, such as from a web kiosk computer, and access the service platform server 140 at its URL. After the user is identified and verified to the service platform server 140, as described above, at block 603, the service platform server 140 may generate a webpage listing a menu of electronic medical and fitness devices coupled to the wireless communication hub device 112. As described above, at block 603 the user may then request access to a particular electronic medical and fitness device 104 (e.g., such as a security system to remotely set a particular alarm state). This request may be accomplished by the user selecting a hyperlink on the menu list of available electronic medical and fitness devices listed in a webpage generated by the service platform server 140. For example, double-clicking on a security system hyperlink in the electronic medical and fitness device menu may be configured as a device access request that is transmitted to the service platform server 140. If the selected device will accept user commands, the service platform server 140 may transmit a webpage presenting a menu of the commands available for the selected electronic medical and fitness device, step 652. The user may select a particular command, such as by clicking on a hyperlink associated with the command description, the user can signal the service platform server 140 to send the corresponding command to the selected electronic medical and fitness device via the wireless communication hub device 112. Upon receiving such a command request, step 654, the service platform server 140 may format the requested command using the appropriate device driver software, step 656, and encapsulate the command within IP message packets so that it will be tunneled through the Internet 114 to the wireless communication hub device 112, step 658. Upon receiving such IP packets, the wireless communication hub device 112 unpacks the command data and transmits the command packets to the addressed electronic medical and fitness device, step 660. The electronic medical and fitness device receives and executes the command as if it had been provided directly by a computer linked to the device and configured with the appropriate device driver, step 662.

Figure 7A:
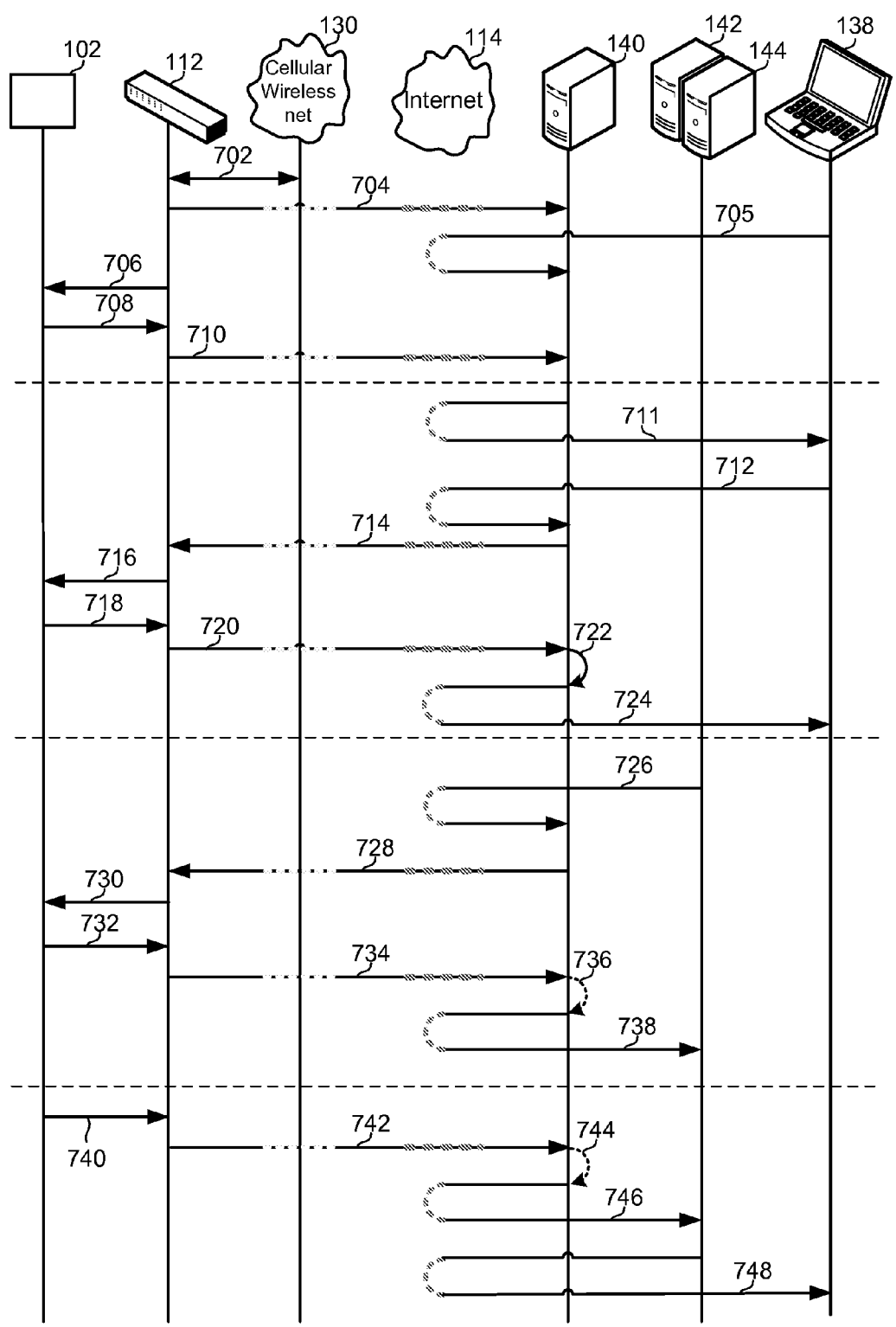
FIGS. 7A and 7B are message flow diagrams illustrating messages that may be exchanged among various components during various operations of an embodiment wireless communication hub device.
Figure 7B:
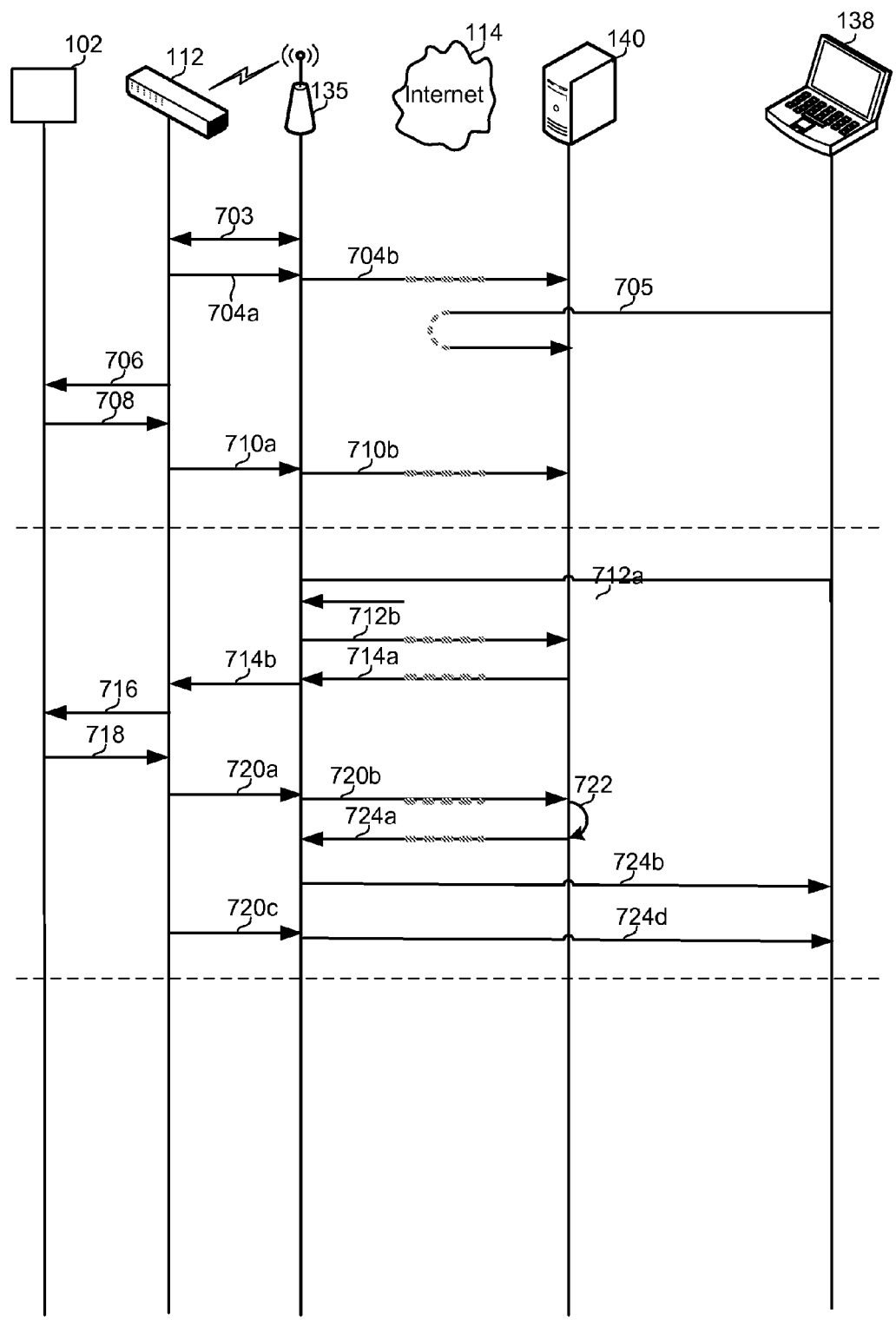

Example message flows the may be implemented in the various embodiment methods are illustrative in FIGS. 7A and 7B. Referring to FIG. 7A, when the wireless communication hub device 112 is activated, such as when it is plugged into a wall socket and the user presses the initiation button, the device may exchange the network signaling messages 702 necessary to establish a cellular data communication link with a cellular wireless network 130. Once connected to the cellular wireless network 130, the wireless communication hub device 112 may establish a data call to the service platform server 140 and transmit the device's identifier, message 704. As described above, the wireless communication hub device 112 may signal to a user when a connection is made to the service platform server 140, such as by displaying a steady yellow light, at which point the user may log into the service platform server 140 via the Internet 114 and enter registration information (e.g., as the six-digit number on the housing of the wireless communication hub device), message 705. Once the wireless communication hub device 112 is registered with the service platform server 140, it may discover the electronic medical and fitness devices 102 coupled to it, such as by transmitting device discovery messages 706 and receiving device reply messages 708. Device discovery and reply message formats are well-established in networking protocols, such as the Bluetooth® protocol. As the wireless communication hub device 112 identifies attached electronic medical and fitness devices, it may transmit information regarding them, such as their MAC ID, to the service platform server 140, message 710.

Once the registration process is completed, a user may access an electronic medical and fitness device 102 from a computer 138 by logging on to the service platform server 140. As discussed above, the service platform server 140 may send a webpage to the browser of the user's computer 138 presenting a menu of electronic medical and fitness devices 102 that may be accessed, message 711. Using such a menu or a direct command, the user may request access to a particular electronic medical and fitness device by sending an access request message 712 to the service platform server 140 via the Internet 114. In response to receiving this message, the service platform server 140 may transmit an appropriate data request message 714 over the open data communication link with the wireless communication hub device 112 via the Internet 114 and the cellular wireless network 130. The wireless communication hub device 112 relays the data request message 716 to the selected electronic medical and fitness device 102. Data generated in response to the request may be transmitted from the electronic medical and fitness device 102 to the wireless communication hub device 112 via the established cable or wireless communication link, message 718. The wireless communication hub device then relays the data, such as in an encapsulated IP packet, to the service platform server 140 over the open data communication link via the cellular wireless network 130 and the Internet 114, message 720. The service platform server 140 may unpack the device data and process it using the appropriate device driver software, processing 722, and forward the data on to the requesting computer 138 via the Internet 114, message 724.

As mentioned above, other data users, such as medical establishments or device manufacturers, may request data from electronic medical and fitness devices coupled to the wireless communication hub device 112. To do so, a third-party server 142, 144 controlled by the data user may transmit a data request message via the Internet 114 to the service platform server 140, message 726. If the service platform server 140 does not have the requested data in memory, it may transmit a data request message 728 to the wireless communication hub device 112. The wireless communication hub device 112 relays the data request message 730 to the selected electronic medical and fitness device 102. Data generated in response to the request may be transmitted from the electronic medical and fitness device 102 to the wireless communication hub device 112 via the established cable or wireless communication link, message 732. The wireless communication hub device then relays the data, such as in an encapsulated IP packet, to the service platform server 140 over the open data communication link via the cellular wireless network 130 and the Internet 114, message 734. The service platform server 140 may unpack the device data and process it using the appropriate device driver software, optional processing 736, and forward the data on to the requesting server 142, 144 via the Internet 114, message 738. In situations where the service platform server 140 does not possess the device driver for the particular electronic medical and fitness device, such as when the data requester controls device drivers, the service platform server 140 may simply relay the encapsulated device data without processing.

The service platform services may be configured to deliver data generated by an electronic medical and fitness device 102 without receiving a data request message. For example, a electronic medical and fitness device 102, such as a home security system, may generate a data message 740 that is transmitted to the wireless communication hub device 112 by an establish communication link (e.g., a USB or FireWire cable or local wireless communication link). In response to receiving such a data message 740, the wireless communication hub device 112 may place a data call to the service platform server 140 and transmit the data via the cellular wireless network 130 and the Internet 114, message 742. The service platform server 140 may unpack the device data and process it using the appropriate device driver software, optional processing 744, and forward the data on to the appropriate destination computer, such as a third-party server 142, 144 via the Internet 114 in message 746, or to a user computer 138 via the Internet 114 in message 748. In situations where the service platform server 140 does not possess the device driver for the particular electronic medical and fitness device, such as when the data generating electronic medical and fitness device is controlled by the manufacturer, the service platform server 140 may simply relayed the encapsulated device data without processing.

As mentioned above, the wireless communication hub device 112 may also be configured to communicate with the service platform server 140 via a connection to the Internet 114 through a local wireless router. Example messages that may be transmitted among various components in such a communication system are illustrated in FIG. 7B. For example, during the registration and configuration process described above with reference to FIG. 5, the wireless communication hub device 112 may discover that it can gain access to the Internet 114 via a wireless router. In that case, the wireless communication hub device 112 may establish a wireless communication link with the router in an exchange of messages 703 as provided for in the wireless protocol implemented by the router. Once connected to the router, the wireless communication hub device 112 may transmit its identification number (e.g., a unique six-digit) to the service platform server 140 via the wireless router, message 704a, which may relay the message via the Internet 114, message 704b. Similarly, the wireless communication hub device 112 may transmit information about attached electronic medical and fitness devices 102 in a wireless message 710a to the wireless router which may relay the message via the Internet 114 to the service platform server 140, message 710b. Other like numbered messages may be exchanged in the manner described above with reference to FIG. 7A.

FIG. 7B also illustrates message flows of communications between a user's personal computer 138, the wireless communication hub device 112 and electronic medical and fitness devices 102 when a local wireless router 135 is available. When a user's personal computer 138 is coupled to the local wireless router 135, it may log in to the service platform server 140 with an access message 712a sent to the local wireless router 135. The local wireless router 135 may relay the access message from the personal computer 138 to the service platform server 140 via the Internet 114, message 712b. Messages from the service platform server 140 to the wireless communication hub device 112 may be communicated via the Internet 114 to the local wireless router 135, messages 714a, which may relay them to the wireless communication hub device 112, messages 714b. Similarly, messages relaying data from electronic medical and fitness devices 102 may be transmitted from the wireless communication hub device 112 to the local wireless router 135, messages 720a, which routes them onto the service platform server 140 via the Internet 114, messages 720b. The service platform server 140 may process the data, processing 722, and forward the data on to the personal computer 138 by transmitting data messages via the Internet 114 to the wireless router, message 724a, which relays the messages to the personal computer 138, message 724b. As mentioned above, the wireless communication hub device 112 may also be configured to communicate directly with the personal computer 138 via a local network. Thus, messages from the wireless communication hub device 112 may be sent to the personal computer 138 via the local wireless router 135, message 720c, which may relay the messages directly to the personal computer 138, message 724d.

In an embodiment, the wireless communication hub device 112 may be configured to send and receive messages via a cellular communication network.

As described above, the wireless communication hub device 112 may be configured to enter an idle or "sleep mode" when there are no active interactions with electronic medical and fitness devices or with the service platform server 140. The purpose of such a sleep mode may be to minimize the operating cost of the wireless communication hub device, such as by minimizing cellular wireless network access charges when no active data communications are taking place. In such an implementation, the service platform server 140 may be configured to send a message to the wireless communication hub device 112 to "wake it up" when there is a need to communicate with the electronic medical and fitness devices. An example method 800 for accomplishing this is illustrated in FIG. 8A and example messages that may be exchanged in the process are illustrated in FIG. 8B.

Figure 8A:
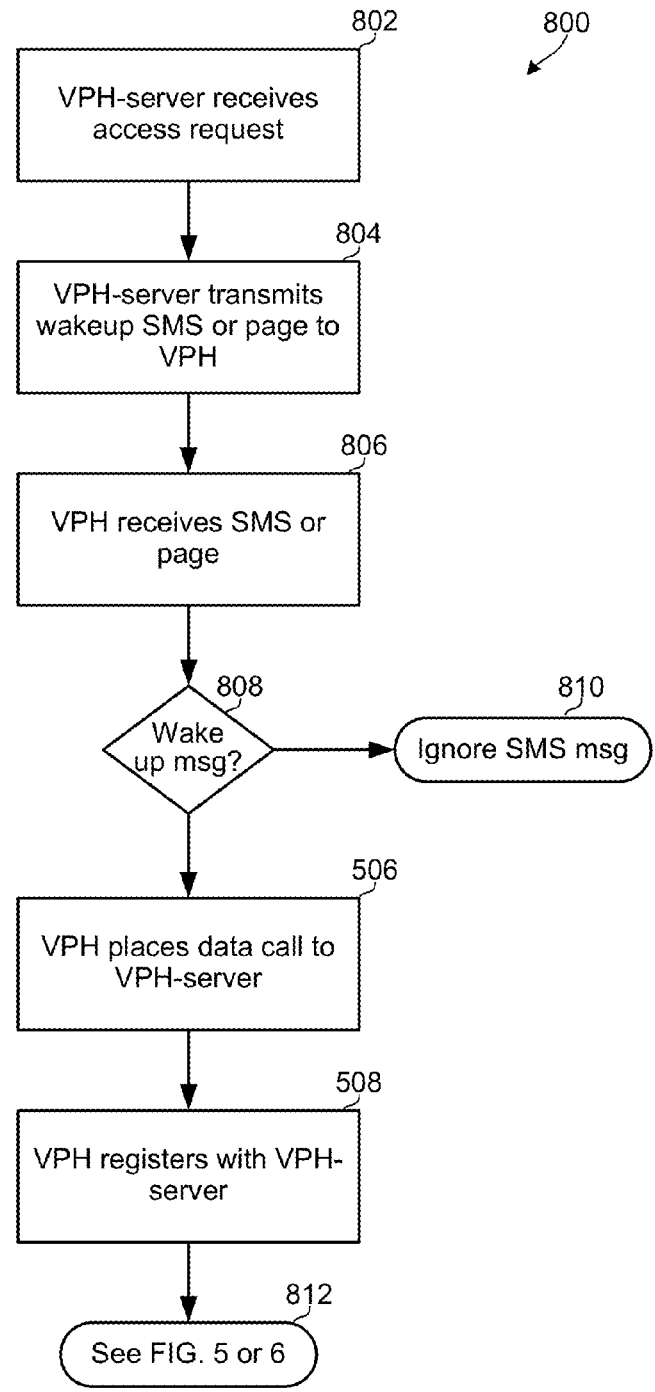
FIG. 8A is a process flow diagram of an embodiment method for activating wireless communication hub device from a low-power mode.
Figure 8B:
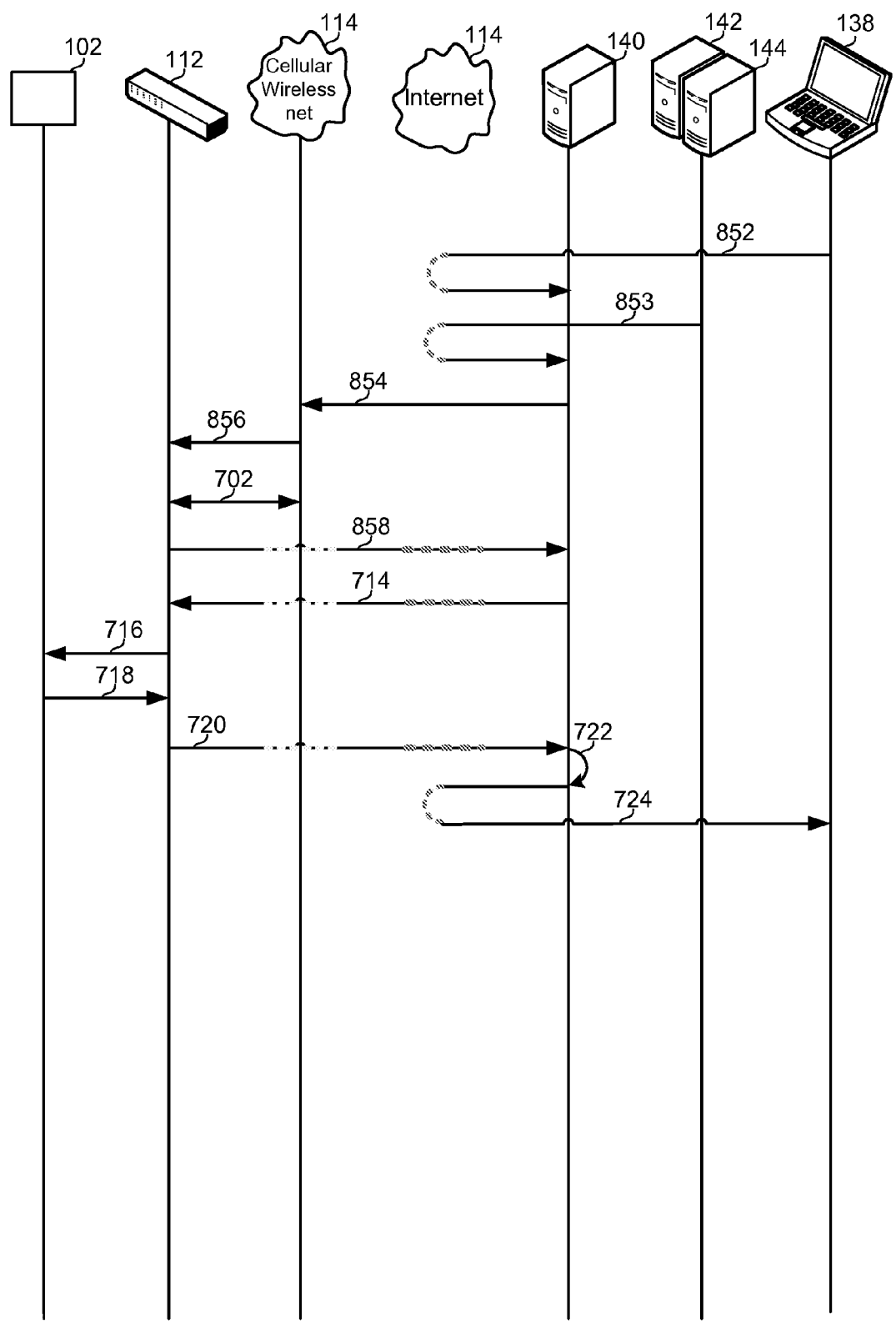
FIG. 8B is a message flow diagram illustrating messages that may be exchanged among various communication network participants during the embodiment method illustrated in FIG. 8A.

Referring to FIGS. 8A (for steps) and 8B (for messages), when the service platform server receives a request for data or access to a particular electronic medical and fitness device coupled to a wireless communication hub device 112, step 802 and messages 852, 853, the service platform server may transmit a wake-up message to the wireless communication hub device 112, step 804. Such a wake-up message may be transmitted as an SMS message which may be sent by conventional means to the cellular wireless network 130, message 854, which may deliver the message like a conventional SMS message, message 856. Such an SMS message may be addressed to a telephone number assigned to the wireless communication hub device 112 and include data or codes which the wireless communication hub device can recognize as constituting a wake-up message. In an embodiment, reception of an SMS without any message payload (i.e., no included data or codes) may prompt the wireless communication hub device 112 to wake-up. Alternatively, the service platform server 140 may send a paging-type message to the wireless communication hub device 112 which may be configured with a paging receiver.

When the wireless communication hub device 112 receives the SMS or page message, step 806, the device processor 301 may parse the received message to determine whether it includes a code indicating that the wireless communication hub device 112 should wake-up, determination 808. If the received message does not include the appropriate "wakeup code" (i.e., determination 808="No"), the processor 301 may simply ignore the received message, step 810. This test of the received code can guard against inadvertent activations of the wireless communication hub device 112, such as when a message is improperly routed or a wrong number is dialed.

If the processor 301 determines that the received message includes the appropriate "wakeup code" (i.e., determination 808="Yes"), and in embodiments in which the device is configured to wake up in response to receiving a payload-less SMS message, the wireless communication hub device 112 may activate its cellular transceiver 303 to exchange the network signaling messages 702 necessary to establish a cellular data communication link with a cellular wireless network 130. If a local wireless router 135 with access to the Internet 114 is available, the wireless communication hub device 112 may negotiate a communication link with the wireless router instead. Once connected to the cellular wireless network 130 (or a local wireless router 135), the wireless communication hub device 112 may place a data call to the service platform server 140, step 506. When a connection to the service platform server 140 is established (or as part of establishing the connection), the wireless communication hub device may provide its unique identifier to the server, thereby identifying itself, step 508 and message 858. With a communication link established between the wireless communication hub device 112 and the service platform server 140, the server and devices may proceed with communications as described above with reference to FIGS. 5, 6A, 6B and 7A, step 812.

Additional methods for activating a computing device such as the wireless communication hub device are disclosed in U.S. patent application Ser. No. 12/430,642 entitled "Apparatus and Method for Activating Computer Applications with SMS Messaging" filed Apr. 27, 2009, the entire contents of which are hereby incorporated by reference.

Figure 9A:
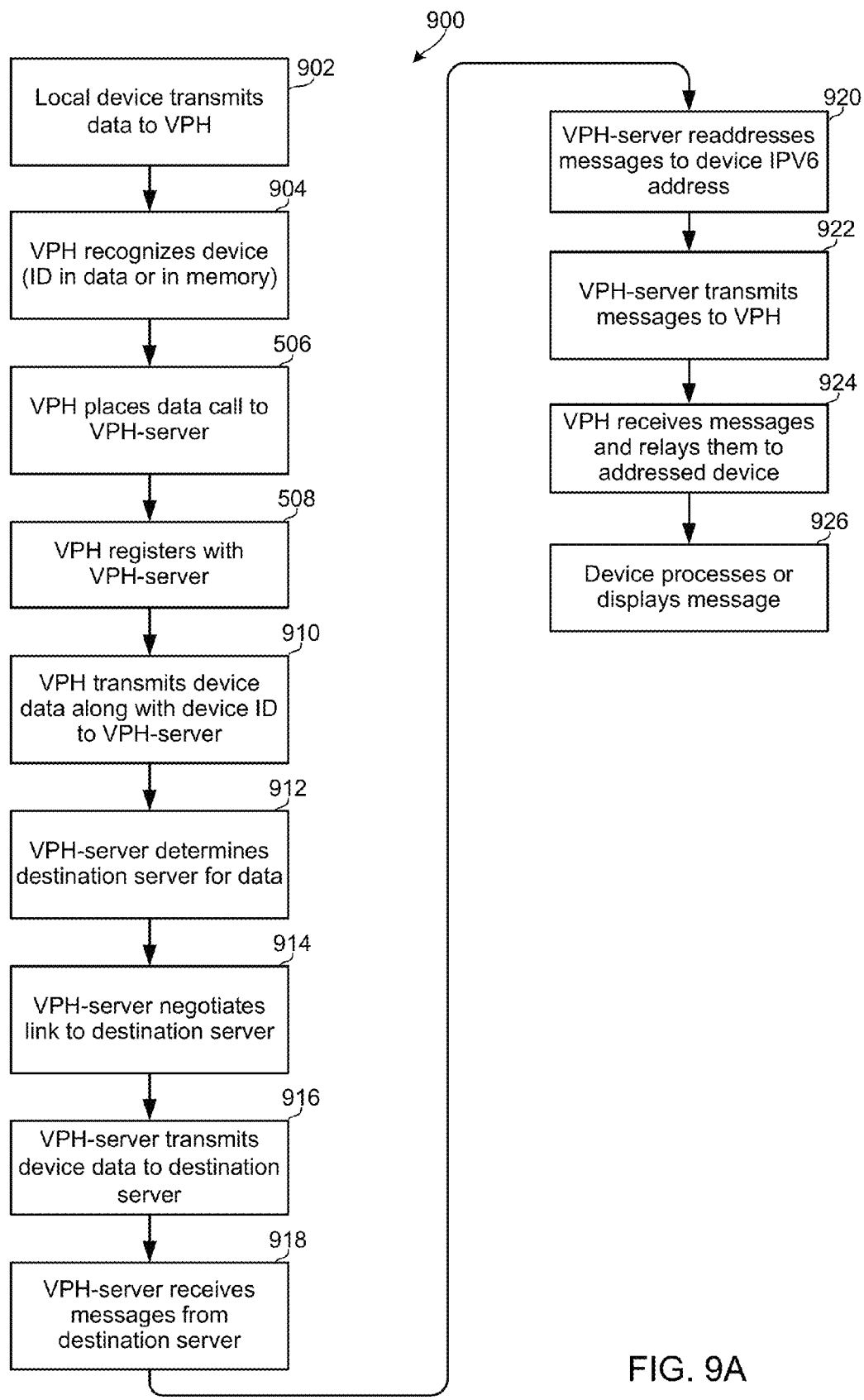
FIG. 9A is a process flow diagram of an embodiment method implemented in a wireless communication hub device for reporting data received from a peripheral device.
Figure 9B:
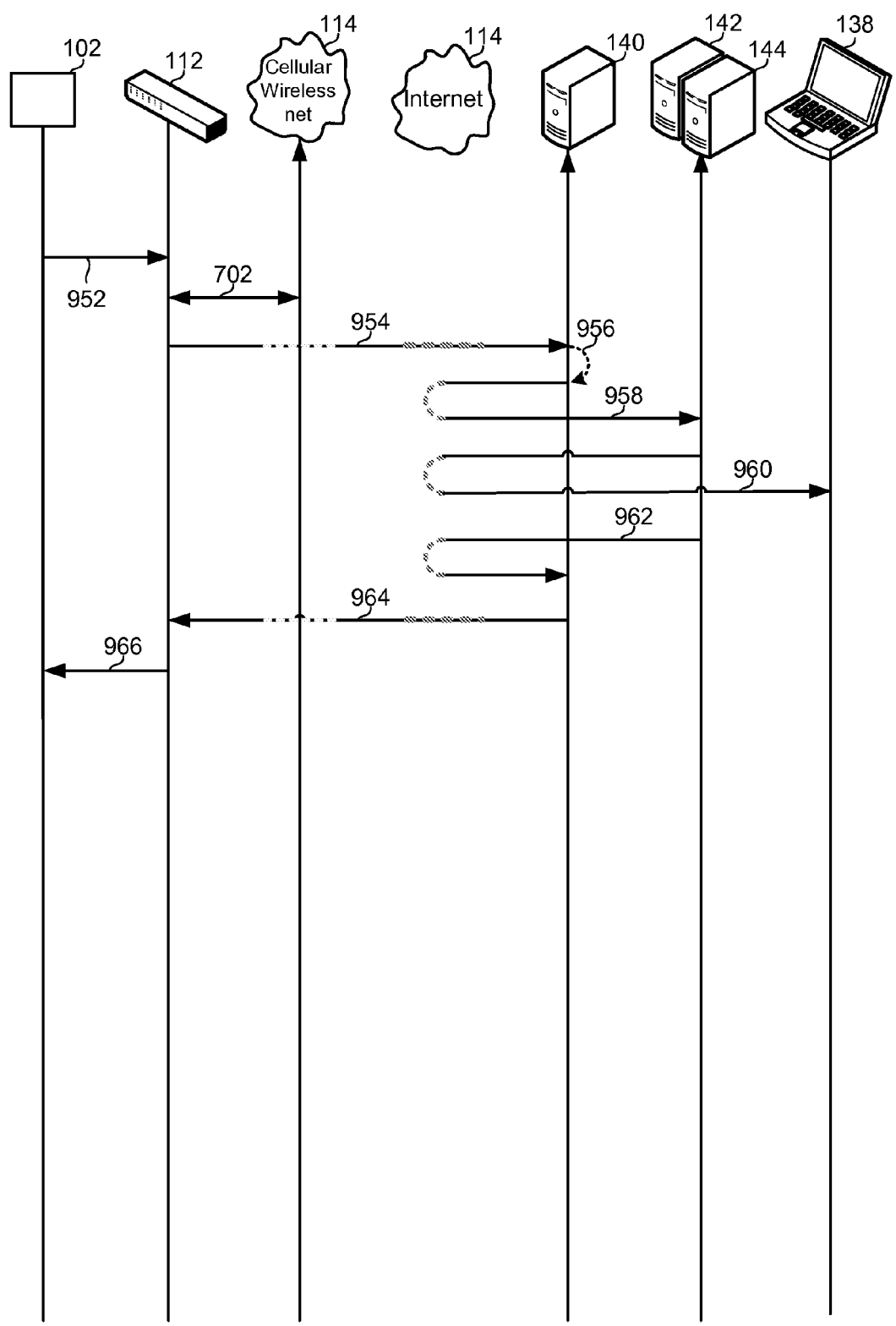
FIG. 9B is a message flow diagram illustrating messages that may be exchanged among various communication network participants during the embodiment method illustrated in FIG. 9A.

A wireless communication hub device 112 that is in a deactivated, low power, idle, or sleep mode may also be activated in response to receiving a data message from a connected electronic medical and fitness device. FIG. 9A illustrates an example method 900 for communicating data to data users initiated by a electronic medical and fitness data push. Example messages that may be passed among system components in method 900 are illustrated in FIG. 9B. Referring to FIGS. 9A (for steps) and 9B (for messages), when an electronic medical and fitness device 102 determines that it has data that should be transmitted to an appropriate data user (e.g., a medical facility, a device manufacturer, a user, etc.) it may transmit the data to the wireless communication hub device 112 via the established communication connection. Upon receiving the data message, the wireless communication hub device 112 may recognize the particular electronic medical and fitness device providing the data. This may be accomplished based upon the particular communication port through which the data signal was received or information provided with the data message, such as a device identifier. As part of this step, the wireless communication hub device processor 301 may obtain the IPv6 address, MAC ID or other unique identifier for the reporting electronic medical and fitness device that is known to be service platform server 140 (i.e., the identifier that was reported to the server during a registration and configuration process). If a data connection is not already established with a cellular wireless network 130, the wireless communication hub device 112 may activate the cellular transceiver 303 and exchange the network signaling messages 702 necessary to establish a cellular data communication link with the cellular wireless network 130. If a local wireless router 135 with access to the Internet 114 is available, the wireless communication hub device 112 may negotiate a communication link with the wireless router instead. Once connected to the cellular wireless network 130 (or a local wireless router 135), the wireless communication hub device 112 may place a data call to the service platform server 140. When a connection to the service platform server 140 is established (or as part of establishing the connection), the wireless communication hub device 112 may provide its unique identifier to the server, thereby identifying itself, step 508. Once the wireless communication hub device 112 has registered with the service platform server 140 it may transmit the data received from the electronic medical and fitness device 102. The data message also includes the identifier for the device providing the data. The service platform server 140 may use the electronic medical and fitness device identifier to determine the appropriate processing and destination for the data. If the data is to be transmitted immediately to another destination, such as a medical or device manufacturer server 142, 144, the service platform server 140 may contact the appropriate server and negotiate an appropriate encrypted communication link via the Internet 114. Once an appropriate communication link is established, the service platform server 140 may transmit the received device data to the destination server 142, 144 via the Internet 114. The destination server 142, 144 receiving the data may then process or use the data for other purposes, such as transmitting a notification message to the user's personal computer 138 via the Internet 114.

Referring to FIGS. 9A (for steps) and 9B (for messages), when an electronic medical or fitness device 102 determines that it has data that should be transmitted to an appropriate data user (e.g., a medical facility, a device manufacturer, a user, etc.) it may transmit the data to the wireless communication hub device 112 via the established communication connection, step 902 and message 952. Upon receiving the data message, the wireless communication hub device 112 may recognize the particular electronic medical or fitness device 102 providing the data, step 904. This may be accomplished based upon the particular communication port through which the data signal was received or information provided with the data message, such as an electronic medical or fitness device 102 identifier. As part of this step, the wireless communication hub device 112 processor 301 may obtain the IPv6 address, MAC ID or other unique identifier for the reporting electronic medical or fitness device that is known to be service platform server (i.e., VPH-server) 140 (i.e., the identifier that was reported to the service platform server 140 during a registration and configuration process). If a data connection is not already established with a cellular wireless network 130, the wireless communication hub device 112 may activate the cellular transceiver 303 and exchange the network signaling messages 702 necessary to establish a cellular data communication link with the cellular wireless network 130. If a local wireless router 135 with access to the Internet 114 is available, the wireless communication hub device 112 may negotiate a communication link with the local wireless router 135 instead. Once connected to the cellular wireless network 130 (or a local wireless router 135), the wireless communication hub device 112 may place a data call to the service platform server 140, step 506. When a connection to the service platform server 140 is established (or as part of establishing the connection), the wireless communication hub device 112 may provide its unique identifier to the service platform server 140, thereby identifying itself, step 508. Once the wireless communication hub device 112 has registered with the service platform server 140 it may transmit the data received from the electronic medical or fitness device 102, step 910 and message 954. The data message transmitted in step 910 and message 954 also includes the identifier for the electronic medical or fitness device providing the data. The service platform server 140 may use the electronic medical or fitness device identifier to determine the appropriate processing and destination for the data, step 912 and processing 956. If the data is to be transmitted immediately to another destination, such as a medical or device manufacturer server 142, 144, the service platform server 140 may contact the appropriate server and negotiate an appropriate encrypted communication link via the Internet 114, step 914. Once an appropriate communication link is established, the service platform server 140 may transmit the received device data to the destination server 142, 144 via the Internet 114, step 916 and message 958. The server 142, 144 receiving the data may then process or use the data for other purposes, such as transmitting a notification message to the user's personal computer 138 via the Internet 114, message 960.

As noted above, the service platform services may be two-way, enabling data users to also transmit commands or messages back through the wireless communication hub device 112 to selected electronic medical or fitness devices. This may involve a data user server 142, 144 transmitting a message 962 addressed to a particular electronic medical or fitness device to the service platform server 140, which receives the message via the Internet 114, step 918. The service platform server 140 re-addresses the message to the particular electronic medical or fitness device IPv6 address, step 920, and transmits the message to the wireless communication hub device 112 via the Internet 114, step 922 and message 964. The wireless communication hub device 112 receives the messages and relays them onto the addressed the electronic medical or fitness device, step 924 and message 966. The addressed electronic medical or fitness device then processes or displays the message, step 926.

A practical implementation example may clarify the processing described above with reference to FIGS. 9A and 9B. Since sudden weight gain can be an indicator of some serious medical conditions, providing such information to a medical facility may be useful for advising patients when they need to take medication or see a doctor immediately. To enable such early warning with minimal effort by patients, an electronic bathroom scale may be configured as an electronic medical or fitness device with a wireless (or wired) transceiver that couples to a wireless communication hub device 112 to transmit weight readings whenever a user starts on the scale. The scale, the wireless communication hub device 112, and/or the service platform server 140 may be configured (e.g., as part of a registration process) to promptly forward scale readings to a medical facility server 142 that is tracking a patient's weight. When a user steps on the scale, the weight reading may be automatically transmitted to a destination server 142 that can process the information without any action or involvement on the part of the user. If the medical facility server 142 detects a sudden change in weight that may indicate a condition requiring a medical intervention (e.g., taking a medication or visiting a doctor), the server 142 may transmit a message to be displayed on an appropriate electronic medical or fitness device (e.g., the weight scale) that the user is likely to see. Thus, the medical facility server 142 may transmit a message using the service platform services so that it is receives by an electronic medical or fitness device (such as an LCD display, a digital picture frame, or other device with a display) informing the user to take the proper precautions.

Figure 9C:
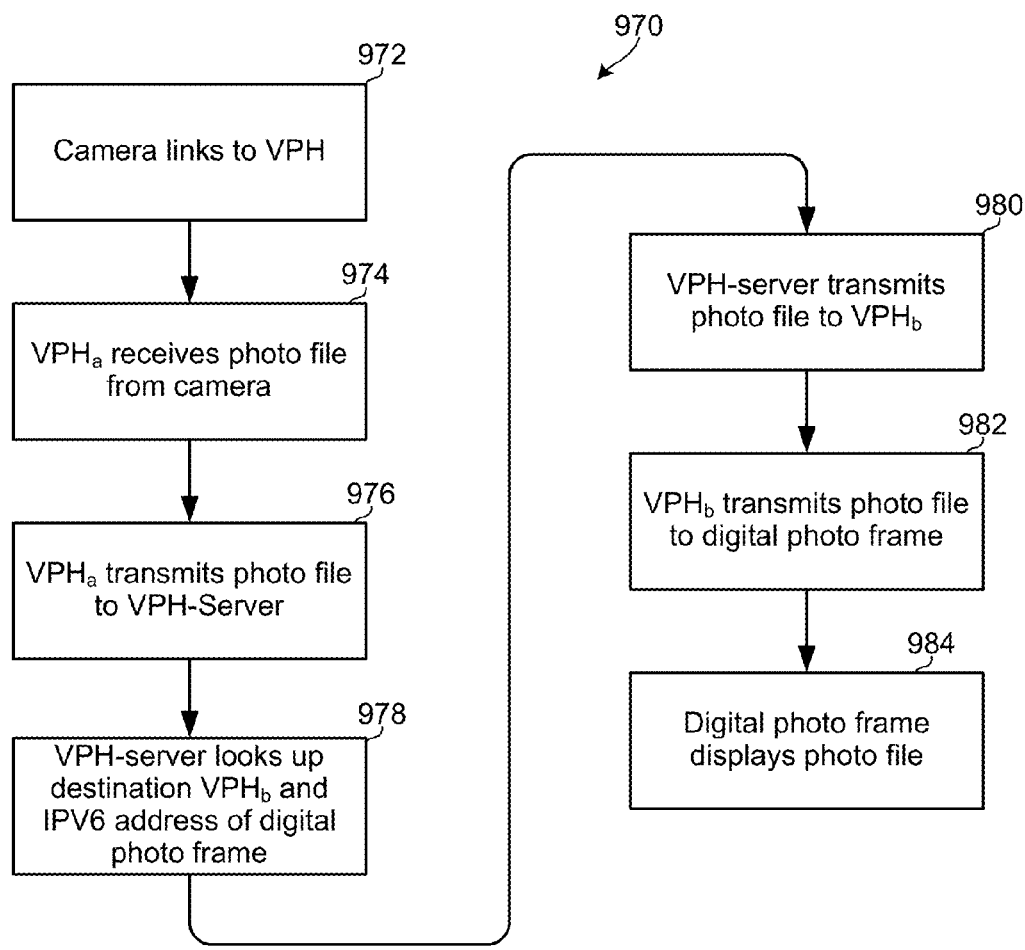
FIG. 9C is a process flow diagram of an embodiment method implemented in a wireless communication hub device for transmitting data received from a peripheral device to another peripheral device coupled to another wireless communication hub device.
Figure 9D:
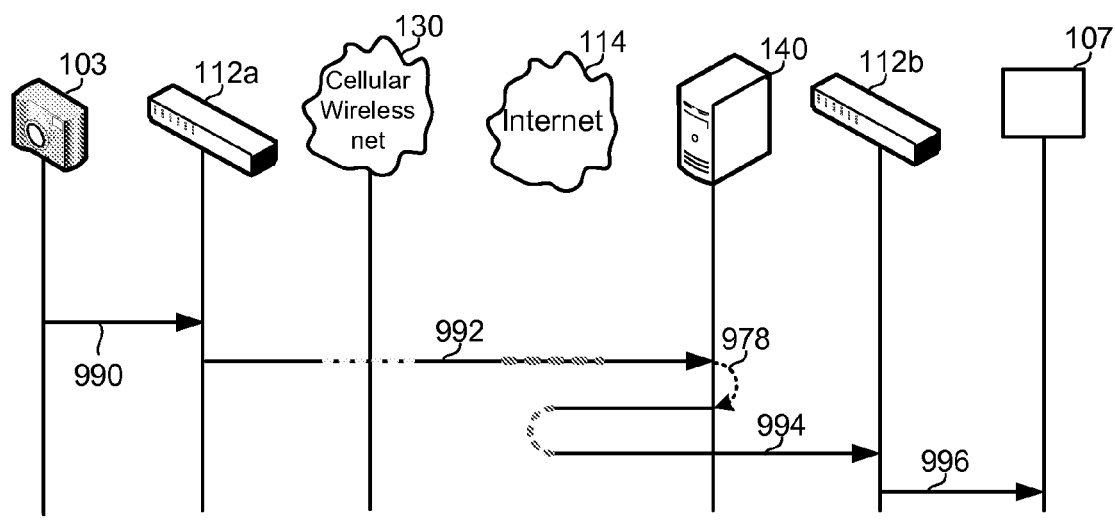
FIG. 9D is a message flow diagram illustrating messages that may be exchanged among various communication network participants during the embodiment method illustrated in FIG. 9C.

Another example of useful applications of service platform services is the automatic distribution of digital camera images as illustrated in FIGS. 9C and 9D. A common problem faced by owners of digital cameras is the efficient distribution of their photos to their friends and family. A recent innovation that is useful in this regard is a digital photo frame which includes a LCD display coupled to memory for storing digital photos. Some digital photo frames are equipped to connect to a network so that downloading images can be accomplished very simply. However, many of the potential purchasers of digital photo frames may lack the technical savvy to install a home network and couple it to a digital photo frame. The wireless communication hub device 112 and the associated service platform services may rectify the challenges of connecting a digital photo frame to the Internet so that users may easily receive photos from their friends and family without having to become masters of computer networking technologies.

Referring to FIGS. 9C (for steps) and 9D (for messages), a user who has taken photographs may link their digital camera 103 to a wireless communication hub device 112a such as by means of a USB cable, FireWire cable or a local wireless connection (e.g., a Bluetooth® wireless link), step 972. Once connected, the wireless communication hub device 112a may receive a photo file from the camera 103 (e.g., that has been designated for sharing), step 974 and message 990. The wireless communication hub device 112a may establish a link to the service platform server 140 and transmit the received photo file, step 976 and message 992. The service platform server 140 may be configured (e.g., by user preference settings established in an online session) to forward photo files to a particular destination, such as an IPv6 address of a digital photo frame 107. Thus, the service platform server 140 may use the identifier for the wireless communication hub device 112a to look up the appropriate destination for a received photo file (e.g., the IPv6 address of the digital photo frame), step 978, and transmit the photo file via the Internet 114 to the wireless communication hub device 112b coupled to the digital photo frame 107 (i.e., the destination peripheral device 106, step 980 and message 994. The receiving wireless communication hub device 112b relays the received photo file to the destination digital photo frame 107, step 982 and message 996, and the digital photo frame 107 may display the photo, step 984.

Figure 10:
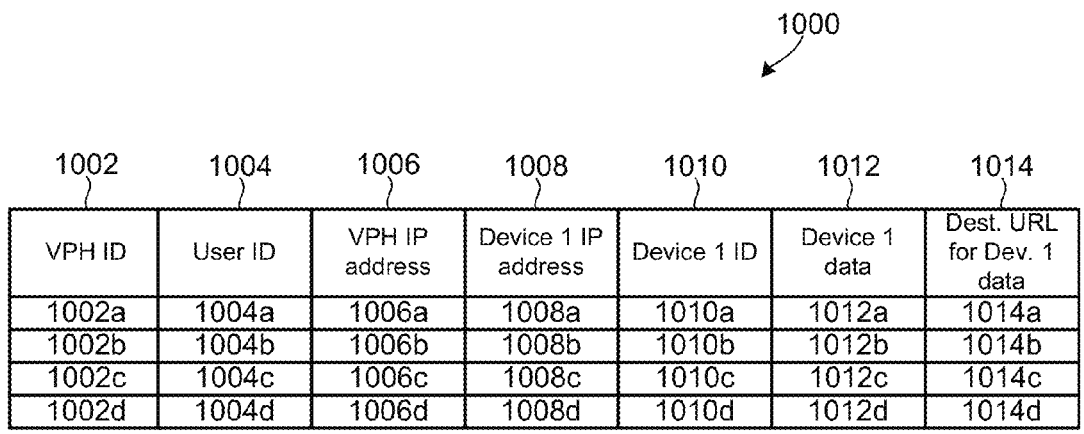
FIG. 10 is an example data structure suitable for use in a service platform server according to various embodiments.
Figure 11:
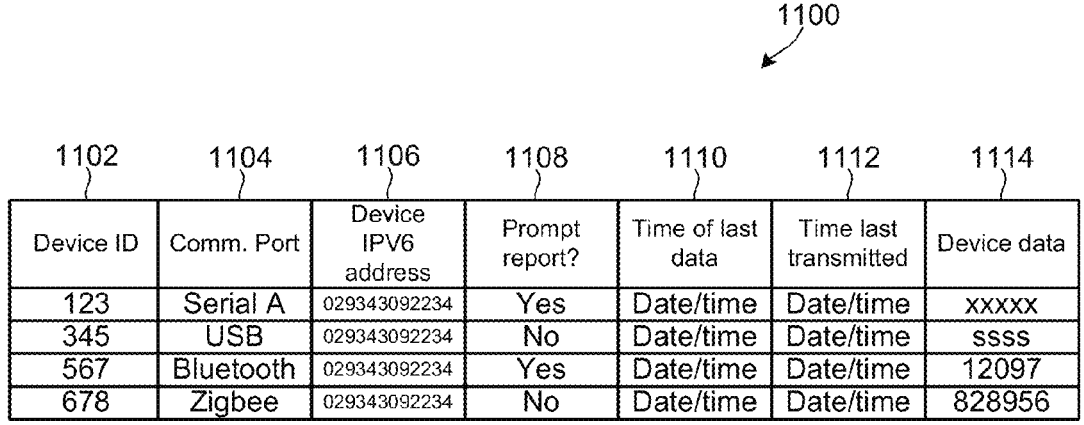
FIG. 11 is an example data structure suitable for use in a wireless communication hub device according to various embodiments.

The service platform server 140 may implement well known data structures in order to support the service platform services of the various embodiments, an example of which is shown in FIG. 10. For example, the service platform server 140 may maintain a database of user accounts 1000 which the service platform server may use to associate particular users with particular wireless communication hub devices and connected peripheral devices. Such a data structure 1000 may comprise a plurality of data records (shown as rows) each comprising a plurality of data fields 1002-1014. For example, a data field 1002 may be provided for storing the unique identifier for the wireless communication hub devices, and a data field 1004 may be provided for storing a user identifier (e.g., a user account number or user name). The data structure 1000 may also include a data field 1006 for storing an IP address that the service platform server 140 may use to send messages to the wireless communication hub device 112 via the Internet 114. Further, the data structure 1000 may include a plurality of data fields for each peripheral device plugged into the wireless communication hub device, including such information as a device IPv6 address (data field 1008), a device ID (data field 1010), one or more data fields for storing device data (data field 1012), and a URL (or other type of address) to which data received from a device should be forwarded (data field 1014). Using such a data table, a service platform server 140 receiving a message including a wireless communication hub device identifier can quickly locate the data record associated with a particular device, and thereby determine the associated user and its connected peripheral devices. Similarly, a service platform server 140 accessed via the Internet by a user providing a user name or user account number can quickly locate the data record associated with the user, and thereby may determine the associated wireless communication hub device, its address and the peripheral devices plugged into it.

The wireless communication hub device 112 may also be configured with memory for storing peripheral device data in a data structure 1100. The wireless communication hub device 112 may use such a data structure to determine whether to report received device data promptly or to store the data temporarily for later forwarding to the service platform server 140. For example, the data structure 1100 may include a data record for each peripheral device plugged into the wireless communication hub device 112, with each data record comprising a plurality of data fields 1102-1114. For example, the data structure 1100 may include a data field 1102 for storing the peripheral device identifier (e.g., MAC ID), a data field 1104 for storing information regarding the communication port coupled to that particular peripheral device, a data field 1106 for storing an IPv6 address assigned to the peripheral device, a data field 1108 for storing information regarding how the wireless communication hub device should treat the data (e.g., whether to promptly report received data or not), a data field 1110 for storing the date and time of the last data received from the device, a data field 1112 for storing the last time that data from the peripheral device was transmitted to the service platform server 140, and one or more data fields 1114 for storing data received from the peripheral device. Using such a data structure 1100, the wireless communication hub device 112 can be configured to support a wide variety of data management services for connected peripheral devices.

Figure 12:
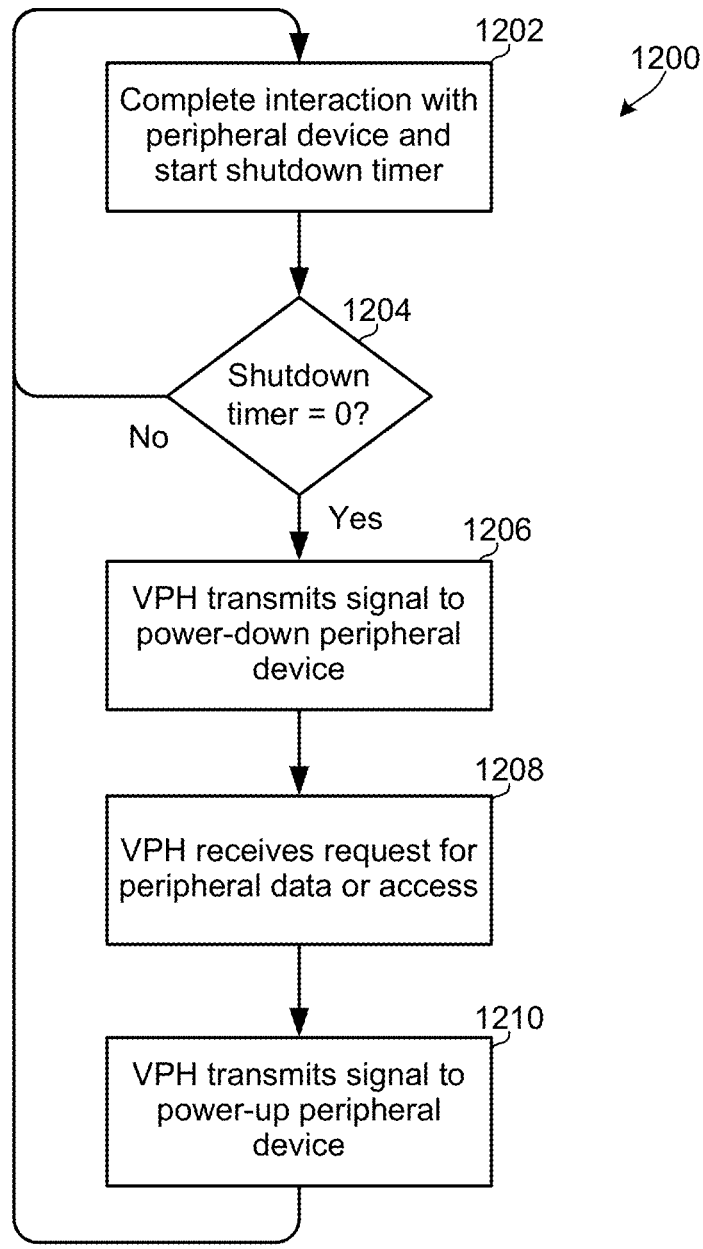
FIG. 12 is a process flow diagram of an embodiment method for activating and deactivating peripheral devices from the wireless communication hub device.

Another service enabled by the wireless communication hub device 112 is the ability to power up peripheral devices only when accessed. An embodiment method 1200 for enabling this is illustrated in FIG. 12. In an embodiment, the wireless communication hub device 112 may be configured with an idle shutdown timer. In block 1204 the wireless communication hub device processor may complete interaction with a peripheral device and start the shutdown timer. In determination block 1204 the wireless communication hub device processor may monitor the shutdown timer to determine whether the timer has expired. If another interaction with that peripheral device is accomplished before the countdown timer has expires (i.e., determination block 1204="No"), the countdown timer may be restarted by returning to step 1202. If the countdown timer expires (i.e., determination 1204="Yes"), in block 1206 the wireless communication hub device processor may transmit a signal to the peripheral device commanding it to power down. Powering down the peripheral device may allow it to conserve battery power or device lifetime while not in use. In block 1208 the wireless communication hub device processor may receive a request for data from, or a request for access to, that peripheral device. In block 1210 the wireless communication hub device processor may transmit a signal to that peripheral device commanding it to power up. Once the interaction with that peripheral device is completed, the shutdown timer may be restarted in block 1202.

The wireless communication hub device 112 and the service platform services may enable a large number of server-based operations of potential value to consumers and businesses. Since the wireless communication hub device 112 provides simple access to a variety of peripheral devices without requiring installation of servers and Internet access routers, data from a wide range of electronic devices may be made available to establishments and businesses that can benefit from such data. In an embodiment, the use of the intermediate service platform server 140 may enable batched or server-initiated operations. Such services and operations may take the form of add-on services that may access the peripheral devices for context-sensitive operations. An example may be security monitoring via webcams where the webcam is "awakened" so that small clips or snapshots may be taken and transmitted to the service platform server 140 for later retrieval. Another example involves monitoring content sites and downloading specific content to mass storage. Another example includes batch uploads from connected, non-network-enabled devices, such as digital cameras. A further example is server-initiated uploads from automotive diagnostic systems.

Figure 13:
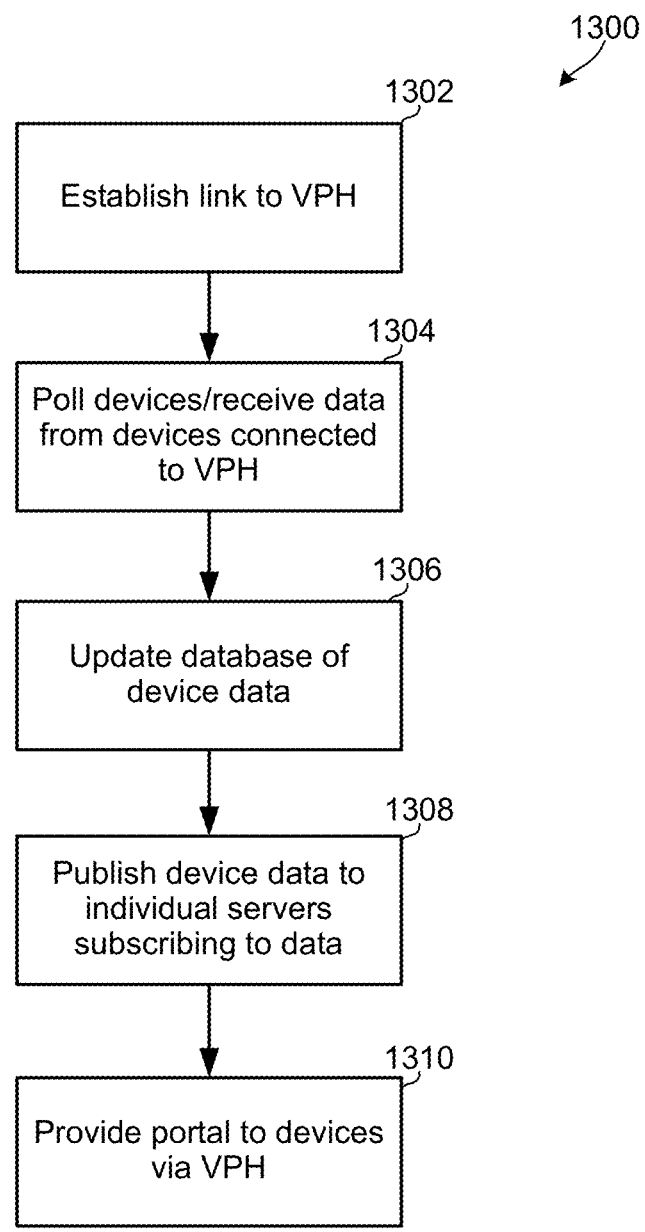
FIG. 13 is a process flow diagram of an embodiment method that may be implemented in a server for utilizing data obtained via a wireless communication hub device.

An example method 1300 which may be implemented by the service platform server 140 to provide such server-based services is illustrated in FIG. 13. In block 1302, periodically, the service platform server 140 may establish a communication link to a wireless communication hub device 112 using the methods described above. In block 1304 once a communication link is established, the service platform server 140 may send messages to the wireless communication hub device 112 to poll the connected peripheral devices and receive their data as described above. In block 1306 the service platform server 140 may then use the received device data to update a database, and in block 1308 may publish this database of device data to individual servers subscribing to the data. Subscribers to the peripheral device data (e.g., security services companies, hospitals, device manufacturers, automobile maintenance companies, etc.) may subscribe to just the data that is of interest to them. In block 1310 the service platform server 140 may provide data subscribers access to the peripheral devices if needed, as the service platform server 140 can function as a portal to peripheral devices via the registered wireless communication hub device 112.

The various embodiments may enable a number of useful applications, some examples of which are described below. The wireless communication hub device 112 and service platform server 140 may provide web access to a user's peripheral devices from any computer with Internet access. In such applications, the service platform server 140 may act as the computer connected to the peripheral devices and provide access to the device data and commands via a web browser. For example, a peripheral device may be a remote hard drive (e.g., a USB hard drive coupled to the wireless communication hub device 112 with a USB cable), in which case the service platform services may enable a user to browse and access content on the remote hard drive from any web browser. Another example may involve viewing images from webcams connected to the wireless communication hub device 112. Another example may involve accessing the results of peripheral device operations conducted offline from any web browser. In a further example, the service platform server 140 may be configured to host e-mail accounts where the actual data is stored on a remote hard drive coupled to a wireless communication hub device 112. This application may allow users to maintain complete control over their personal email data while the e-mail service functions as if the e-mail message data were hosted on a server.

The service platform services may also be used to quickly enable remote access to mass storage devices. As an example, a mass storage device may be plugged into a wireless communication hub device 112 so that users may access the data stored on the storage device via the service platform server 140. This may not only provide data security but may also allow the users to share data across groups or access the data from any web browser.

Another example service platform service may involve providing remote vehicle diagnostics by plugging a wireless communication hub device 112 into a vehicle diagnostic port via a special USB cable. A wireless communication hub device 112 connected to this USB cable may allow remote and active diagnosis and monitoring of vehicles with no further investment in infrastructure or electronics since the service platform services utilize the infrastructure of cellular telephone networks and the Internet. As mentioned above, such services could extend to providing emergency communication services.

Another example provided service platform service may be to provision X10 home control systems for consumers. The X10 protocol enables devices to communicate via the home electrical wiring and has been used for controlling household appliances, setting up security systems, and the like. As an example, the wireless communication hub device 112 may be configured to communicate with other X10 system components, such as via the electrical wiring into which it is plugged, and relay configuration instructions received from the service platform server 140 to the other X10 devices. This may simplify the set up and configuration of such home control systems by relieving the user of the many of the tasks associated with establishing an X10 control system, beyond plugging devices into electrical sockets.

In a further embodiment, the wireless communication hub device 112 and the service platform server 140 may provide home automation and control capabilities without the need for a dedicated automation system. As an example, devices and household systems to be controlled may be plugged into the wireless communication hub device 112, either directly or via wireless networks (e.g., Bluetooth®, Wi-Fi, etc.), such that the devices and household system functions may be controlled by the service platform server 140 or computers accessing the service platform server 140. For example, one of the service platform services may be home control capabilities, providing a server-hosted control system that users may configure by accessing the service platform server 140 via a computer. Once the home automation/control settings are entered by a user, the service platform server 140 may send commands via the wireless communication hub device 112 as needed to control the devices and household systems plugged into the wireless communication hub device 112. In this manner, a low cost, highly configurable home automation system may be provided based around one or more wireless communication hub devices 112 positioned within the home.

While the various embodiments have been described with reference to a standalone wireless communication hub device 112, the functionalities of the wireless communication hub device 112 described above may also be implemented in other communication devices equipped with a processor that may perform the wireless communication hub device functionality and a transceiver for coupling to a wireless network, such as a cellular data network 130. For example, the wireless communication hub device functionality may be implemented as a wireless communication hub device application running on a cellular telephone. Many cellular telephones include programmable processors that may be configured with a wireless communication hub device application, as well as multiple wireless transceivers that may be used to establish communication links with electronic medical and fitness devices and/or other peripheral devices. Also, some cellular telephones include wired connection ports, such as USB or FireWire ports that may be coupled to peripheral devices. To implement the wireless communication hub device functionality in a mobile device, for example, a wireless communication hub device application may be implemented in the device processor, and the device processor may then perform the various embodiment connection and communication functions described above.

As mentioned above, the wireless communication hub device 112 user interface may be as simple as one, two, or a few LEDs or other form of lights. In an embodiment, the wireless communication hub device 112 may be configured with circuitry for controlling the one, two, or a few LEDs in a manner that minimizes the number of processor pins dedicated to the LEDs. In an embodiment, the input lines connected to the processor of the communication hub device to generate pulse width modulated signals may be fewer in number than a total number of the different light emitting diode elements to be controlled by the wireless communication hub device 112.

Figure 14:
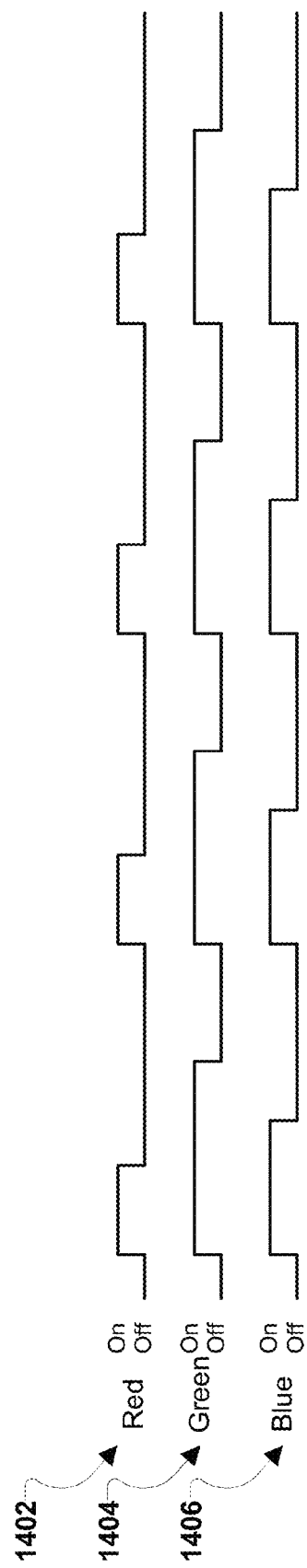
FIG. 14 is a signaling vs. time diagram illustrating control signals that may be implemented to control a three color LED.

Three color (i.e., red, green, and blue) LED complexes (i.e., 3 elements per LED complex, a red LED, a green LED, and a blue LED) may be enabled to display millions of different colors by varying the intensity of the light coming from each of the three elements. For example, the color yellow may be generated by turning on the green LED and operating the red LED at approximately one quarter of the intensity of the green LED. This may be achieved by flashing the green LED and red LED very rapidly (e.g., greater than 24 flashes per second) and varying the length of time each LED is turned on (i.e., the duty cycle) during each of the flashes. FIG. 14 illustrates example waveforms for generating a brown color with a three color LED complex. Waveform 1402 illustrates the waveform applied to the red LED, waveform 1404 illustrates the waveform applied to the green LED, and waveform 1406 illustrates the waveform applied to the blue LED.

In order to provide color from a red/green/blue multi-element LED, it may be necessary to have fine control over the intensity of each element to provide the full color range. In other control systems, the control may be achieved using a pulse width modulator for each LED element. Therefore, it may take 6 PWM signals to control two LED RGB complexes (i.e., 3 elements per each LED) to generate the full range of color.

In an embodiment, the required signals to control two LED RGB complexes (i.e., two LEDs, each with their own respective red element, green element, and blue element) may be reduce to 4 signals. This technique although, described for the case of 6 LED elements, may be extended to any number of LED elements with similar results. As an example, 7 pulse width modulated signals may be used to drive 12 LED elements. In an embodiment, the individual signals may be generated by pulse width modulator circuits that may be available on the processor of the wireless communication hub device 112. The use of pulse width modulator circuits may be advantageous because the pulse width modulator circuits may enable the period, duty cycle, and phase for each circuit to be set and once set the processor may continually generate the set pattern without requiring further software interactions, thereby conserving processor resources and/or improving response time.

Figure 15A:
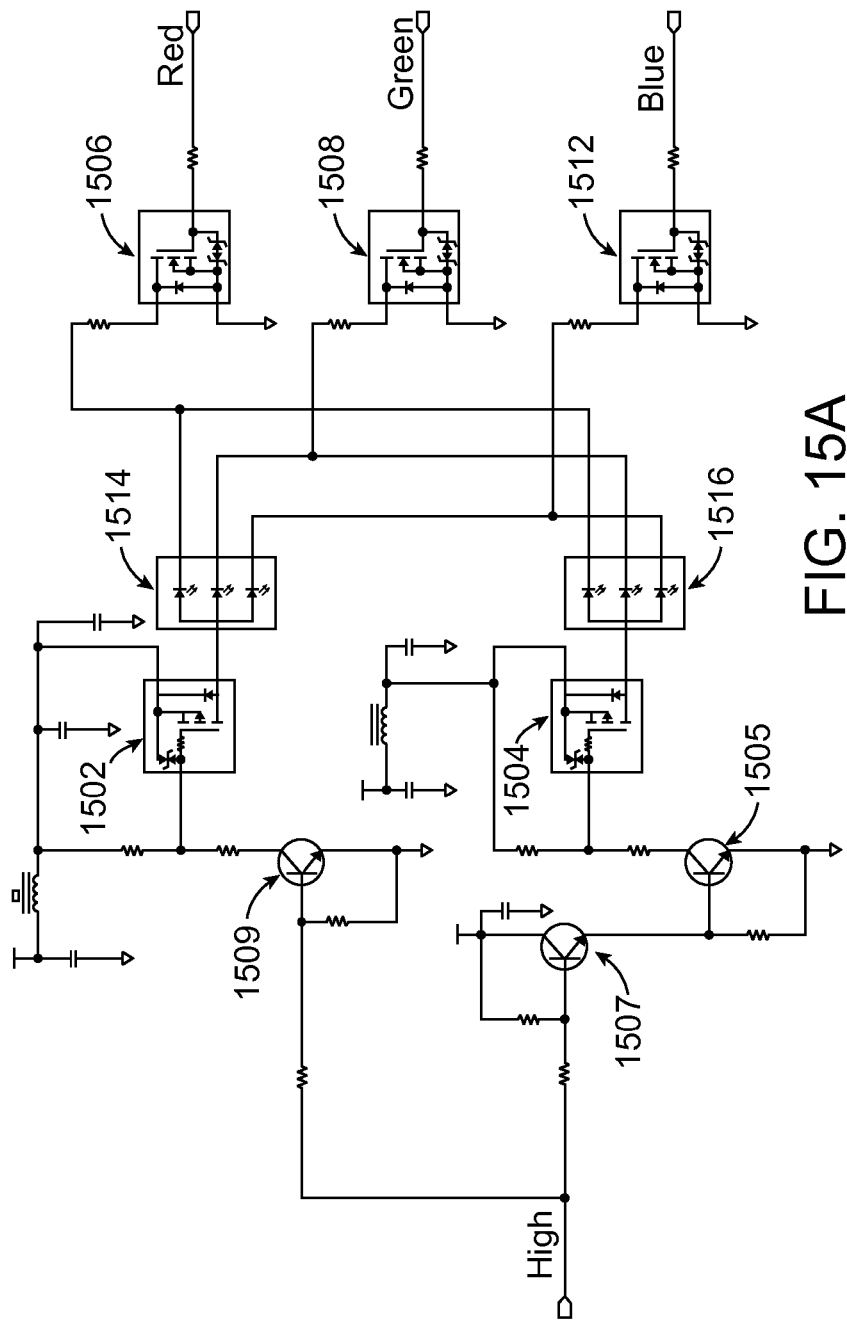
FIGS. 15A and 15B are circuit diagrams of an embodiment circuit for controlling display lights on a wireless communication hub device.
Figure 15B:
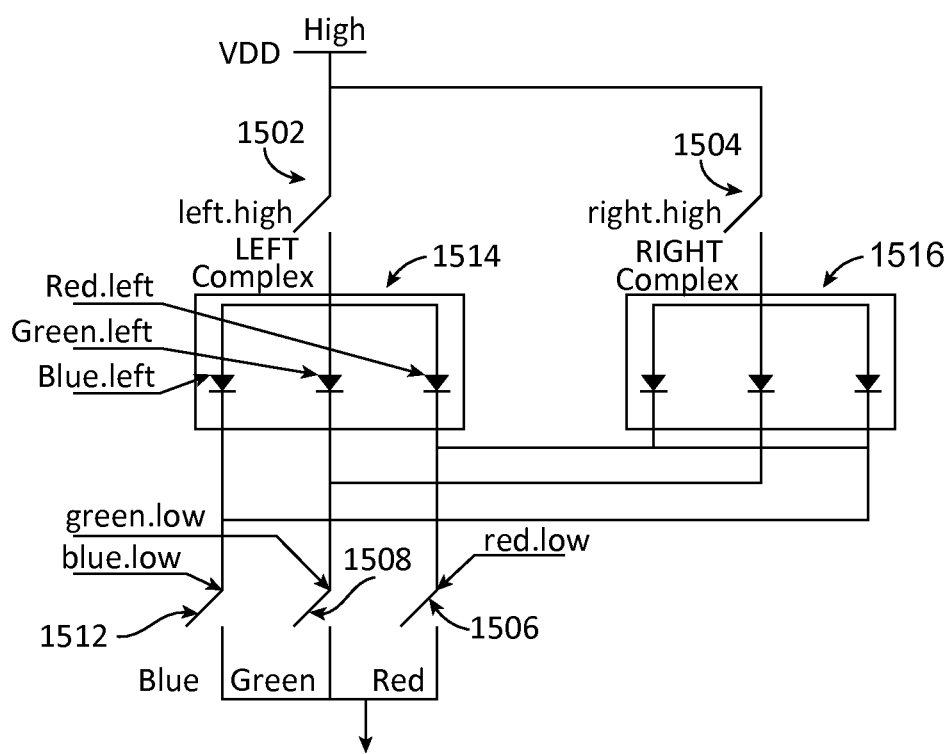

In an embodiment, to control elements with reduced signals, the control of position or phase and duty cycle of the pulse width modulated signals may be used. In general, each element's intensity may be independently adjusted. Ideally each element's intensity may be independently controlled to output between 0% and 100% light output. FIG. 15A and FIG. 15B illustrate embodiment circuits that may enable independent control of the output of each element's intensity between 0% and 100% light output. In an embodiment, the intensity of no element may ever be set to 100% duty cycle. In such a configuration, 100% light output may be when the LED is running at 50%. By increasing the current, the average light output as seen by the human eye may still be the maximum and perceived at 100%. In an embodiment, the position or phase and duty cycle of the pulse width modulated signals may control the color of light output by the LED, and different pulse width modulated signals may be generated to adjust the color of light output by the LED(s).

Referring to FIG. 15A, a the method for delivering current to two different three element LEDs 1514 and 1516 may be implemented by high side and low side switching controlled by pulse width modulated signals. When current is delivered, light is produced by the LEDs 1514 and 1516. Therefore, in this embodiment, two LEDs 1514 and 1516 may be controlled as left and right, respectively, so the terminology would be left.blue, left.red, left.green, right.blue, right.red, right.green, etc. The high side of the left LED 1514 may be controlled by left high side switch 1502 which is coupled to each element (i.e., red, green, and blue) of LED 1514. The high side of the right LED 1516 may be controlled by the right high side switch 1504 which is coupled to each element (i.e., red, green, and blue) of LED 1516. The low side of the red elements of LEDs 1514 and 1516 may be controlled by a red low switch 1506. The low side of the green elements of LEDs 1514 and 1516 may be controlled by a green low switch 1508. The low side of the blue elements of LEDs 1514 and 1516 may be controlled by a blue low switch 1512. As an example, control for the blue element of LED 1514 may be further described as blue.low meaning that the blue low side switch 1512 is engaged allowing current to flow, and left.high which means that left high side switch 1502 is engaged and current is being supplied to the blue element of left side LED 1514.

Similar descriptions may be applied to the right side. In an embodiment, the high side current may be provided to the left high side switch 1502 through a transistor 1509 and the high side current may be provided to the right high side switch 1504 through two transistors 1507 and 1505. In an embodiment, the transistor 1505 may operate as a switch to invert the current provided to the right high side switch 1504. In this manner, the left high side switch 1502 and right high side switch 1504 may receive mirror image waveforms from the high input. In an embodiment, the pulse width modulated signals generated by the processor of the wireless communication hub device may control the activation and deactivation of switches 1502, 1504, 1506, 1508, and 1512 and thus control the current provided to the elements of the left side LED 1514 and/or right side LED 1516. FIG. 15A shows an implementation as it is described. FIG. 15B shows a logical description of the system according to an embodiment. In an embodiment, the phase and/or duty cycle of the pulse width modulated signal generated on the low side red signal line relative to the phase and/or duty cycle of the pulse width modulated signal generated on the high side signal line may control the intensity of the red element of the left LED 1514 and the red element of the right LED 1516 by controlling the operation of switches 1502, 1504, and 1506. In an embodiment, the phase and/or duty cycle of the pulse width modulated signal generated on the low side green signal line relative to the phase and/or duty cycle of the pulse width modulated signal generated on the high side signal line may control the intensity of the green element of the left LED 1514 and the green element of the right LED 1516 by controlling the operation of switches 1502, 1504, and 1508. In an embodiment, the phase and/or duty cycle of the pulse width modulated signal generated on the low side blue signal line relative to the phase and/or duty cycle of the pulse width modulated signal generated on the high side signal line may control the intensity of the blue element of the left LED 1514 and the blue element of the right LED 1516 by controlling the operation of switches 1502, 1504, and 1512.

The following scenarios describe examples of various modes/methods that may be used to accommodate the requirements, signal information to the user, etc. First, is a scenario whereby left and right elements are both enabled to some degree. Second, is a scenario whereby the left element is enabled somewhat but right is completely off. Third, is a scenario whereby left.blue and left.green are enabled somewhat and right.blue and right.red are enabled somewhat while right.green is completely deactivated.

Figure 15C:
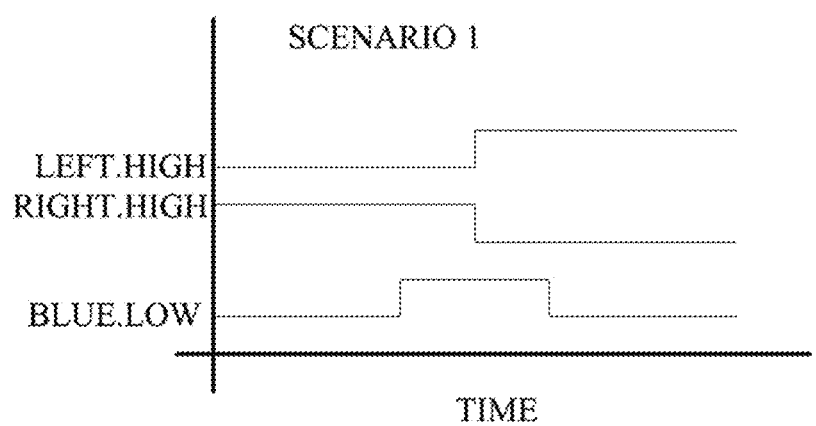
Figure 15D:
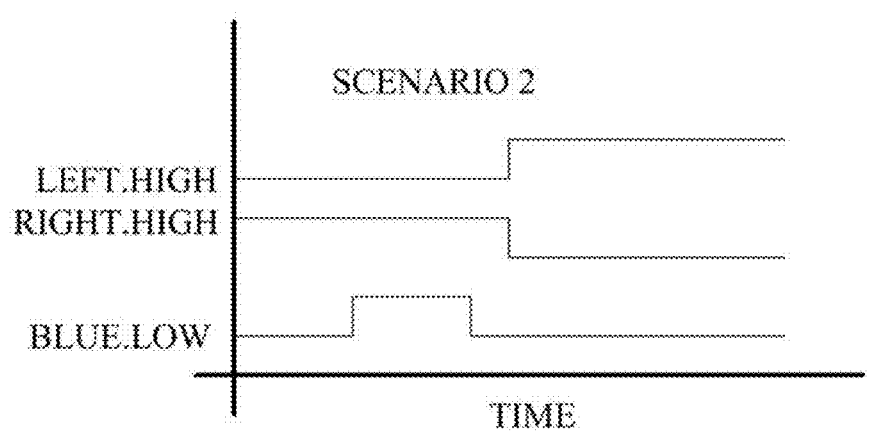
Figure 15E:
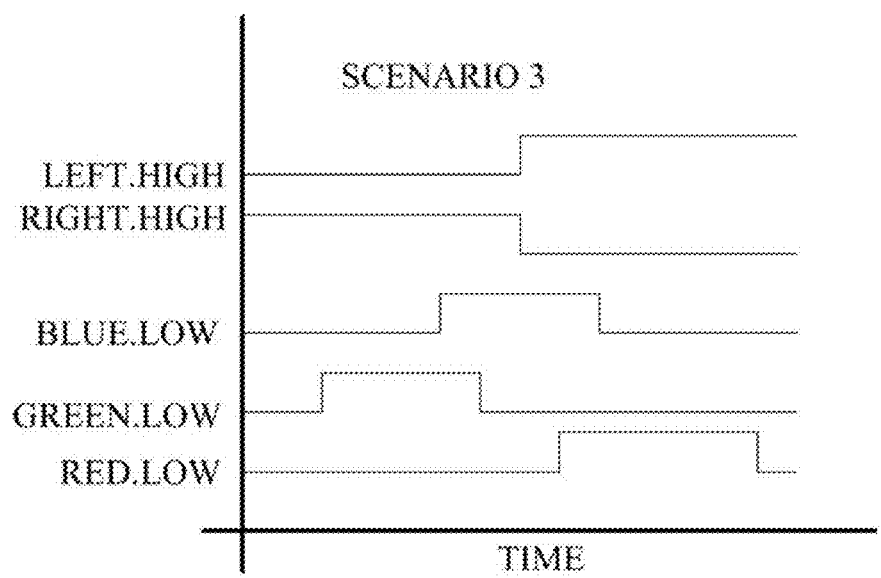

Using a combination of the above scenarios, the system may accommodate any color from either of the LED complexes as required. FIG. 15B describes the logical implementation of the system to be used as an example. FIG. 15C demonstrates scenario 1, FIG. 15D demonstrates scenario 2, and FIG. 15E demonstrates scenario 3. FIG. 15F illustrates the waveforms 1550, 1552, 1554, 1556, and 1558 for driving the two LEDs 1514 and 1516 using four PWM control signals, PWM 1 (High), PWM 2 (Red), PWM 3 (Green), and PWM 4 (Blue). The left waveform 1550 and the right waveform 1552 may be derived from a single PWM, PWM 1 (High) by a connecting one signal to a transistor inverter, for example transistor 1505 discussed above with reference to FIG. 15A. FIG. 15F illustrates that in an embodiment the timing signals may be rearranged to enable Red, Green, and Blue waveforms 1554, 1556, and 1558, respectively, to be generated continuously by pulse width modulator circuits. The timing of the waveforms 1554, 1556, and 1558 may be adjusted so that the active portion (i.e., ON) of the waveforms coincides with end of the left waveform's 1550 active period (i.e., ON). The right LED's Red, Green, and Blue waveforms may be left in the same relative position. This may cause the end of the active portion of the left LED waveforms to abut the beginning of the right LED's waveforms. The pulse width modulator circuits may be programmed to generate the repeating pattern as illustrated in FIG. 15F. In this manner, any desired color may be programmed independently for each LED using only four PWM signals.

In an embodiment, once the PWM system is programmed, it may be free running without software intervention until an eye-perceivable event is needed. The eye-perceivable event may be a color change, an intensity change, or a combination of the two. In an embodiment, the software may copy programming values for the pulse width modulating structure (e.g., a controller) for the next state (i.e., next perceived state) and write the values to the various registers comprising the control registers for the pulse width modulation sub-system. In an alternate embodiment, the values may be calculated each time a change is required and then written to the registers. In this manner a very complex color and intensity schema may be implemented with very low system processor involvement.

In an alternative embodiment, rather than splitting the high side pulse width modulated signal and inverting the pulse width modulated signal with transistor 1505 to control switch 1504, the extra transistor 1505 may be avoided by providing a second high side pulse width modulated signal to control the operation of switch 1504. In this manner, one high side pulse width modulated signal may control the operation of switch 1502 a second high side pulse width modulated signal may control the operation of switch 1504. In an embodiment, the second high side pulse width modulated signal provided to switch 1504 may be generated to be the exact inversion of the first high side pulse width modulated signal provided to the switch 1502.

Using the circuitry and control methods described above, the wireless communication hub device 112 may be controlled by software executing on the wireless communication hub device 112 and/or remotely through the service platform server 140 to provide a steady-state ON mode, a flashing mode, combinations of steady-ON and periodic flashing, high intensity brightness, low intensity brightness, various colors (e.g., blue to indicate one thing and red to indicate another), and combinations of any of these conditions or displays. The various lights and light panels that may be included in the wireless communication hub device 112 may be controlled by software to communicate a variety of different types of information, including, for example reminders (e.g., to take a pill or to purchase more medications), an alert (e.g., regarding status of the device or to draw attention to an event or operating state), and/or a confirmation (e.g., confirmation that a message has been sent, that the wireless communication hub device 112 is coupled and communicating with medical devices, or that a remote server has been linked to the wireless communication hub device 112).

The reminders that may be communicated by the lights or light panel may also be multifaceted, such as to provide reminders to take a pill, reminders to take a measurement or administer a test (e.g., with a glucometer), reminders to order new medications, etc. Similarly, the alerts provided by the lights or light panel may be multifaceted, such as alerts to contact the user's physician, that a medical device reading raises concern or requires attention, that a system problem exists, that a coupled device requires servicing or new batteries, etc.

Additionally, one or more of the lights or light panel may function as a night light, which may be activated by the user, by an internal clock and/or a coupled device. Further, as mentioned above, any of the various operating modes of the lights and/or light panel may be controlled remotely, such as through the service platform server 140, so that reminders, alerts, confirmations and/or activation of the night light may be initiated remotely (e.g., by a server, a physician, a pharmacy, a caregiver, etc.).

As an example, upon successful delivery of medical data from the wireless communication hub device to the service platform server, an indication may be sent from the service platform server to the wireless communication hub device and in response the wireless communication hub device may flash a blue light a few times to indicate to the end-user that their medical data has been successfully received by the service platform server and lined up for ultimate delivery to the final destination (e.g., a health care provider, service provider, etc.).

As another example, upon plugging in the wireless communication hub device to an electrical socket and successful boot-up of the wireless communication hub device, a light may be flashed to give an indication of the status of the wireless communication hub device's short range radios. As a further example, a yellow light illuminated on the wireless communication hub device may indicate that the wireless communication hub device may be enabled to receive data from a previously paired electronic medical and fitness device and the light being off may indicate that the wireless communication hub device may be able to be paired with a new electronic medical and fitness device.

In one or more exemplary aspects, a processor executing the embodiment methods described herein may be a pulse width modulation peripheral machine that can be configured with configuration settings or configuration instructions.

Figure 16:
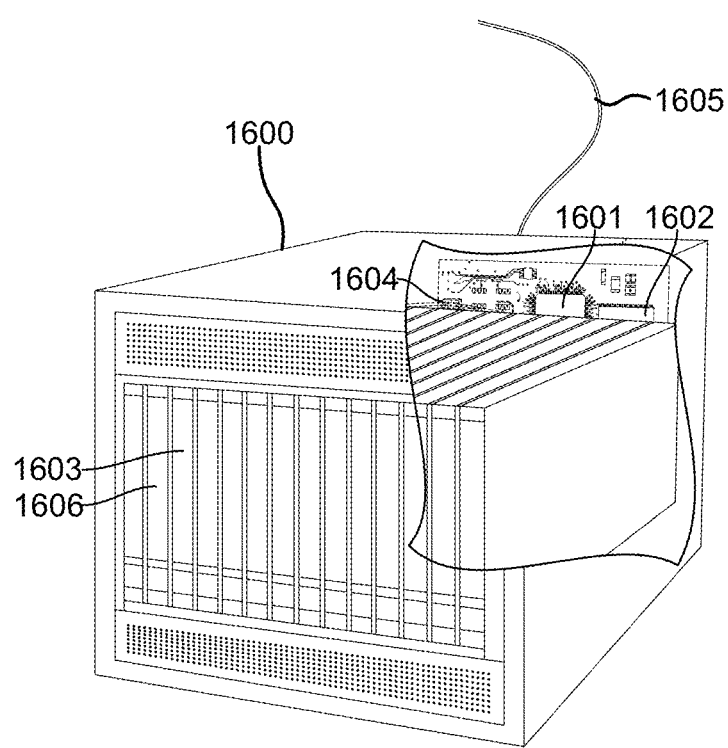
FIG. 16 is a component block diagram of a server suitable for use with various embodiments.

The embodiments described above may be implemented with any of a variety of server devices, such as the server 1600 illustrated in FIG. 16. Such a server 1600 typically includes a processor 1601 coupled to volatile memory 1602 and a large capacity nonvolatile memory, such as a disk drive 1603. The server 1600 may also include a floppy disc drive and/or a compact disc (CD) drive 1606 coupled to the processor 1601. The server 1600 may also include network access ports 1604 coupled to the processor 1601 for establishing data connections with network circuits 1605, such as the Internet.

Figure 17:
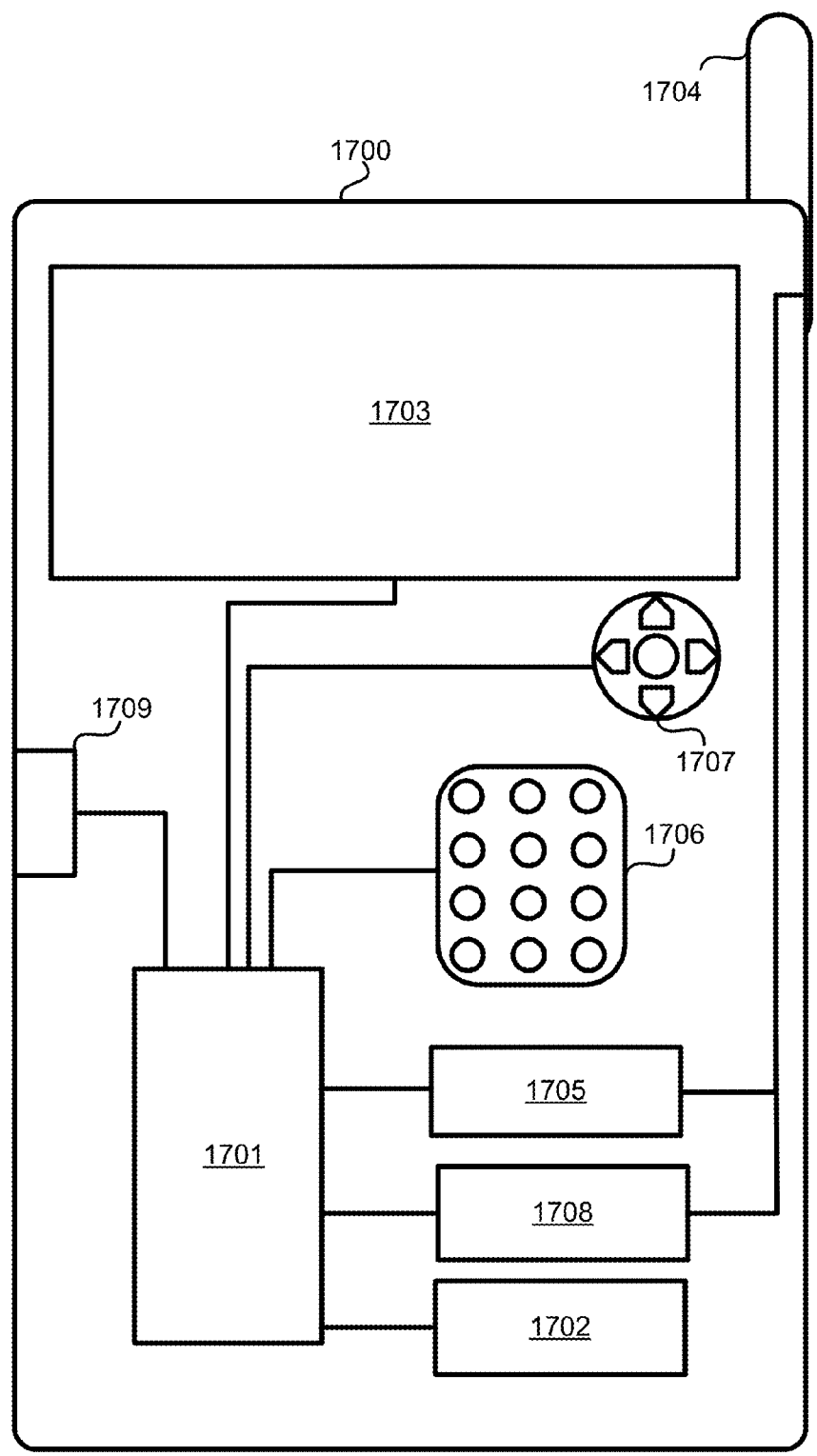
FIG. 17 is a component block diagram of a mobile device suitable for use with various embodiments.

A mobile device implementing the hub functionality may have in common the components illustrated in FIG. 17. For example, an exemplary mobile device 1706 may include a processor 1701 coupled to internal memory 1702, and a display 1703. Additionally, the mobile device 1706 may have an antenna 1704 for sending and receiving electromagnetic radiation that is connected to a wireless data link and/or cellular telephone transceiver 1705 coupled to the processor 1701. The mobile device may also include a second transceiver 1708 for connecting to one or more local wireless networks, such as a Bluetooth transceiver for connecting to peripheral devices via blue tooth wireless connections and/or a Wi-Fi transceiver for coupling to computers and peripheral devices via a local area wireless network. The mobile device may also include a USB (or FireWire) port 1709 for connecting to peripheral devices via a USB (or FireWire) cable. Mobile devices typically also include a key pad 1706 or miniature keyboard and menu selection buttons or rocker switches 1707 for receiving user inputs.

Various functional modules that may be implemented within a virtual electronic medical and fitness device hub system as software modules, hardware components, or combinations of hardware and software modules. A wireless communication hub system may include executive functions implemented in a processor which oversee the overall processes and coordinate the other modules. A communication module may include the transceivers and software for operating the transceivers as well as coordinating communication functions with the executive functions. The communication module may include the processing necessary to comply with various communication protocols, as well as negotiating communication links, verifying data transmissions, and performing the other common functionality of digital communication systems. A bridging logic module may also be coupled to the executive functions and configured to perform the processes associated with providing a communication link between electronic medical and fitness devices and an external computer, such as the service platform server. The bridging logic module may include the logic to package data received from electronic medical and fitness devices into IP packets for tunneling to the service platform server, for example. Similarly, the bridging logic module may include the logic to unpack command packets received from the service platform server and provide the embedded commands to the appropriate electronic medical and fitness device.

In various embodiments, the virtual electronic medical and fitness device hub system may include additional modules, such as router logic to enable the device to perform typical processes of a conventional router. Also, the virtual electronic medical and fitness device hub system may include server logic to enable the device to perform typical processes of a server. Further, embodiments of the virtual electronic medical and fitness device hub system may include memory and store-and-forward logic for receiving and storing data from electronic medical and fitness devices and relaying that data at a later time to a destination computer. Router, server and store-and-forward processes and logic are well-known in the computer arts.

The processors 301, 1601, 1701 in the various devices may be any programmable microprocessor, microcomputer or multiple processor chip or chips that can be configured by software instructions (applications) to perform a variety of functions, including the functions of the various embodiments described herein. In some devices, multiple processors 301, 1601, 1701 may be provided, such as one processor dedicated to wireless communication functions and one processor dedicated to running other applications. Typically, software applications may be stored in the internal memory 301, 1601, 1701 before they are accessed and loaded into the processor 301, 1601, or 1701. In some mobile devices, the processor 301, 1601, 1701 may include internal memory sufficient to store the application software instructions. In some devices, the secure memory may be in a separate memory chip coupled to the processor 301, 1601, 1701. In many devices the internal memory 302, 1602, 1702 may be a volatile or nonvolatile memory, such as flash memory, or a mixture of both. For the purposes of this description, a general reference to memory refers to all memory accessible by the processor 301, 1601, 1701, including internal memory 302, 1602, 1702 removable memory plugged into the device, and memory within the processor 301, 1601, 1701 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function. As an example, a processor executing the embodiment methods described herein may be a pulse width modulation peripheral machine that can be configured with configuration settings or configuration instructions.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A circuit for controlling display lights, comprising:
 a first switch;
 a first pulse width modulated signal line coupled to;
 a second switch;
 a second pulse width modulated signal line coupled to the second switch and to the first pulse width modulated signal line;
 a transistor coupled to the second pulse width modulated signal line between the first pulse width modulated signal line and the second switch, the transistor configured to invert a first pulse width modulated signal received from the first pulse width modulated signal line to generate a second pulse width modulated signal on the second pulse width modulated signal line;
 a third switch coupled to a third pulse width modulated signal line;
 a fourth switch coupled to a fourth pulse width modulated signal line;
 a fifth switch coupled to a fifth pulse width modulated signal line;
 a first light emitting diode including a first red element coupled to the first switch and the third switch, a first green element coupled to the first switch and the fourth switch, and a first blue element coupled to the first switch and the fifth switch; and
 a second light emitting diode including a second red element coupled to the second switch and the third switch, a second green element coupled to the second switch and the fourth switch, and a second blue element coupled to the second switch and the fifth switch,
 wherein:
  the first switch is controlled by the first pulse width modulated signal on the first pulse width modulated signal line and the third switch is controlled by a third pulse width modulated signal on the third pulse width modulated signal line to provide current to the first red element;
  the first switch is controlled by the first pulse width modulated signal on the first pulse width modulated signal line and the fourth switch is controlled by a fourth pulse width modulated signal on the fourth pulse width modulated signal line to provide current to the first green element;
  the first switch is controlled by the first pulse width modulated signal on the first pulse width modulated signal line and the fifth switch is controlled by a fifth pulse width modulated signal on the fifth pulse width modulated signal line to provide current to the first blue element;
  the second switch is controlled by the second pulse width modulated signal on the second pulse width modulated signal line and the third switch is controlled by the third pulse width modulated signal on the third pulse width modulated signal line to provide current to the second red element;
  the second switch is controlled by the second pulse width modulated signal on the second pulse width modulated signal line and the fourth switch is controlled by the fourth pulse width modulated signal on the fourth pulse width modulated signal line to provide current to the second green element; and
  the second switch is controlled by the second pulse width modulated signal on the second pulse width modulated signal line and the fifth switch is controlled by the fifth pulse width modulated signal on the fifth pulse width modulated signal line to provide current to the second blue element.

2. The circuit of claim 1, further comprising:
 a communication hub device processor coupled to the first pulse width modulated signal line, the third pulse width modulated signal line, the fourth pulse width modulated signal line; and the fifth pulse width modulated signal line,
 wherein the communication hub device processor is configured with processor-executable instructions to generate the first pulse width modulated signal, the third pulse width modulated signal, the fourth pulse width modulated signal, and the fifth pulse width modulated signal to adjust the color of light output by the first light emitting diode and the second light emitting diode.

3. The circuit of claim 2, wherein the communication hub device processor is configured with processor-executable instructions to adjust the color of light output by the first light emitting diode and the second light emitting diode to indicate information.

4. The circuit of claim 3, wherein the communication hub device processor is configured with processor-executable instructions such that the indicated information is one or more of a reminder, an alert, a request, a call to action, an indication, a state, and a confirmation.

5. The circuit of claim 2, wherein the communication hub device processor is configured with processor-executable instructions to adjust the color of light output by the first light emitting diode and the second light emitting diode to operate as a night light.

6. The circuit of claim 2, wherein the communication hub device processor is configured with processor-executable instructions to adjust the color of light output by the first light emitting diode and the second light emitting diode in response to a signal from a remote server.

7. The circuit of claim 2, wherein the communication hub device processor is a mobile device processor, and
 wherein the processor-executable instructions are included in an application downloaded to a memory of a mobile device.

8. A method for controlling display lights of a communication hub device, comprising:
 generating a first pulse width modulated signal to control a first switch;
 inverting the first pulse width modulated signal to control a second switch;
 generating a second pulse width modulated signal to control a third switch;
 generating a third pulse width modulated signal to control a fourth switch; and
 generating a fourth pulse width modulated signal to control a fifth switch,
 wherein:
  the first switch and the third switch control current to a first red element of a first light emitting diode;

the first switch and the fourth switch control current to a first green element of the first light emitting diode;

the first switch and the fifth switch control current to a first blue element of the first light emitting diode;

the second switch and the third switch control current to a second red element of a second light emitting diode;

the second switch and the fourth switch control current to a second green element of the second light emitting diode; and the second switch and the fifth switch control current to a second blue element of the second light emitting diode.

9. The method of claim 8, wherein the first pulse width modulated signal, the second pulse width modulated signal, the third pulse width modulated signal, and the fourth pulse width modulated signal control the first switch, second switch, third switch, fourth switch, and fifth switch to adjust the color of light output by the first light emitting diode and the second light emitting diode.

10. The method of claim 9, wherein generating the first through fourth pulses is controlled to generate light output by the first light emitting diode and the second light emitting diode that indicates information.

11. The method of claim 10, wherein the indicated information is one or more of a reminder, an alert, a request, an action, a call to action, an indication, a state, and a confirmation.

12. The method of claim 9, wherein generating the first through fourth pulses is controlled to generate light output by the first light emitting diode and the second light emitting diode that operates as a night light.

13. The method of claim 9, further comprising generating the first pulse width modulated signal, the second pulse width modulated signal, the third pulse width modulated signal, and the fourth pulse width modulated signal in response to a signal from a remote server.

14. The method of claim 8, wherein a phase and duty cycle of the first pulse width modulated signal and a phase and duty cycle of the second pulse width modulated signal control the first switch, second switch, and third switch to control an intensity of the first red element of the first light emitting diode and an intensity of the second red element of the second light emitting diode.

15. The method of claim 8, wherein a phase and duty cycle of the first pulse width modulated signal and a phase and duty cycle of the third pulse width modulated signal control the first switch, second switch, and fourth switch to control an intensity of the first green element of the first light emitting diode and an intensity of the second green element of the second light emitting diode.

16. The method of claim 8, wherein a phase and duty cycle of the first pulse width modulated signal and a phase and duty cycle of the fourth pulse width modulated signal control the first switch, second switch, and fifth switch to control an intensity of the first blue element of the first light emitting diode and an intensity of the second blue element of the second light emitting diode.

17. The method of claim 8, wherein the communication hub device is a mobile device.

18. The method of claim 17, wherein generating a first pulse width modulated signal, inverting the first pulse width modulated signal, generating a second pulse width modulated signal, generating a third pulse width modulated signal, and generating a fourth pulse width modulated signal are performed in response to instructions from an application executed by the mobile device.

19. A circuit for controlling display lights of a communication hub device, comprising:

means for generating a first pulse width modulated signal to control a first switch;

means for inverting the first pulse width modulated signal to control a second switch;

means for generating a second pulse width modulated signal to control a third switch;

means for generating a third pulse width modulated signal to control a fourth switch; and means for generating a fourth pulse width modulated signal to control a fifth switch, wherein:

the first switch and the third switch control current to a first red element of a first light emitting diode;

the first switch and the fourth switch control current to a first green element of the first light emitting diode;

the first switch and the fifth switch control current to a first blue element of the first light emitting diode;

the second switch and the third switch control current to a second red element of a second light emitting diode;

the second switch and the fourth switch control current to a second green element of the second light emitting diode; and the second switch and the fifth switch control current to a second blue element of the second light emitting diode.

20. The circuit of claim 19, wherein the first pulse width modulated signal, the second pulse width modulated signal, the third pulse width modulated signal, and the fourth pulse width modulated signal control the first switch, second switch, third switch, fourth switch, and fifth switch to adjust the color of light output by the first light emitting diode and the second light emitting diode.

21. The circuit of claim 20, wherein means for generating the first through fourth pulses is controlled to generate light output by the first light emitting diode and the second light emitting diode that indicates information.

22. The circuit of claim 21, wherein the indicated information is one or more of a reminder, an alert, a request, an action, a call to action, an indication, a state, and a confirmation.

23. The circuit of claim 20, wherein means for generating the first through fourth pulses is controlled to generate light output by the first light emitting diode and the second light emitting diode that operates as a night light.

24. The circuit of claim 20, further comprising means for generating the first pulse width modulated signal, means for generating the second pulse width modulated signal, means for generating the third pulse width modulated signal, and means for generating the fourth pulse width modulated signal in response to a signal from a remote server.

25. The circuit of claim 19, wherein a phase and duty cycle of the first pulse width modulated signal and a phase and duty cycle of the second pulse width modulated signal control the first switch, second switch, and third switch to control an intensity of the first red element of the first light emitting diode and an intensity of the second red element of the second light emitting diode.

26. The circuit of claim 19, wherein a phase and duty cycle of the first pulse width modulated signal and a phase and duty cycle of the third pulse width modulated signal control the first switch, second switch, and fourth switch to control an intensity of the first green element of the first light emitting diode and an intensity of the second green element of the second light emitting diode.

27. The circuit of claim 19, wherein a phase and duty cycle of the first pulse width modulated signal and a phase and duty cycle of the fourth pulse width modulated signal control the first switch, second switch, and fifth switch to control an intensity of the first blue element of the first light emitting diode and an intensity of the second blue element of the second light emitting diode.

28. The circuit of claim 19, wherein the communication hub device is a mobile device.

29. The circuit of claim 28, wherein generating a first pulse width modulated signal, inverting the first pulse width modulated signal, generating a second pulse width modulated signal, generating a third pulse width modulated signal, and generating a fourth pulse width modulated signal are performed in response to instructions from an application executed by the mobile device.

30. A circuit for controlling display lights, comprising:
a first switch;
a first pulse width modulated signal line coupled to;
a second switch;
a second pulse width modulated signal line coupled to the second switch and to the first pulse width modulated signal line;
a transistor coupled to the second pulse width modulated signal line between the first pulse width modulated signal line and the second switch, the transistor configured to invert a first pulse width modulated signal received from the first pulse width modulated signal line to generate a second pulse width modulated signal on the second pulse width modulated signal line;
a third switch coupled to a third pulse width modulated signal line;
a fourth switch coupled to a fourth pulse width modulated signal line;
a fifth switch coupled to a fifth pulse width modulated signal line;
a first light emitting diode including a first element coupled to the first switch and the third switch, a second element coupled to the first switch and the fourth switch, and a third element coupled to the first switch and the fifth switch; and
a second light emitting diode including a fourth element coupled to the second switch and the third switch, a fifth element coupled to the second switch and the fourth switch, and a sixth element coupled to the second switch and the fifth switch,
wherein:
the first switch is controlled by the first pulse width modulated signal on the first pulse width modulated signal line and the third switch is controlled by a third pulse width modulated signal on the third pulse width modulated signal line to provide current to the first element;
the first switch is controlled by the first pulse width modulated signal on the first pulse width modulated signal line and the fourth switch is controlled by a fourth pulse width modulated signal on the fourth pulse width modulated signal line to provide current to the second element;
the first switch is controlled by the first pulse width modulated signal on the first pulse width modulated signal line and the fifth switch is controlled by a fifth pulse width modulated signal on the fifth pulse width modulated signal line to provide current to the third element;
the second switch is controlled by the second pulse width modulated signal on the second pulse width modulated signal line and the third switch is controlled by the third pulse width modulated signal on the third pulse width modulated signal line to provide current to the fourth element;
the second switch is controlled by the second pulse width modulated signal on the second pulse width modulated signal line and the fourth switch is controlled by the fourth pulse width modulated signal on the fourth pulse width modulated signal line to provide current to the fifth element; and
the second switch is controlled by the second pulse width modulated signal on the second pulse width modulated signal line and the fifth switch is controlled by the fifth pulse width modulated signal on the fifth pulse width modulated signal line to provide current to the sixth element.

31. A method for controlling display lights of a communication hub device, comprising:
generating a first pulse width modulated signal to control a first switch;
inverting the first pulse width modulated signal to control a second switch;
generating a second pulse width modulated signal to control a third switch;
generating a third pulse width modulated signal to control a fourth switch; and
generating a fourth pulse width modulated signal to control a fifth switch,
wherein:
the first switch and the third switch control current to a first element of a first light emitting diode;
the first switch and the fourth switch control current to a second element of the first light emitting diode;
the first switch and the fifth switch control current to a third element of the first light emitting diode;
the second switch and the third switch control current to a fourth element of a second light emitting diode;
the second switch and the fourth switch control current to a fifth element of the second light emitting diode; and
the second switch and the fifth switch control current to a sixth element of the second light emitting diode.

32. A circuit for controlling display lights of a communication hub device, comprising:
means for generating a first pulse width modulated signal to control a first switch;
means for inverting the first pulse width modulated signal to control a second switch;
means for generating a second pulse width modulated signal to control a third switch;
means for generating a third pulse width modulated signal to control a fourth switch; and
means for generating a fourth pulse width modulated signal to control a fifth switch,
wherein:
the first switch and the third switch control current to a first element of a first light emitting diode;
the first switch and the fourth switch control current to a second element of the first light emitting diode;
the first switch and the fifth switch control current to a third element of the first light emitting diode;
the second switch and the third switch control current to a fourth element of a second light emitting diode;
the second switch and the fourth switch control current to a fifth element of the second light emitting diode; and
the second switch and the fifth switch control current to a sixth element of the second light emitting diode.

* * * * *